(12) United States Patent
Satomi et al.

(10) Patent No.: US 7,634,425 B2
(45) Date of Patent: Dec. 15, 2009

(54) INFORMATION PROVIDING SYSTEM AND METHOD THEREFOR

(75) Inventors: Hiroshi Satomi, Kanagawa-ken (JP); Makoto Tamari, Tokyo (JP); Akihiro Masukawa, Kanagawa-ken (JP); Kenji Kasai, Tokyo (JP); Shinji Fukunaga, Kanagawa-ken (JP); Atsushi Inoue, Tokyo (JP); Kosuke Ito, Tokyo (JP); Yasushi Higuma, Kanagawa-ken (JP); Jiro Izumi, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 1084 days.

(21) Appl. No.: 10/645,181

(22) Filed: Aug. 21, 2003

(65) Prior Publication Data
US 2004/0039641 A1 Feb. 26, 2004

Related U.S. Application Data

(63) Continuation of application No. 09/548,973, filed on Apr. 13, 2000, now abandoned.

(30) Foreign Application Priority Data

| Apr. 14, 1999 | (JP) | ................................ | 11-106516 |
| Apr. 14, 1999 | (JP) | ................................ | 11-106539 |
| Oct. 20, 1999 | (JP) | ................................ | 11-361129 |
| Dec. 20, 1999 | (JP) | ................................ | 11-360673 |

(51) Int. Cl.
*G06Q 20/00* (2006.01)
*G06Q 30/00* (2006.01)
(52) U.S. Cl. .......................................... 705/16; 705/14
(58) Field of Classification Search .................... 705/16
See application file for complete search history.

(56) References Cited

U.S. PATENT DOCUMENTS 3,697,693 A  10/1972  Deschenes et al. ............ 705/38

(Continued)

FOREIGN PATENT DOCUMENTS

JP       8-256256       1/1996

(Continued)

OTHER PUBLICATIONS

NPL_Chew, Alexis: An Intelligent Layout Tool for Publishing by Hong-Gian Chew and Moung Liang. From: IAAI-94 Proceedings. Copyright 1994, AAAI(www.aaai.org). Downloaded from http://www.aaai.org/Papers/IAAI/1994/IAAI94-005.pdf on Mar. 26, 2009. pp. 41-47 of the Prooceedings.*

(Continued)

*Primary Examiner*—F. Zeender
*Assistant Examiner*—Paul Danneman
(74) *Attorney, Agent, or Firm*—Fitzpatrick, Cella, Harper & Scinto

(57) ABSTRACT

The invention relates to printing print data and advertisement data and charging for the printing so that a printing fee is reduced in accordance with the printing of the advertisement data. A size of the advertisement data to be printed is input and the advertisement data and the input size are transmitted to a control apparatus. The control apparatus receives a print sheet size designation and output information, determines a layout which corresponds to a type of the output information, to secure an advertisement area for printing the advertisement data on the determined layout. The advertisement data is selected in accordance with the secured size in the layout, and at least one of a number of times of printing the advertisement data, a unit price of the advertisement data, print position settings of the advertisement data, a size adjusting method of the advertisement data, and an arrangement orientation of the advertisement data. Print data is then generated and a bar code indicating a print fee for printing of the output information, which is reduced in accordance with the advertisement data being printed, is added to the generated print data.

1 Claim, 83 Drawing Sheets

U.S. PATENT DOCUMENTS

| | | | | |
|---|---|---|---|---|
| 4,532,554 | A | * | 7/1985 | Skala .......................... 358/434 |
| 4,597,457 | A | | 7/1986 | Ikekita et al. ............. 705/28 X |
| 4,839,829 | A | * | 6/1989 | Freedman .................. 715/751 |
| 5,227,874 | A | | 7/1993 | Von Kohorn ................. 705/10 |
| 5,513,254 | A | * | 4/1996 | Markowitz ............. 379/100.17 |
| 5,537,314 | A | | 7/1996 | Kanter ....................... 364/406 |
| 5,600,563 | A | | 2/1997 | Cannon |
| 5,740,549 | A | * | 4/1998 | Reilly et al. .................. 705/14 |
| 5,875,110 | A | | 2/1999 | Jacobs |
| 5,911,146 | A | * | 6/1999 | Johari et al. ................ 715/525 |
| 5,987,426 | A | | 11/1999 | Goodwin, III ............ 705/16 X |
| 6,080,937 | A | | 6/2000 | Korthauer et al. .............. 177/2 |
| 6,385,728 | B1 | * | 5/2002 | DeBry ........................... 726/9 |
| 6,429,923 | B1 | * | 8/2002 | Ueda et al. .................... 355/40 |
| 6,891,636 | B1 | * | 5/2005 | Kawai et al. ............... 358/1.18 |

FOREIGN PATENT DOCUMENTS

| | | |
|---|---|---|
| JP | 11-069024 | 9/1999 |
| WO | WO 97/08861 | 3/1997 |
| WO | 98/38589 | 9/1998 |

OTHER PUBLICATIONS

European Search Report dated Apr. 6, 2009 issued during prosecution of related European application No. 00303127.5.

* cited by examiner

FIG. 31

PRINTING ADVERTISEMENT

YOUR PRINTING FEE WILL BE PAID BY ADVERTISER
IF YOU ACCEPT PRINTING OF AD

PRINT IN SPACE AREA     YES    NO ~3101

PRINT ON REVERSE SIDE     YES    NO ~3102

PRINT ON ADDITIONAL PAGE     YES    NO ~3103

OK     CANCEL

FIG. 44

DATA IS DEPOSITED AS FOLLOW
PRESS OK TO PRINT DETAILS

| REGISTERED P-CODE | 09027648234#4 |
|---|---|
| PASSWORD | **** |
| REGISTERED DATA | IMAGE 480KBYTES |
| VALID TERM | 1 WEEK (THROUGH APRIL 10) |
| REGISTRATION FEE | ¥250 |

4404

OK — 4401
BACK — 4402
CANCEL — 4403

FIG. 46

IP INFO TABLE 4601

| P-CODE | | | LINK P-CODE |
|---|---|---|---|
| ID | | PARENT CODE<br>SUB-CODE FLAG<br>SUB-CODE<br>LINK | REGISTERED, AVAILABLE<br>SUSPENDED, DISCONTINUED |
| BASIC PROPERTY | | OWNER ID (FIG. 51)<br>TITLE<br>SUB-TITLE (SUMMARY)<br>STATUS<br>PRICE<br>SIZE<br>AD CONDITION<br>PASSWORD<br>STARTING DATE<br>TERM<br>CODE VALID TERM<br>MAX ENLARGEMENT<br>MIN REDUCTION<br>GENRE<br>SUB-GENRE<br>AREA CODE<br>KEYWORD LIST<br>KEYWORD WEIGHT LIST | FOR AREA-BASED INFO |
| FRAME INFO | | | |
| NON-LINK INFO | | P-CODE<br>P-CODE LINKED TO THIS INFO | |
| REAL FILE INFO | | NO. OF FILES<br>FILE NAMES | |

FIG. 47

AD INFO TABLE (4701)

| P-CODE | AD PROPERTY | OWNER ID (FIG. 51) | |
| --- | --- | --- | --- |
| | | STARTING DATE OF PROVIDING AD | |
| | | TERM | |
| | | LINK INFO | TYPE OF LINK |
| | | | TARGET KEYWORD LIST |
| | | | TARGET KEYWORD WEIGHT |
| | | AD SIZE | |
| | | PORTRAIT/LANDSCAPE | |
| | | SIZE ADJUSTMENT | |
| | | AD POSITION | |
| | | MAX FEE | |
| | | FEE INFO | |
| | | MAX PRINT TIMES | |
| | | CURRENT PRINT TIMES ☆ | |
| | LINK ☆ | P-CODE | |
| | REAL FILE INFO | NO. OF FILES | |
| | | FILE NAME(S) | |

FIG. 48

| FIG. 48A |
|---|
| FIG. 48B |

FIG. 48A

USER INFO TABLE 4801

| USER P-CODE (PHONE NO.) | USER PROFILE | 〒 ADDRESS SERVICE TYPE COMPANY NAME TYPE-OF-INDUSTRY ID TYPE OF INDUSTRY (OTHERS) SECTION TITLE JOB PRINT SHEET<br><br><br>DATE OF BIRTH BLOOD TYPE SEX EDUCATION JOB ID JOB (OTHERS) MARRIED NO. OF FAMILY MEMBERS INCOME SAVINGS ESTATE CAR DISPLACEMENT CAR TYPE MOTORCYCLE DISPLACEMENT CYCLE TYPE | LAYOUT PRIORITY PAPER SIZE PAPER DIRECTION AD |

FROM FIG. 48A

|  |  | PET (OWNED)<br>PET (WANTED)<br>HOBBY<br>MUSIC<br>MOVIE<br>SPORT (WATCH)<br>SPORT (DO)<br>FISHING<br>FAVORITE GENRE |
|---|---|---|
|  | PERSONAL INFO TABLE | USER ID TO ANOTHER DB (FIG. 50) |
|  | MAIL SERVICE INFO | NO. OF MAILES<br>MAX ENLARGEMENT<br>MIN REDUCTION<br>P-CODE LIST |
|  | DELIVERY SERVICE INFO | NO. OF REGISTERED DATA<br>P-CODE LIST |
|  | PERSONAL P-CODE SERVICE INFO | NO. OF REGISTERED DATA<br>P-CODE LIST |

MAIL SERVICE P-CODE TABLE

| P-CODE (PHONE NO./#NO.) | MAIL PROPERTY | SUBJECT<br>SENDER<br>SENDING DATE |
|---|---|---|
|  | REAL FILE INFO | NO. OF FILES<br>FILE NAME(S) |

~ 4802

DELIVERY SERVICE P-CODE TABLE

| P-CODE (PHONE NO./-NO.) | INFO PROPERTY | TITLE ※<br>REGISTRATION DATE<br>VALID TERM<br>PASSWORD |
|---|---|---|
|  | REAL FILE INFO | NO. OF FILES<br>FILE NAME(S) |

PERSONAL P-CODE SERVICE P-CODE TABLE 4901

| P-CODE (PHONE NO./ ##NO.) | PROPERTY OF PERSONAL P-CODE INFO | TITLE<br>LAST PRINTING DATE<br>PRINT PAPER | LAYOUT PRIORITY<br>PAPER SIZE<br>PAPER DIRECTION<br>AD |
|---|---|---|---|
| | REGISTERED P-CODE INFO | NO. OF REGISTERED P-CODES<br>P-CODE LIST | |

FIG. 50

PERSONAL INFO TABLE 5001

| USER-ID | FAMILY NAME (ALPHABET)<br>GIVEN NAME (ALPHABET)<br>FAMILY NAME (CHINESE)<br>GIVEN NAME (CHINESE)<br>MIDDLE NAME<br>〒<br>ADDRESS<br>PHONE<br>FAX<br>CELL PHONE<br>E-MAIL ADDRESS<br>PASSWORD<br>COMPANY NAME<br>TYPE-OF-INDUSTRY ID<br>TYPE OF INDUSTRY (OTHERS)<br>SECTION<br>TITLE<br>JOB<br>COMPANY 〒<br>COMPANY ADDRESS<br>COMPANY PHONE<br>COMPANY FAX<br>CHARGE TO<br>DISK AREA<br>CHARGE HISTORY | CREDIT CARD<br>CARD NO.<br>VALID TERM |

FIG. 51

OWNER INFO TABLE — 5101

| OWNER-ID | COMPANY/PERSON NAME<br>COMPANY 〒<br>COMPANY ADDRESS<br>COMPANY PHONE NO.<br>COMPANY FAX NO.<br>E-MAIL ADDRESS<br>PASSWORD<br>TYPE-OF-INDUSTRY ID<br>TYPE OF INDUSTRY (OTHERS)<br>SECTION<br>CHARGE TO | |
|---|---|---|
| | DISK AREA<br>CHARGE HISTORY | BANK<br>BANK ACCOUNT<br>TERM OF CONTRACT |

FIG. 52

TERMINAL INFO TABLE

| TERMINAL ID | OWNER ID<br>AREA<br>TERMINAL TYPE<br>AREA | COUNTRY<br>ADDRESS | |
|---|---|---|---|
| | TERMINAL VERSION<br>SOFTWARE VERSION<br>INPUT DEVICE<br>STORAGE CAPACITY<br>OUTPUT DEVICE<br>LANGUAGE<br>PRINT ABILITY | | PAPER SIZE<br>DOUBLE/SINGLE-SIDED<br>COLOR/MONO<br>PRINT SPEED<br>FONT |
| | TERMINAL STATUS | | PRINT SPOOL STATUS<br>STORAGE FREE SPACE<br>P-CODE CACHE |

ITALIAN DISH BEST 5

1. MIXED PIZZA

2. NAPOLITAN
3. MEDITERRANEAN SALAD
4. CARBONARI
5. RAZANIA

NEXT   ITALIAN  RAMEN  PILAF

5605

BUDGET ¥6,000
PASTA ¥1,400
ORANGE CAKE ¥500
GLASS WINE ¥630

5-MINUTE WALK FROM SHIBUYA STATION
PIZZA SHOP XXY 03-1100-0000

SPAGHETTI SHOP

BUDGET ¥2,500
CARBONARI ¥780
MEDITERRANEAN SALAD ¥800
GLASS WINE ¥330

10-MINUTE DRIVE FROM SHIMOMARUKO STATION
SPAGHETTI SHOP XYZ

5606

5602

ABC CORPORATION (stock price chart: ¥2000–¥5000, years 97–2001)

5603

ABC BANK

WE WILL MAKE PROPOSAL FOR YOUR DEPOSIT
PLEASE CALL US FOR INFORMATION
AT 0120-333-○ △ △ △

5604

PRESENT "HOW TO TRADE" BROCHURE

SECRET

DE FUND
0120-333-○□□

FIG. 57

| P-CODE | KEYWORD | KEYWORD WEIGHT |
|---|---|---|
| 6943-4840-3928 | ITALIAN DISHES | 10 |
| | RANKING | 8 |
| | | |
| 4343-2325-1199 | ABC CORP. | 5 |
| | STOCK PRICE | 8 |
| | FINANCE | 7 |

5701

| KEYWORD | KEYWORD WEIGHT |
|---|---|
| SHIBUYA | 10 |
| TOKYO | 4 |
| | |

5702

| KEYWORD LIST FOR SEARCH | PRIORITY |
|---|---|
| ARTICLE | 10 |
| PERSONAL | 6 |
| TERMINAL | 5 |
| | |

5703

| AD P-CODE | MATCH COUNT |
|---|---|
| 4395-3230-2333 | 80 |
| 4545-6787-6666 | 60 |
| 9860-1114-0900 | 55 |
| 5406-4984-4444 | 20 |
| | |

| CANDINET MEMBER INFO : ADDRESS & NAME REGISTRATION | ☒ |

NAME (ALPHABET): KOSUGI    TARO
NAME (CHINESE): 小杉    太郎

HOME
- 〒 211 - 0000
- ADDRESS: 5-10-2 KOSUGI-CHO, KAWASAKI, TOKYO
- PHONE: ☐ - ☐ - ☐
- FAX: ☐ - ☐ - ☐
- CELL PHONE: 090 - 0289 - 2345
- E-MAIL ADDRESS: kosugi@canon

[ OK ]  [ CANCEL ]

FIG. 61

CANDINET MEMBER INFO : PERSONAL INFO REGISTRATION (1)

- DATE OF BIRTH: 99/04/01 ▶
- SEX: ◉ MALE ○ FEMALE  BLOOD TYPE: A ▶
- EDUCATION: COLLEGE ▶
- OCCUPATION: ENGINEER ▶   OTHERS >>
- MARRIAGE: ◉ SINGLE ○ MARRIED   FAMILY MEMBER(S): 1
- INCOME: ¥3~5M ▶   SAVINGS: LESS THAN ¥1M ▶

[OK]  [CANCEL]

CANDINET MEMBER INFO : PERSONAL INFO REGISTRATION (2)

- ESTATE: ○ HOUSE  ◉ APARTMENT  ○ RENT  ○ DORMITORY
  ○ RELATIVES
- CAR: ☑ PRIVATE CAR  DISPLACEMENT: 1500~2000 ▶  TYPE: RV ▶
  ☐ MOTOR-CYCLE  DISPLACEMENT: ▶  TYPE: ▶
- PET: ☐ HAVE PET  TYPE: ▶
  ☑ WANT PET  TYPE: DOG ▶
- HOBBY: ☑ MUSIC      GENRE: ROCK ▶
  ☑ MOVIE      GENRE: SF ▶
  ☑ WATCH SPORT  GENRE: PRO BASEBALL ▶
  ☑ DO SPORT    GENRE: SANDLOT BASEBALL ▶
  ☐ FISHING    PLACE: ▶

[OK]  [CANCEL]

FIG. 64

AD REGISTRATION: USER REGISTRATION

NON-CANDINET AD MEMBER MUST REGISTER MEMBER INFORMATION. FILL OUT THIS FORM AND PRESS "NEXT"

〒 [227] - [3298]
ADDRESS [2-3-4 KIBOGAOKA, MINAMI, YOKOHAMA, SHIZUOKA]
PHONE [0453] - [257] - [9802]
PERSONAL/COMPANY NAME [CANDINET PROJECT]
E-MAIL ADDRESS [candi@canon.co.jp]

[NEXT] [BACK] [CANCEL]

AD REGISTRATION: PASSWORD CONFIRMATION

ENTER PASSWORD FOR CANDINET AD MEMBER ID CA INF 0023

[******]

[NEXT] [BACK] [CANCEL]

FIG. 65

AD REGISTRATION: FILE UPLOAD

TRANSMITTING FILE TO CANDINET SERVER

PLEASE WAIT

FILE: BARGAIN_SALE. TXT 282BYTES

[CANCEL]

---

AD REGISTRATION: FILE DESIGNATION

DESIGNATE FILE TO REGISTER
YOU CAN DESIGNATE FILES WITH THE
FOLLOWING EXTENSIONS
FILES WITHOUT EXTENSIONS SHALL BE PROCESS AS
TEXT FILE

[TXT, HTML, BMP, JPG, ICO, TIF, EMF, WMF]   [DESIGNATE]

BARGAIN_SALE.TXT
BARGAIN_SALE.JPG                            [DELETE]

[NEXT]   [BACK]   [CANCEL]

FIG. 66

```
┌─────────────────────────────────────────────────┐
│ AD REGISTRATION : PROPERTY SETUP 1          [X] │
│                                                 │
│  SET STARTING DATE OF PROVIDING AD              │
│                                                 │
│                        ┌─────────────────────┐  │
│                        │ MARCH 29, 1999   ▼ │  │
│                        └─────────────────────┘  │
│                                                 │
│  SET VALID TERM                                 │
│      ○ UNLIMITED                                │
│      ○ 1 WEEK                                   │
│      ○ 1 MONTH                                  │
│      ○ 1 YEAR                                   │
│      ◉ DESIGNATE DATE  ┌─────────────────────┐  │
│                        │ APRIL 10, 1999   ▼ │  │
│                        └─────────────────────┘  │
│   ┌────────┐   ┌────────┐   ┌────────┐          │
│   │  NEXT  │   │  BACK  │   │ CANCEL │          │
│   └────────┘   └────────┘   └────────┘          │
└─────────────────────────────────────────────────┘
```

```
AD REGISTRATION: PROPERTY SETUP 4            ☒
  LIMIT TO AD AREA:
        ☐ ENTIRE
        ☐ TOP
        ☑ REVERSE SIDE

NEXT        BACK        CANCEL
```

FIG. 70

```
AD REGISTRATION: PROPERTY SETUP 5            ☒
  FEE: ¥20 PER AD. CHARGED BY PRINT
  PAPER UNIT.
  LIMIT TO AD FEE:

◎ DESIGNATE MAX PRINT TIMES
     ○ DESIGNATE MAX AD FEE

MAX: 400  ▼▲ ☐

NEXT        BACK        CANCEL
```

FIG. 71

```
┌─────────────────────────────────────────────────────────────┐
│ P-CODE REGISTRATION (CANDINET SERVER):USER REGISTRATION  [X]│
├─────────────────────────────────────────────────────────────┤
│                                                             │
│  NON-CANDINET MEMBER MUST REGISTER MEMBER INFORMATION.      │
│  FILL OUT THIS FORM AND PRESS "NEXT"                        │
│                                                             │
│     〒   [ 211 ] – [ 8909 ]                                 │
│                                                             │
│  ADDRESS [2ND TANAKA BLDG. 2-12-3 TOGANE, CHUO KAWASAKI]    │
│                                                             │
│  PHONE   [ 04 ] – [ 23 ] – [ 2020 ]                         │
│                                                             │
│  PERSONAL/COMPANY      [CANDI INFORMATION SERVICE, INC.]    │
│  NAME                                                       │
│                                                             │
│  E-MAIL ADDRESS        [candiinf@candi/cojp]                │
│                                                             │
│     [  NEXT  ]      [  BACK  ]      [  CANCEL  ]            │
└─────────────────────────────────────────────────────────────┘
```

```
P-CODE REGISTRATION (CANDINET SERVER) : PROPERTY SETUP 2    [X]

SIZE OF INFO TO REGISTER IS :

TEXT                        142CHRS
    IMAGE                       4×6CM
    ENTIRE AREA                 12×6CM

CHANGE SIZE ?

○ UNCHANGE
    ◉ CHANGE

CHR :     FROM [8 ▼▲] PT TO [14 ▼▲] PT

IMAGE :   FROM [50 ▼▲] % TO [200 ▼▲] %

[  NEXT  ]      [  BACK  ]      [ CANCEL ]
```

FIG. 76

P-CODE REGISTRATION (CANDINET SERVER) : PROPERTY SETUP 3

PERMIT PRINTING OF AD ON THE SAME SIDE ?

- ○ [PERMIT]
- ○ PERMIT ONLY FOR REVERSE SIDE
- ○ NO

[NEXT] [BACK] [CANCEL]

P-CODE AD REGISTRATION (CANDINET SERVER) : PROPERTY SETUP 4

SET PASSWORD FOR ACCESS TO INF ?

☑ SET

PASSWORD : [******]

[NEXT] [BACK] [CANCEL]

FIG. 77

```
┌─────────────────────────────────────────────────────────┐
│ P-CODE REGISTRATION (CANDINET SERVER):PROPERTY SETUP 4 ⊠│
│ CHARGE ?                                                │
│                                                         │
│   ☑ CHARGE UPON PRINTING                                │
│                                                         │
│                              ¥ 20  PER PRINT            │
│                                                         │
│   [  NEXT  ]      [  BACK  ]      [  CANCEL  ]          │
└─────────────────────────────────────────────────────────┘
```

INFORMATION PROVIDING SYSTEM AND METHOD THEREFOR

This application is a continuation of application Ser. No. 09/548,973, filed Apr. 13, 2000.

BACKGROUND OF THE INVENTION

1. Field of the Invention

The present invention relates to an information processing method, an output control method, an apparatus and a system therefor, allowing to provide and acquire information with a level satisfactory to the information providing side and the information receiving side and also with an appropriate layout.

2. Related Background Art

There have conventionally been conceived services for providing various information. For information providing, there are known various forms such as 1) internet web, 2) internet pushed news delivery service, 3) fax information take-out service, 4) information requesting coupon attached to newspaper or magazine, 5) free dialing inquiry, and 6) mailing reference requesting postcard, etc. These methods are associated with respective advantages and disadvantages, and there is being desired better service capable of providing a larger number of people with information.

On the other hand, there are increasing information providing services by character information or image information, with the spreading of mobile information terminals such as mobile telephones. However, the display ability of such mobile terminals is limited in size, color, resolution etc., and the services of the above-mentioned forms may be utilized for complementing such limited ability.

Nevertheless, the conventional information providing services mentioned above have respective limitations. For example, the services 1) and 2) are available only to the users of a personal computer or terminal, skilled in the internet environment. In addition, a cumbersome procedure is required for finding the URL (uniform resource locator) required to access to the desired information.

Also the service 3) is limited to the facsimile users, and is also limited by the printing ability (monochromatic, print preview etc.) of the facsimile apparatus owned by each user. Besides the output cost (telephone fee, paper fee etc.) has to be borne by the user.

The services 4) and 6) are available to unspecified plural users, but the information can be acquired several hours or several days after the service is requested. Also the information provider has to prepare physical processing system for providing the information, so that there is required an information providing cost.

In the service 5), there can only be obtained aural information through the telephone. Also if the information can be requested after aural conversation, the information itself can only be provided several hours or several days later. Besides the information provider has to prepare a physical processing system such as an automatic responding tape or a telephone operator.

In consideration of the foregoing, for realizing a better information providing service, there can be conceived a system of outputting specified information by a code system represented by symbols and numbers (hereinafter tentatively called P-code system). There is conceived demand that any person can obtain high quality output of detailed information in any place at any time.

However, the number of codes will become enormously large if all the information is to be given by the code entered by the user, and the increase in the number of digits of the code will increase the probability of erroneous input.

Also there exist various limitations even if the above-mentioned drawback is resolved. For example, the cost of information is a problem. As an example, color printout is still expensive. In the field of internet, there is conceived a service in which the information provider provides the information free of charge by inserting an advertisement from an advertisement provider, but the general user is still resistant to the acquisition of the information by printout since the printing process is costly in case of acquiring such information at a copy shop or a convenience store.

On the other hand, from the standpoint of the advertisement provider, the randomly distributed advertisement such as fold-in in the newspaper has a low hit rate (ratio of the number of actual customers per the number of delivered advertisements). Also from the standpoint of the user obtaining the printout, the randomly printed advertisement is often irrelevant to the interest of the user and merely an obstacle. There will result waste of print paper unless such limitations are resolved.

Besides, the information desired by the user has various sizes and various layouts. Consequently, the insertion of an advertisement may cause overflow of data from the limited space, thereby eventually causing the advertisement alone to be printed on an additional page. On the other hand, the data printout, if unconditionally reduced in size, may become illegible depending on the size of the original data. Thus, such service may eventually lack attractiveness to the user and the advertisement provider.

Even if the user is allowed to arbitrarily select whether or not to output the advertisement, it will be time-taking and cumbersome to confirm and determine whether or not to print the advertisements one by one. Particularly in case the user executes the printing operation on the operation panel of a terminal for example in a convenience store, the panel operation may take a long time whereby the terminal may be intolerably occupied by a user. Also the store attendant may have to respond to the inquiry of the user, for example on the operations on the panel, and these factors may hinder efficient information providing.

Further, in case the advertisement provider has an agreement with a fixed number of advertisement for a fixed fee, expecting the output in excess of such number, the number of actually printed advertisements may become short of the anticipated number or the corresponding fee, against such expectation. Such situation is unsatisfactory to the advertisement provider.

Furthermore, in case the information and the advertisement are to be printed at the same time, it is difficult to spare a large area for the advertisement if they are to be printed on the same side of the sheet. Also the printing of plural information and advertisement on the same side requires a complex automatic layout process.

Also there is conceived a case of registering desired information in advance and outputting such information afterwards, but, in case of registering the information on a network or the like, the user wishes to execute the previewing operation as soon as possible at the selection of the file to be registered, in order to confirm the content of the selected file. However the exact preview is possible only after the registration of all the information.

Also, in a system in which the information is extracted by a code, the code is renewed and recycled as soon as the effective term of the information expires. However, the user may not notice such expiration of the effective term of the information and may try access to the information, using the same code. In such case, if the code is recycled and assigned to another information, there may result an unpleasant situation for the user and the advertisement provider, such as the output of the information of a contender. Also for the advertisement provider, the advertisement delivered regardless of the kind of information provides a low hit rate and is inefficient.

Also with the spreading of the internet and the mobile terminals, it is rendered possible to read the mails on such mobile terminal or to make access to the information on the internet from such mobile terminal, but it is still difficult to read all such information on the mobile terminal. There are encountered certain drawbacks such as interruption of a long mail or inability of access to image information in case of information involving an image. However it is difficult to always carry the personal computer for the purpose of access to such information. Consequently there still exists demand that anybody can obtained detailed information at any time in a location available to anybody.

The output has to be provided as inexpensively as possible at a level satisfactory to the user, but it is difficult to derive a variable print fee based on the number of prints, price of the printed chargeable information and fee of advertisement to be deducted therefrom.

On the other hand, the newspaper contains many information, but most of such information is often not required by the user. The individual user may wish certain information everyday, but the search from the personal computer is cumbersome and time-taking. There is already available a service providing certain information as a pack, but the user cannot arbitrarily select the combination of the information provided in such service.

Conventionally, the information providing is executed by certain internet providers, and the general users can only extract the information from the terminal therefor. Also the owner of personal computer can execute information transmission by opening a home page, but the description of such home page is not necessarily easy for all the users.

Furthermore, the advertisement of a food or a restaurant may not be adequate for example in an article reporting a poisoning from eating. Searching character trains in the information and providing an advertisement matching such information may have an adverse effect depending on the content of the information, but there is no effective means for preventing such situation.

Therefore, there has been desired a service capable of solving the above-described drawbacks singly or in combination.

SUMMARY OF THE INVENTION

In consideration of the foregoing, an object of the present invention is to provide an information processing apparatus, a method and a program therefor, adapted to read, from memory means, first value information indicating the value for output information to be outputted and second value information indicating the value of additional information to be added to the output information, and to determine the value of the output of the output information and the additional information, based on the first information of the output information and the second value information of the additional information to be added to the output information.

Another object of the present invention is to provide an output control apparatus, a method and a program therefor, adapted for entering code information for specifying output information, also entering setting information for the output of the output information, transmitting thus entered code information and setting information to an external apparatus and receiving, from the external apparatus, value information indicating the value of the output and determined in the external apparatus based on first value information indicating the value of the output information specified by the transmitted code information and second value information indicating the value of additional information to be added to the output information at the output.

Still another object of the present invention is to provide an information providing system consisting of an information processing apparatus and an output control apparatus connected through a network, a method and a program therefor, wherein the output control apparatus is adapted to enter code information for specifying output information and to transmit the code information entered by code input means, while the information processing apparatus is adapted to read first value information indicating the value of the output information to be outputted and second value information indicating the value of additional information to be added to the output information from memory means, to receive the code information and to determine the value of the output of the output information and the additional information, based on the first value information indicting the value of the output information specified by the received code information and the second value information indicating the additional information to be added to the output information at the output.

Still another object of the present invention is to provide an information processing apparatus, a method and a program therefor, adapted for entering code information corresponding to output information, acquiring the output information to which the entered code information correspond, acquiring additional information to be outputted together with the output information, and controlling an output unit so as to output the output information and the additional information based on the output face information of the additional information.

Still another object of the present invention is to provide an information processing apparatus, a method and a program therefor, adapted for receiving code information corresponding to output information from an external apparatus, acquiring the output information corresponding to the received code information, acquiring additional information to be outputted together with the acquired output information, generating output information for outputting the output information and the additional information based on the output face information of the additional information, and transmitting the generated output information to the external apparatus.

Still another object of the present invention is to provide an information processing apparatus, a method and a program therefor, adapted for acquiring plural output information corresponding to entered code information, receiving an instruction for outputting all the acquired output information, and receiving an instruction for outputting only a part of the acquired plural output information.

Still another object of the present invention is to provide an information processing apparatus, a method and a program therefor, adapted for selecting an accounting method for the information output, and, in case the selected accounting method is a cash payment, controlling an output unit so as to output a symbol indicating the amount of the value for the output of the information, together with such information.

BRIEF DESCRIPTION OF THE DRAWINGS

FIG. 31 is a view showing an "advertisement setting" display image;

FIG. 44 is a view showing a display image indicating P-code, password, data amount, effective term and registration fee of deposited image data;

FIG. 46 is a view showing an example of IP information registration table;

FIG. 47 is a view showing an advertisement information table;

FIG. 48, composed of FIGS. 48A and 48B, is a view showing an example of user information table;

FIG. 49 is a view showing an example of P-code table for personal P-code service;

FIG. 50 is a view showing an example of personal information table;

FIG. 51 is a view showing an example of owner information table;

FIG. 52 is a view showing a terminal information table;

FIG. 56 is a view showing an example of printout of the generated print data;

FIG. 57 is a view showing an example of keyword list generated from the IP information registration table;

FIG. 58 is a view showing a registration display image for entering name, contact address etc. by the user;

FIG. 61 is a view showing a registration display image for entering personal information of the user;

FIG. 64 is a view showing a registration display image for entering name, contract address etc. by the advertisement provider;

FIG. 65 is a view showing a registration display image for designating image data and text data for advertisement insertion;

FIG. 66 is a view showing a registration display image for designating the starting date and effective term of the advertisement insertion by the advertisement provider;

FIG. 68 is a view showing a registration display image for the advertisement provider to select a printing size of the advertisement data among the predetermined sizes and to select a condition for changing the advertisement size;

FIG. 69 is a view showing a registration display image for designating a full-page advertisement, a top-printed advertisement or a back-side advertisement;

FIG. 70 is a view showing a registration display image for designating the limitation on the number of printing of the advertisement insertion and the limitation on the advertisement fee;

FIG. 71 is a view showing a registration display image for entering name, contact address etc. of the information provider;

FIG. 74 is a view showing a registration display image for designating the starting date and effective term of the information providing by the information provider;

FIG. 75 is a view showing a registration display image for the information provider to designate the character size and image size in the information data printout;

FIG. 76 is a view showing a registration display image for designating whether the insertion of advertisement is permitted on not on the same page at the printout of the information data and whether a password is required for the printout of the information data;

FIG. 77 is a view showing a registration display image for fee setting;

DETAILED DESCRIPTION OF THE PREFERRED EMBODIMENTS

First Embodiment

Figure 1:
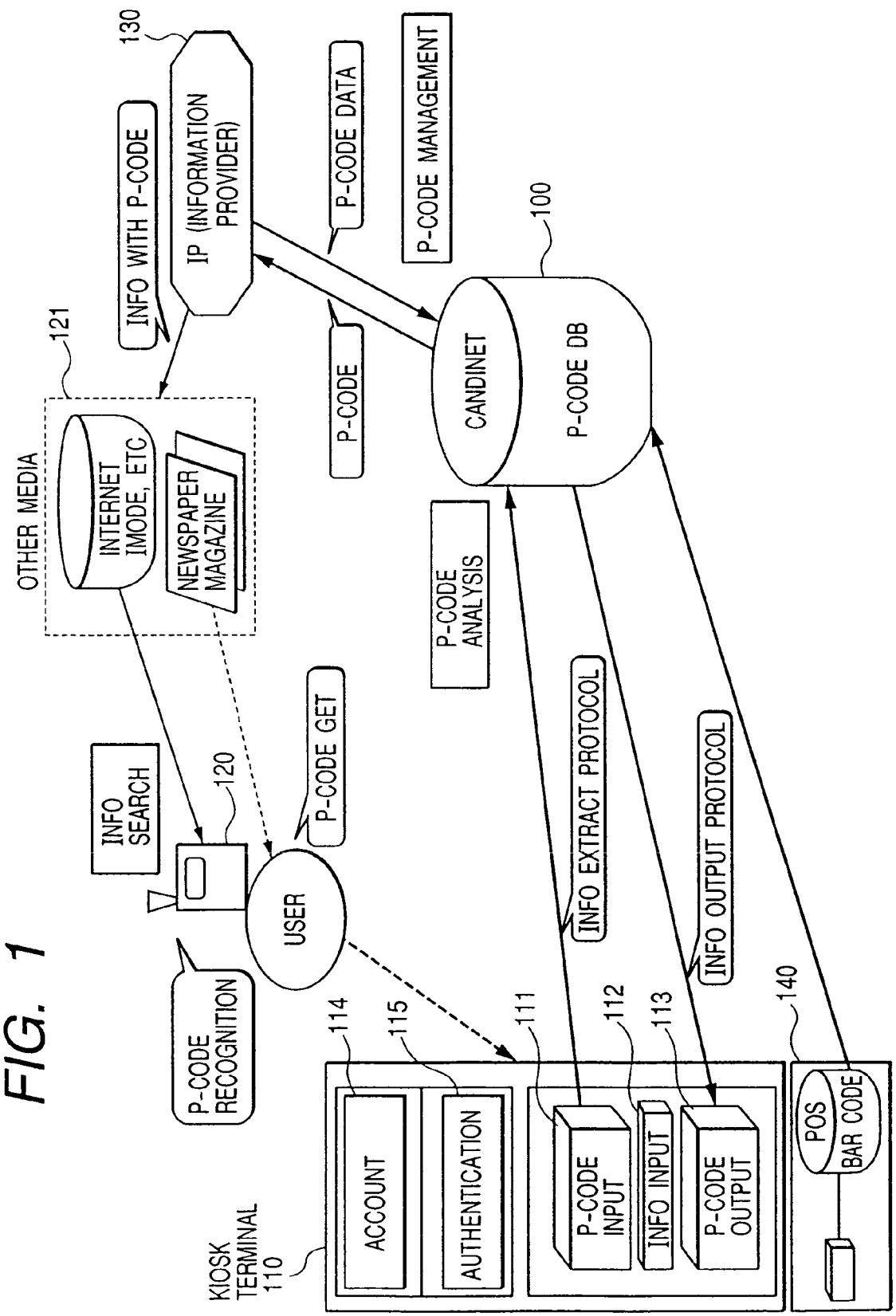
FIG. 1 is a view showing an embodiment of the information providing method, apparatus and system therefor of the present invention.

FIG. 1 is a view showing an embodiment of the information providing method, apparatus and system of the present invention, wherein a database/management unit 100 manages the information to be provided and the issued numbers of P-codes and controls the output layout. The unit is hereinafter called CanDINet control unit.

An apparatus 110, hereinafter called "kiosk terminal", is placed in a location accessible to unspecified plural users such as sales stalls in railroad stations or convenience stores, for the purpose of information input/output and P-code input.

The kiosk terminal 110 is composed of a user interface or a code input device (P-code input device 111) for entering P-code, an information input device 112 for registering/inputting information from the terminal, a P-code information output device 113 capable of high-quality two-side printout, and a device for fee settling and personal verification such as a fee setting device 114 for receiving the fee inserted by the user and a personal verifying device 115.

A mobile terminal device 120 can be used by the user for obtaining the P-code required for information output. The user with no personal computer can use this terminal for finding the desired information, and can obtain the high-quality output by entering the P-code corresponding to the found information into the kiosk terminal 110.

An information provider (IP) 130 generates data for providing various information. Such providers can be divided into those dealing with the advertisements found in the ordinary home pages of the internet, and those providing the added value information, such as horse race forecast. Such a provider registers, in the CanDINet control unit 100, the data corresponding to the information to be provided, whereby a P-code is assigned to the provided information. The user enters the P-code, corresponding to the information, into the kiosk terminal 110, whereby the information can be output (printed).

In this process, an advertisement is printed in a space area or on the back surface of the sheet, together with the output information, whereby the print fee to be charged to the user can be alleviated.

An information medium 121 such as internet, a newspaper or a magazine also provides the P-code in addition to the information terminal 120. The user, acquiring the P-code therefrom, can enter such P-code into the kiosk terminal 110 at the convenience store or the like thereby obtaining (printing) the desired information in a simple manner.

A device 115 executes personal verification whether the user is allowed to obtain the output of the specified information by the input of the P-code. A device 114 executes a charge setting process for the information output by the user. This device may be linked with a POS system 140 in the convenience store or the like.

The above-described system can provide the information providing service of, for example, following four kinds:

1) Information service: This is a basic service of the present system, wherein the user can print the information provided by the information provider 130, by acquiring the P-code from the terminal 120 or another information medium 121 and entering such P-code into the kiosk terminal 110 as explained in the foregoing. The fee for information output is variable according to various conditions such as presence/absence of advertisement, back-side printing, color/monochromatic printing etc.;

2) Mail print service: In case the user wishes to print the content of an electronic mail sent to the mobile terminal or the user without the mobile terminal wishes to read an electronic mail outside his office, this service allows the user to print the content (mail information) of the electronic mail by entering the P-code. Also in this service, the fee for information output is variable according to various conditions such as presence/absence of advertisement, back-side printing, color/monochromatic printing etc.;

3) Personal information service: This service allows the user not only to acquire the individual information by the P-code associated thereto but also to acquire, by a P-code specific to the user, an integrated information selected according to the desire of the user. This service includes, for example, "my sports newspaper" consisting of news articles of a specified baseball team, outputted every morning at a convenience store. In order to receive such service, the user has to obtain a personal membership and the issuance of a P-code specific to the user (called personal P-code). In entering such personal P-code, it is necessary to enter a password or the like into the personal verification device 115. The fee for information output is variable according to various conditions such as presence/absence of advertisement, back-side printing, color/monochromatic printing etc.; and 4) Data delivery service: This service allows the user to temporarily deposit information (data), just like depositing a car in a coin-operated car park, and to extract the data afterwards. The information can be deposited either by entering the information through the information input device 112 (for example a scanner) of the kiosk terminal 110 (case A) or by transferring the desired information to the CanDINet control unit 100 through the internet (case B).

At the input (case A) or transfer (case B) of the information, a personal P-code is issued, and the information can be outputted at any desired location by entering such P-code in the kiosk terminal 110. The fee for information output is variable according to various conditions such as presence/absence of advertisement, back-side printing, color/monochromatic printing etc.

Figure 2:
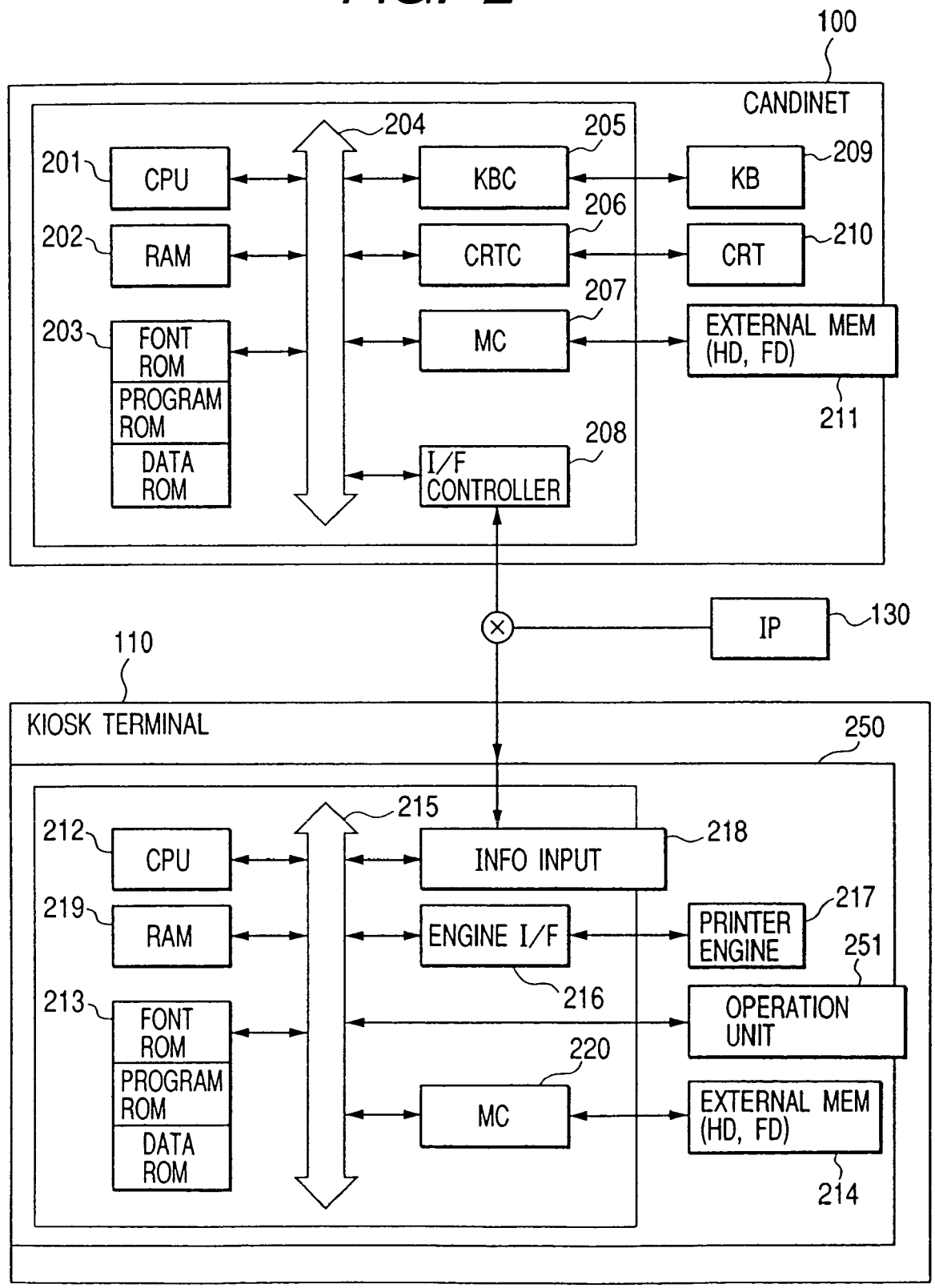
FIG. 2 is a block diagram showing the configuration of a kiosk terminal and a CanDINet control unit 100 in an embodiment of the present invention.

FIG. 2 is a block diagram showing the control configuration of the kiosk terminal 110 and the CanDINet control unit 100 in the present embodiment. They may be composed of a single equipment or a system consisting of plural equipment, as long as the functions of the present invention can be attained. More specifically, the kiosk terminal 110 and the CanDINet control unit 100 may be composed of a single equipment, or of a system connected through a network such as LAN or WAN constructed by optical cables or public communication lines. Further, in such system, the CanDINet control unit 100 may naturally be present in plural units, for example in respective areas or in respective countries. Such configuration is adopted in the present embodiment. In FIG. 2, the information provider 130 is connected to the kiosk terminal 110 and the CanDINet control unit 100 for example through the public lines.

(CanDINet Control Unit 100)

In FIG. 2, a CPU 201 processes a document containing graphics, image, characters, table etc. according to a program (corresponding to the flow charts to be explained later) stored in a program ROM in a ROM 203 or in an external memory 211 of a large capacity, and also manages a database stored in the external memory 211. The CanDINet control unit 100 executes compression of the information and the advertisement information, generated by the document processing and the layout process, into and conversion of such information into data of a script format, and transfers the data to the kiosk terminal 110 according to an information output protocol.

Also if the information from the external information provider 130 is compressed data or data of script format, the CanDINet control unit 100 executes thawing of such compressed data or conversion of the script format data into an image, for data editing.

The CPU 201 collectively controls devices connected to a system bus 204. In the program ROM of the ROM 203 or the external memory 211, there is stored an operating system (OS) which is the control program for the CPU 201. Also a font ROM of the ROM 203 or the external memory 211 stores font data to be used in the document processing mentioned above. A data ROM of the ROM 203 or the external memory 211 stores various data to be used in the document processing mentioned above. A RAM 202 functions as a main memory and a work area of the CPU 201.

A keyboard controller (KBC) 205 controls the inputs from a keyboard 209 and an unrepresented pointing device. A CRT controller (CRTC) 206 controls the display on a CRT display 210. These devices are to be used by the manager when required and are not directly related to the present invention. A disk controller (DKC) 207 controls access to the external memory 211 such as a hard disk (HD) or a floppy disk (FD) storing a boot program, various application programs, font data, user files, editing files, a printer control command generation program (hereinafter called printer driver) etc. An interface controller 208 is connected to the kiosk terminal 110 through the network and executes a communication control process on the network.

The CPU 201 realizes WYSIWYG (what you see is what you get) on the CRT 201 by executing an outline font development (rasterization) onto a display information RAM in the RAM 202. Also the CPU 201 opens various registered windows and executes various data processings, based on commands instructed by the user for example with an unrepresented mouse cursor on the CRT 210. In response to an instruction for printing by the user, there is opened a window for setting for the printing operation. On this window, the user can set the printing process for the printer driver, such as printer setting or printing mode selection.

An information output device 250 of the kiosk terminal 110, a printer CPU 212 outputs an image signal, constituting the output information, to a printing unit (printing engine) 217 based on a control program stored in a program ROM of a ROM 213 or in an external memory 214. The program ROM of the ROM 213 also stores the control programs of the CPU 212, corresponding to the flow charts to be explained later. A font ROM in the ROM 213 stores font data to be used in the generation of the above-mentioned output information.

An information input unit 218 is composed for example of an image scanner (scanner unit) and an interface, and is connected with the CanDINet control unit 100 through a network or a public line. The scanner unit reads an original and executes a digital signal process, thereby generating the image information of the original. This is utilized in the aforementioned in the data delivery service, in temporarily depositing the information from the terminal in the store.

The CPU 212 is rendered capable of communication with the CanDINet control unit 100 through the interface, thereby transmitting the information of the printer to the CanDINet control unit 100. A RAM 219 functions as a main memory or a work area of the CPU 212, and can be expanded in capacity by an optional RAM to be connected to an unrepresented expansion port. The RAM 219 is utilized as an output information developing area, an environment data storage area, an NVRAM etc. The aforementioned external memory 214 such as a hard disk or an IC card is access controlled by a memory controller (MC) 220. The external memory 214 is connected as an option and is used for storing font data, emulation data, form data etc.

An operation unit 251 is provided with a display unit for displaying various images to be explained later, a touch panel provided on the display unit and/or separately positioned operation switches (buttons).

The aforementioned external memory 214 is not limited to one unit but may be provided in plural units, storing optional fonts and a program for interpreting the printer control language of a different language system. Further, the external memory 214 may be provided with an unrepresented NVRAM for storing the printer mode setting information entered from the operation unit 251.

(Configuration of Printer)

Figure 3:
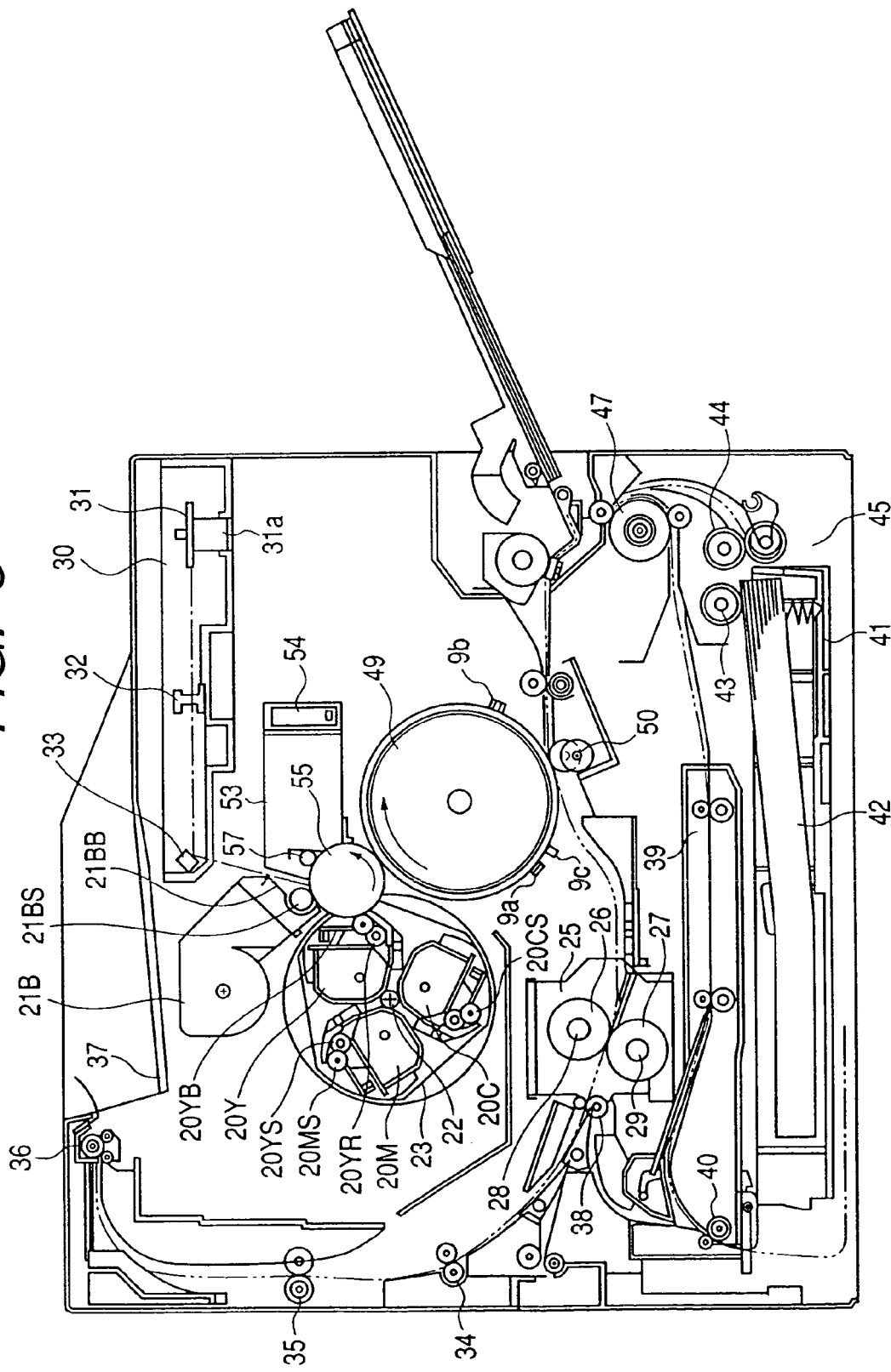
FIG. 3 is a cross-sectional view of a color output unit with a scanner and a two-side printing function, constituting an example of the information output unit (printer) of an information output apparatus 113 of the kiosk terminal 110.

FIG. 3 is a cross-sectional view of a color output unit with a scanner and with two-side printing function, constituting an example of the printer of the information output apparatus 250 of the kiosk terminal 110. Though not illustrated, there is naturally attached the information input device 218 shown in FIGS. 1 and 2.

In this printer, a laser beam modulated with the image data of each color, obtained from the print data entered from the host computer, scans a photosensitive drum 55 through a polygon mirror 31 thereby forming an electrostatic latent image. The latent image is developed with toner to obtain a visible image, and the toner images of all the colors are transferred in superposed manner onto an intermediate transfer member 49 to obtain a visible color image. Such visible color image is further transferred onto a transfer material 42, and is fixed thereon. An image forming unit executing the above-described process is composed of a drum unit including the photosensitive drum 55, a sheet feeding unit including a primary charging unit with a contact charging roller 57, a cleaning unit, a developing unit, the intermediate transfer member 49, a sheet cassette 41 and rollers 43, 44, 45, 47, and a transfer/fixation unit 25 including a transfer roller 50.

The drum unit 53 is integrally composed of the photosensitive drum (photosensitive member) 55 and a cleaner container 43 having a cleaning mechanism, serving also as the holder for the photosensitive drum 55. The drum unit 53 is detachably supported in the main body of the printer, and can be easily replaced, depending on the service life of the photosensitive drum 55. The photosensitive drum 55 is composed of an aluminum cylinder, coated with an organic photoconductive layer on the external periphery thereof, and is rotatably supported in the cleaner container 54. The photosensitive drum 55 is rotated by an unrepresented driving motor, counterclockwise according to the progress of the image forming operation. The surface of the photosensitive drum 55 is selectively exposed to the laser beam, supplied from a scanner unit 30, thereby forming the electrostatic latent image. In the scanner unit 30, the modulated laser beam is reflected by the polygon mirror rotated in synchronization with the horizontal sync signal of the image signal, thereby irradiating the photosensitive drum through a lens 32 and a mirror 33.

For developing the electrostatic latent image into a visible image, the developing unit is provided with three color developing units 20Y, 20M, 20C respectively for yellow, magenta and cyan development, and a black developing unit 21B for black color development. The color developing units 20Y, 20M, 20C and the black developing unit 20B are respectively provided with sleeves 20YS, 20MS, 20CS, 21BS and coating blades 20YB, 20MB, 20CB, 21BB in pressure contact with the external periphery of these sleeves. Also the three color developing units 20Y, 20M, 20C are further provided with coating rollers 20YR, 20MR, 20CR.

The black developing unit 21B is rendered detachably from the main body of the printer, and the color developing units 20Y, 20M, 20C are detachably mounted on a developing rotary 23 rotating about a rotary shaft 22.

The sleeve 21BS of the black developing unit 21B is positioned with a small gap of about 300 μm to the photosensitive drum 55. The black developing unit 21B conveys the toner by an incorporating conveying member, and provides the toner with a triboelectric charge by the coating blade 21BB so as to coat the external periphery of the clockwise rotating sleeve 21BS with the toner. A developing bias voltage is applied to the sleeve 21BS to effect development on the photosensitive drum 55 according to the electrostatic latent image, thereby forming a visible image with the black toner on the photosensitive drum 55.

The three color developing units 20Y, 20M, 20C rotate along with the rotation of the developing rotary 23 whereby each of the sleeves 20YS, 20MS, 20CS is opposed to the photosensitive drum 55 with a small gap of about 300 μm thereto.

Thus predetermined one of the color developing units 20Y, 20M, 20C stops at a developing position opposed to the photosensitive drum 55 to form a visible image thereon.

At the formation of a color image, the developing rotary 23 rotates at every turn of the intermediate transfer member 49 whereby the developing process is executed in succession by the yellow, magenta and cyan developing units 20Y, 20M, 20C and the black developing unit 21B to form visible images of yellow, magenta, cyan and black colors in succession during four turns of the intermediate transfer member 49, whereby by a full-color visible image is formed thereon.

The intermediate transfer member 49 is so constructed as to rotate along the rotation of the photosensitive drum 55 in contact therewith and rotates clockwise at the color image formation, thereby receiving multiple of the visible image four times from the photosensitive drum 55. Also at the image formation, a transfer roller 50 to be explained later comes into contact with the intermediate transfer member 49 for supporting the transfer material 42 therebetween, whereby the visible color image on the intermediate transfer member 49 is collectively transferred simultaneously thereonto. Along the external periphery of the intermediate transfer member 49, there are provided a top sensor 49a for detecting the rotational position thereof, an RS sensor 49b and a density sensor 49c for detecting the density of the toner image formed on the intermediate transfer member.

A transfer roller 50 is provided with a transfer charger supported so as to be capable of contacting to and separating from the photosensitive drum 55, and is formed by winding a metal shaft with a foamed elastic member of an intermediate electric resistance.

Figure 9:
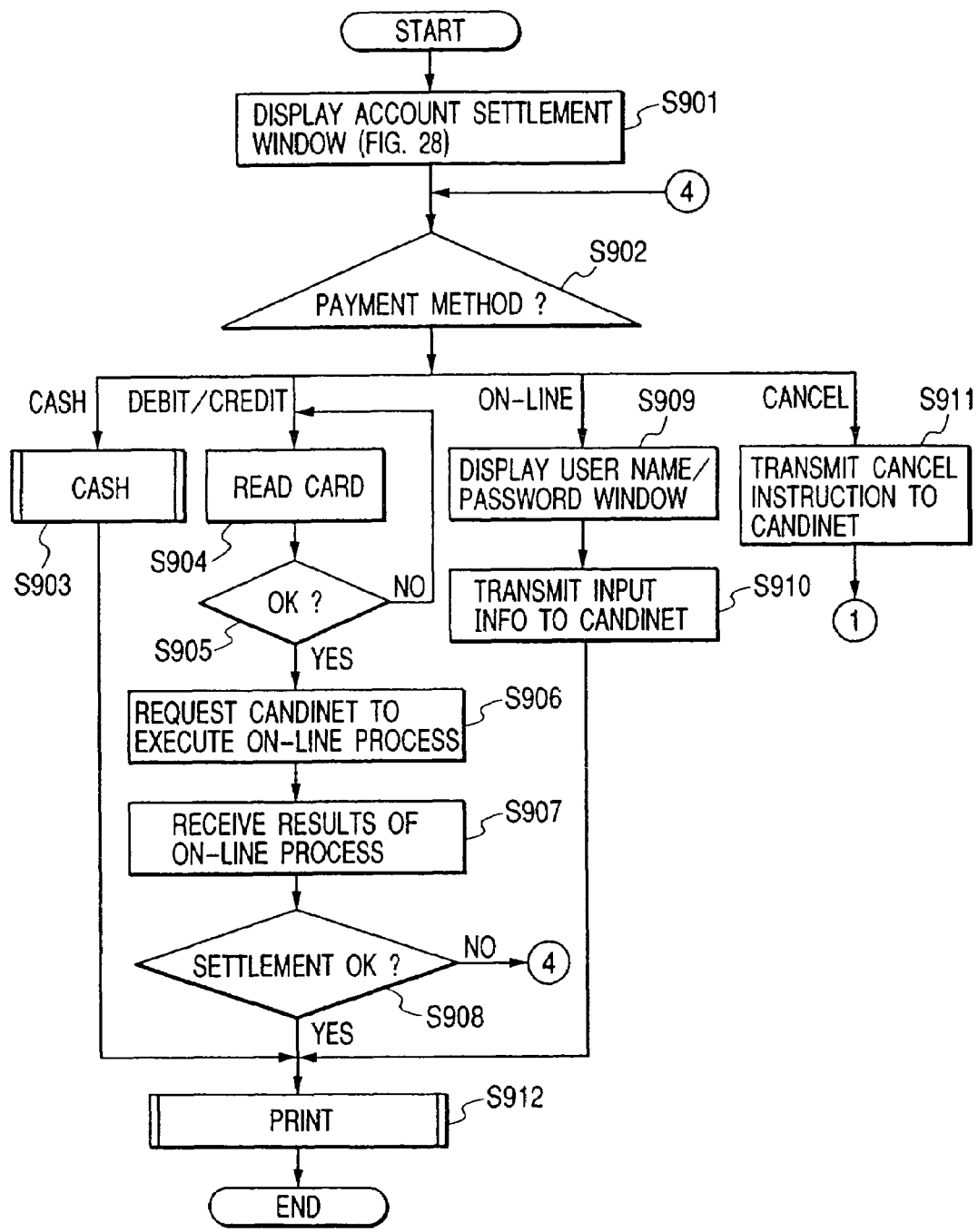
FIG. 9 is a flow chart showing the control sequence of the kiosk terminal 110 in an accounting process.

The transfer roller 50 is separated downwards as indicated by solid lines in FIG. 9 in order not to disturb the visible color image during the multiple transfers thereof onto the intermediate transfer member 49. After the formation of the visible color image on the intermediate transfer member 49, the transfer roller 50 is shifted upwards as indicated by broken lines by a cam member (not shown) at the timing of transfer of the visible color image onto the transfer material 42. Thus the transfer roller 50 is pressed with a predetermined pressure to the intermediate transfer member 49 across the transfer material 42 and is given a bias voltage, whereby the visible color image on the intermediate transfer member 49 is transferred onto the transfer material 42.

The fixing unit 25 is to fix the transferred visible color image and is provided with a fixing roller 26 for heating the transfer material 42 and a pressure roller 27 for pressing the transfer material 42 to the fixing roller 26. The fixing roller 26 and the pressure roller 27 are hollow in structure and are respectively provided with heaters 28, 29 therein.

The transfer material 42 bearing the visible color image is conveyed by the fixing roller 26 and the pressure roller 27 and is subjected to the application of heat and pressure whereby the toner is fixed to the surface.

After the fixation of the visible image, the transfer material 42 is conveyed by discharge rollers 34, 35, 36 to a discharge unit 37 whereupon the image forming operation is terminated.

The cleaning means is to remove the toner remaining on the photosensitive drum 55 and the intermediate transfer member 49. The used toner remaining after the transfer of the visible image from the photosensitive drum 55 onto the intermediate transfer member 49 and that remaining after the transfer of the 4-color visible images from the intermediate transfer member 49 to the transfer material 42 are stored in a cleaner container 54.

The transfer material 42 for printing (recording sheet) is taken out from a sheet feeding tray 41 by a sheet feeding roller 43, then conveyed by pinching between the intermediate transfer member 49 and the transfer roller 50 for image recording, and is passed by the fixing unit 25 for fixing the toner image. In case of one-side printing, a guide 35 forms a conveying path for guiding the recording sheet to the upper discharge unit, but, in case of two-side printing, the guide 35 forms a conveying path for guiding the recording sheet to a two-side unit positioned below.

The recording sheet conveyed into the two-side unit is forwarded under the tray 41 (path indicated by chain lines) by a conveying roller 40, then conveyed in the opposite direction and fed to a two-side tray 39. On the tray 39, the sheet is inverted from the state on the sheet feeding tray 41, and the leading and trailing ends of the sheet are inverted with respect to the conveying direction. In this state the sheet is subjected again to the transfer and fixation of the toner image whereby two-side printing can be realized.

The printer is not limited to the electrophotographic printer of the above-described type but can be an electrophotographic printer of 4-drum type, a thermal transfer printer, so-called bubble jet printer emitting liquid droplets by film boiling based on thermal energy, or an ink jet printer of piezo type.

Figure 4:
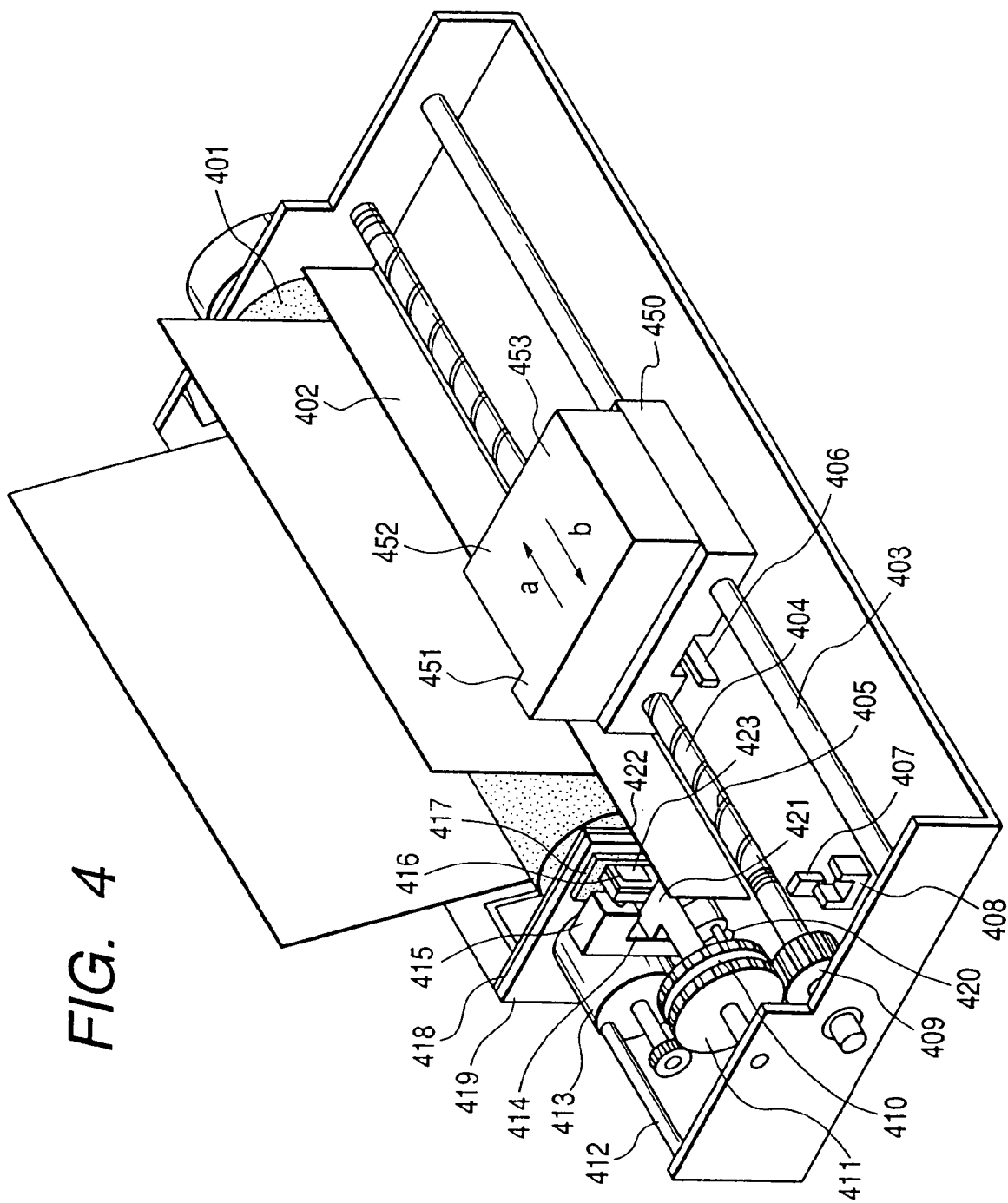
FIG. 4 is a schematic view of an ink jet printer capable of feeding prints sheets (not shown) of plural kinds.

FIG. 4 is a schematic view of an ink jet printer capable of feeding unrepresented recording sheets of plural types. In FIG. 4, a carriage 450 engaging by an unrepresented pin thereof with a spiral groove 404 of a lead screw 405, which is rotated in forward or reverse direction by the rotation of a driving motor 413 through transmission gears 411, 409, executes reciprocating motion in directions a and b. The carriage 450 supports an ink jet cartridge 451.

A paper pressing plate 402 presses the recording sheet to a platen 400 along the moving direction of the carriage. Photocouplers 407, 408 constitute home position detecting means for detecting the presence of a lever 406 of the carriage in the corresponding area, thereby switching the rotating direction of the motor 413.

A member 416 supports a cap member 422 for capping the front face of the recording head. Suction means 415 for sucking the interior of the cap executes suction recovery of the recording head through an aperture 423 in the cap.

A supporting plate 418 supports a cleaning blade 417 and a member 419 for moving the cleaning blade forward and backward. The blade is not limited to the illustrated form but may naturally assume any known form. A lever 421 for initiating the suction recovery operation is moved by the movement of a cam 420 engaging with the carriage, whereupon the driving force from the driving motor is controlled by known transmission means such as a clutch.

The capping, cleaning and suction recovery are executed at respective positions of the carriage by the function of the lead screw 405 when the carriage reaches an area of the side of the home position, but any configuration may be applied to the present embodiment as long as the desired operation is executed at the known timing.

In the present invention, plural equipment (for example a host computer, an interface equipment, a reader, a printer etc.) may be integrally constructed.

The objects of the present invention can naturally be attained also in a case where the program codes of a software realizing the functions of the embodiments or a memory medium storing such program is supplied to a system or an apparatus and such program codes are read and executed by a computer (CPU or MPU) of the above-mentioned system or apparatus.

In such case the program codes themselves of the software realize the novel functions of the aforementioned embodiment, and the memory medium storing the program codes and the program itself constitute the present invention. The memory medium storing such program codes can be, for example, a floppy disk, a hard disk, an optical disk, a magnetooptical disk, a CD-ROM, a CR-R, a DVD, a magnetic tape, a non-volatile memory card or a ROM.

The present invention also includes not only a case where the functions of the aforementioned embodiment are realized by the execution of the program codes read by the computer but also a case where an operating system or the like functioning on the computer executes all or a part of the actual processes under the control of such program codes thereby realizing the functions of the aforementioned embodiment. The present invention further includes a case wherein the program codes read from the memory medium are once stored in a function expansion board inserted into the computer or a function expansion unit connected to the computer, and a CPU provided in the function expansion board or the function expansion unit executes all the process or a part thereof under the control of such program codes, thereby realizing the functions of the aforementioned embodiment.

(P-code of Information Provider)

In the present embodiment, in case the information provider 130 wishes to provide information, the provider applies for registration to the CanDINet control unit 100 and issuance of a P-code. In this process, the information provider 130 makes access to the CanDINet control unit 100 and enters information necessary for registration in registration display images shown in FIGS. 71 to 78.

At first, in a registration display image shown in FIG. 71, there are entered name and contact address of the information provider 130.

Figure 72:
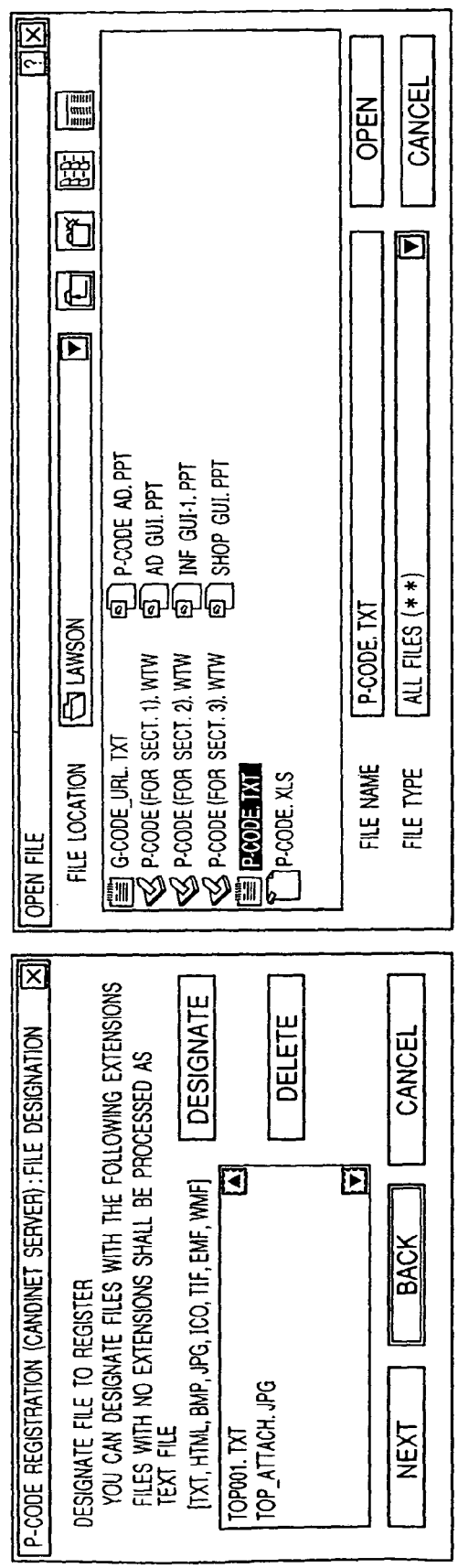
FIG. 72 is a view showing a registration display image for designating image data or text data for information providing.
Figure 73:
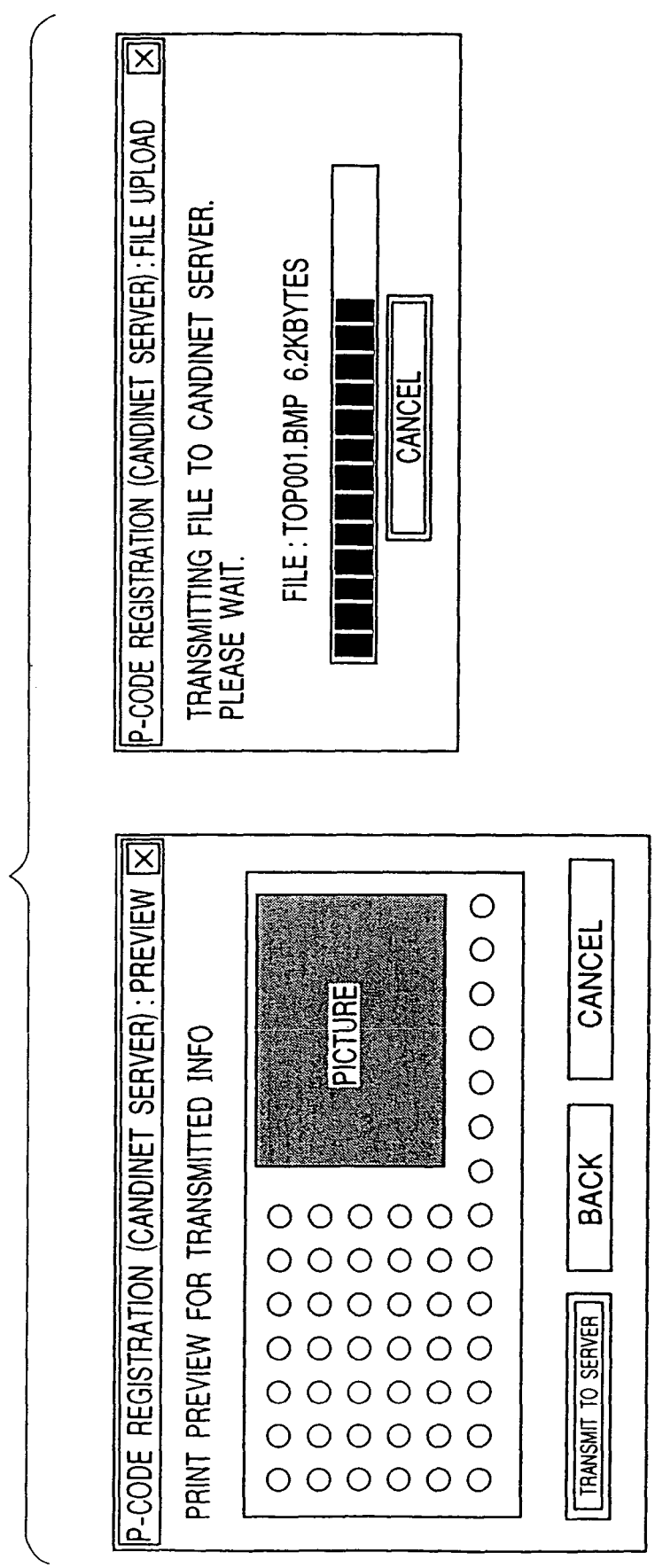
FIG. 73 is a view showing a preview display image indicating how the image data are printed from the kiosk terminal.
Figure 78:
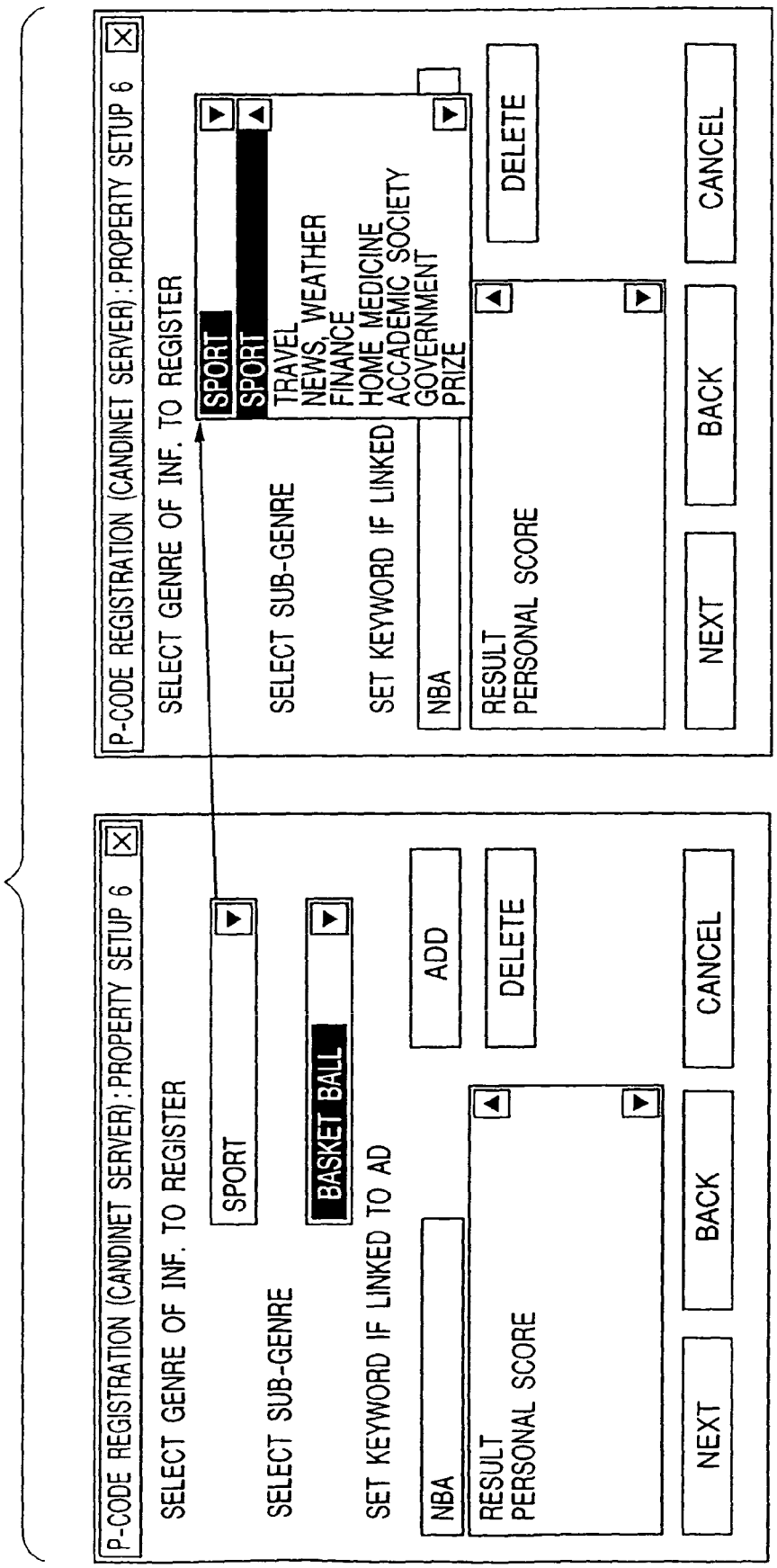
FIG. 78 is a view showing a registration display image for the information provider to register the information to be provided with the information data.

In a registration display image shown in FIG. 72, the information provider 130 designates the image data or text data (hereinafter collectively called information data) for providing information, whereupon there is displayed a preview image (FIG. 73) showing how the image data are printed from the kiosk terminal 110. If the preview image is acceptable, the information provider 130 depresses a "Transfer to server" button, whereby the information data are transferred to the CanDINet control unit 100.

Figure 74:
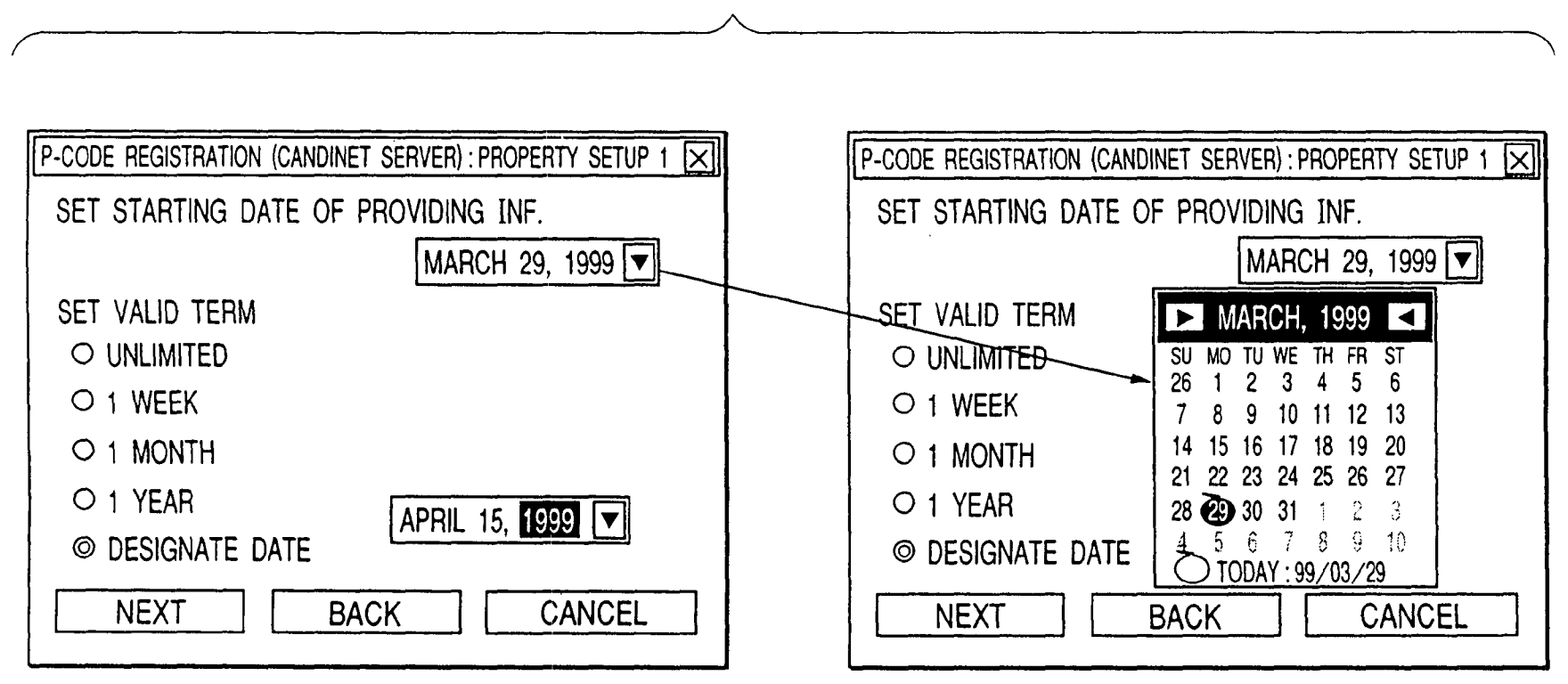

In a registration display image shown in FIG. 74, the information provider 130 designates the starting date and effective term of information providing. When the effective term after the starting date expires, the information data are no longer printed out from the kiosk terminal 110. Otherwise, even if the information data are requested to the CanDINet control unit 100 from the kiosk terminal 110, the information data are no longer transferred to the kiosk terminal 110. In the registration image shown in FIG. 75, the information provider 130 designates the character size and image size when the information data are printed. The example shown in FIG. 75 indicates that the character size is variable from 8 to 14 pt. and the image can be reduced or enlarged within a range from 50 to 200% in the printing of the information data.

In the registration display image shown in FIG. 76, the information provider designates whether or not to permit printing of the advertisement on the same paper at the printing of the information data, and whether a password is required for printing the information data. Also in case of permitting advertisement printing, there can be designated permission of printing on the back surface.

Also in case the information providing is to be charged, the fee is set in the registration display image shown in FIG. 77. Finally, in the registration display image shown in FIG. 78, the information provider 130 registers the mode of information providing in the CanDINet control unit 100. There are selected a genre and a sub genre, depending on the content of the information data to be provided. Also there is entered a keyword for determining the kind of the advertisement, in case the advertisement is inserted in the printout of the information data.

When the information provider 130 completes the registering operation on the registration display images shown in FIGS. 71 to 78, the CanDINet control unit 100 issues a P-code for the above-mentioned information data. Also, based on the information entered in the registration display images, an IP information registration table regarding such P-code is prepared and stored in a P-code DB (P-code database).

FIG. 46 shows an example of the IP information registration table 4601, which contains the P-code at the left end column, and stores the basic property of the information data corresponding to the P-code. The owner ID of the basic property is linked with an owner information table for the information providing having this P-code. FIG. 51 shows an example of the owner information table, which stores the information entered by the information provider 130 on the registration display image shown in FIG. 71.

(P-code of User)

In the present embodiment, when the user applies for registration to the CanDINet control unit 100, it can issue a personal IP-code to such user (hereinafter called user P-code). The user P-code is used in the mail print service, information registration service (data deposit service) and personal information service, which will be explained later in more details.

The user makes access to the CanDINet control unit 100 from the kiosk terminal 110 or a personal computer at home, and enters information necessary for registration on the registration display images shown in FIGS. 58 to 63.

At first, in the registration display image shown in FIG. 58, the user enters name and contact address. In the registration display image shown in FIG. 59, there is entered a password necessary for changing the content of the user registration. The password is set at a new registration, and the password entered at the new registration is entered if the content of registration is to be changed thereafter.

Figure 60:
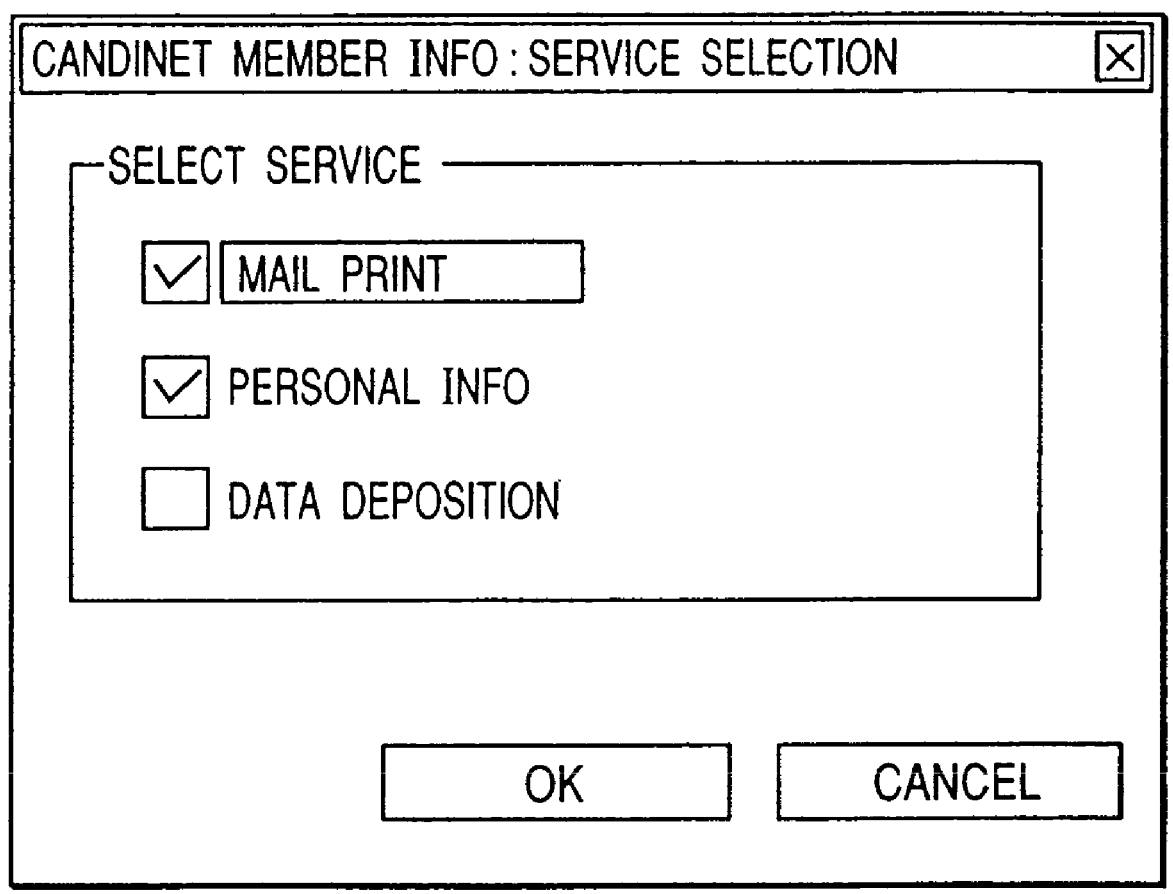
FIG. 60 is a view showing a registration display image for designating the service to be assigned to the issued P-code.
Figure 62:
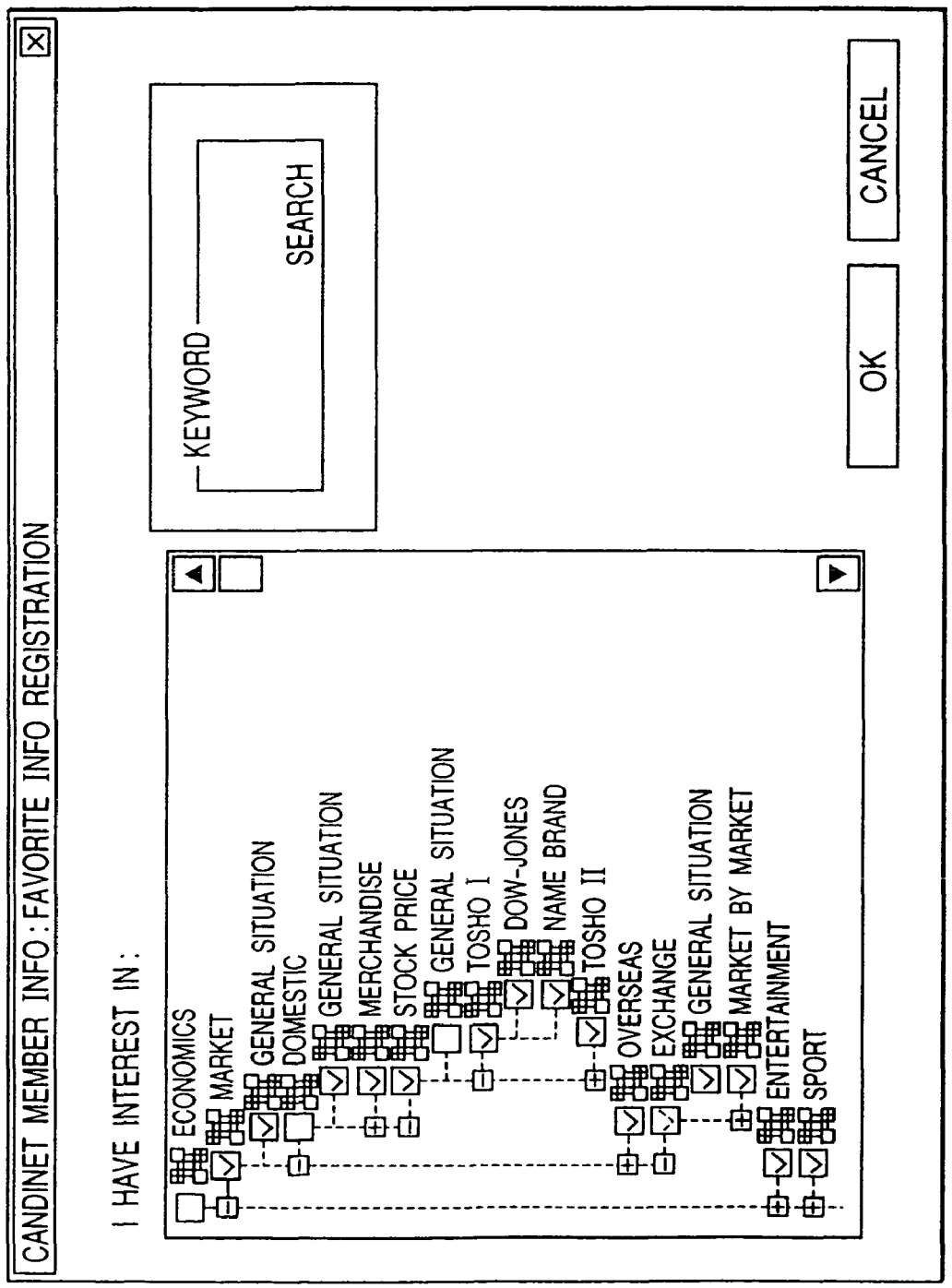
FIG. 62 is a view showing a registration display image for registering the information, interesting to the user, in the CanDINet control unit 100.

In the registration display image shown in FIG. 60, the user designates the service for which the P-code to be issued is to be used. In the registration display images shown in FIGS. 61 and 62, the personal information of the user is entered. Particularly in the image shown in FIG. 62, the user can register the interesting information in the CanDINet control unit 100.

Figure 63:
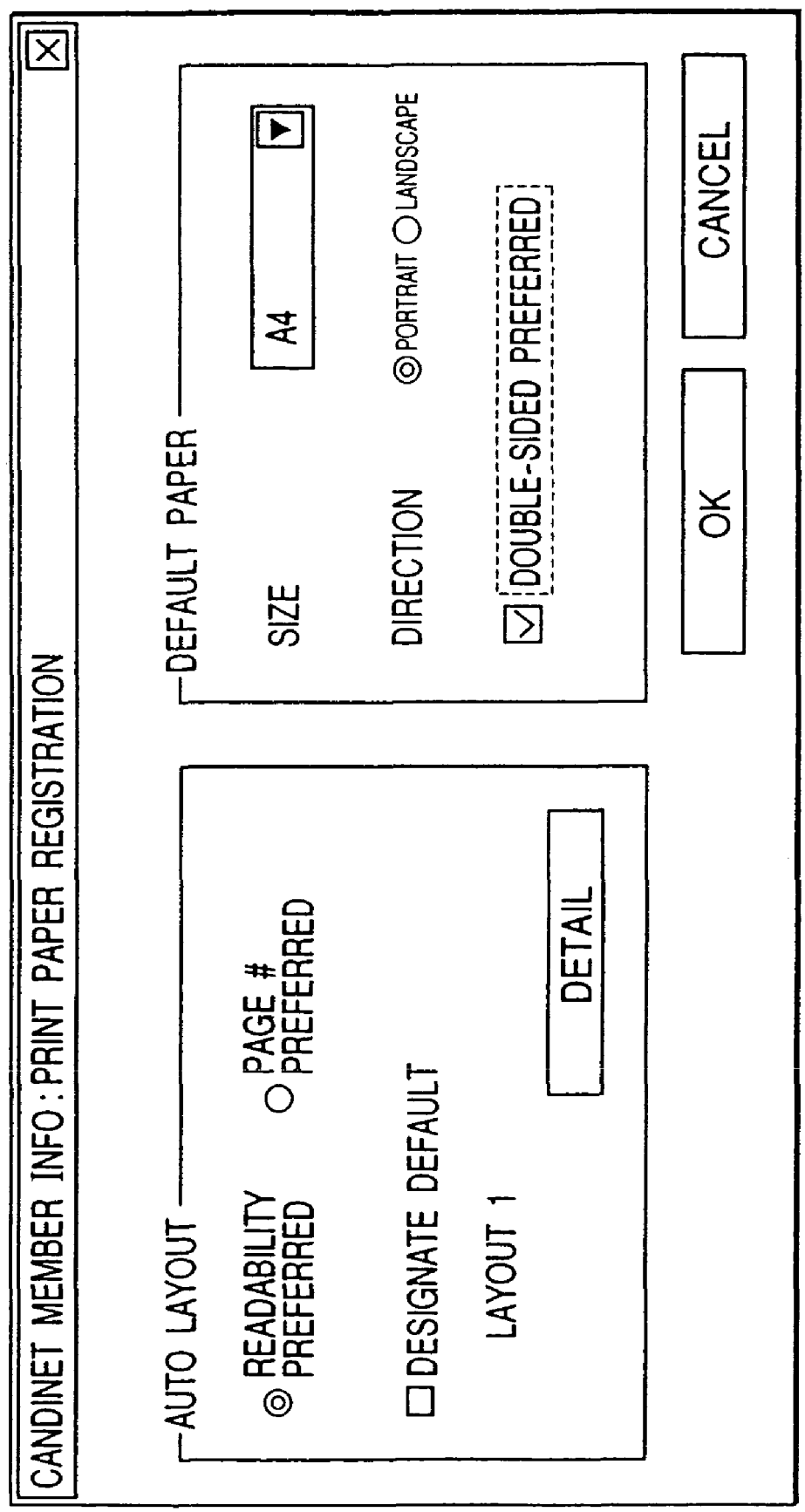
FIG. 63 is a view showing a registration display image for designating the priority condition and the layout in the printout.
Figure 67:
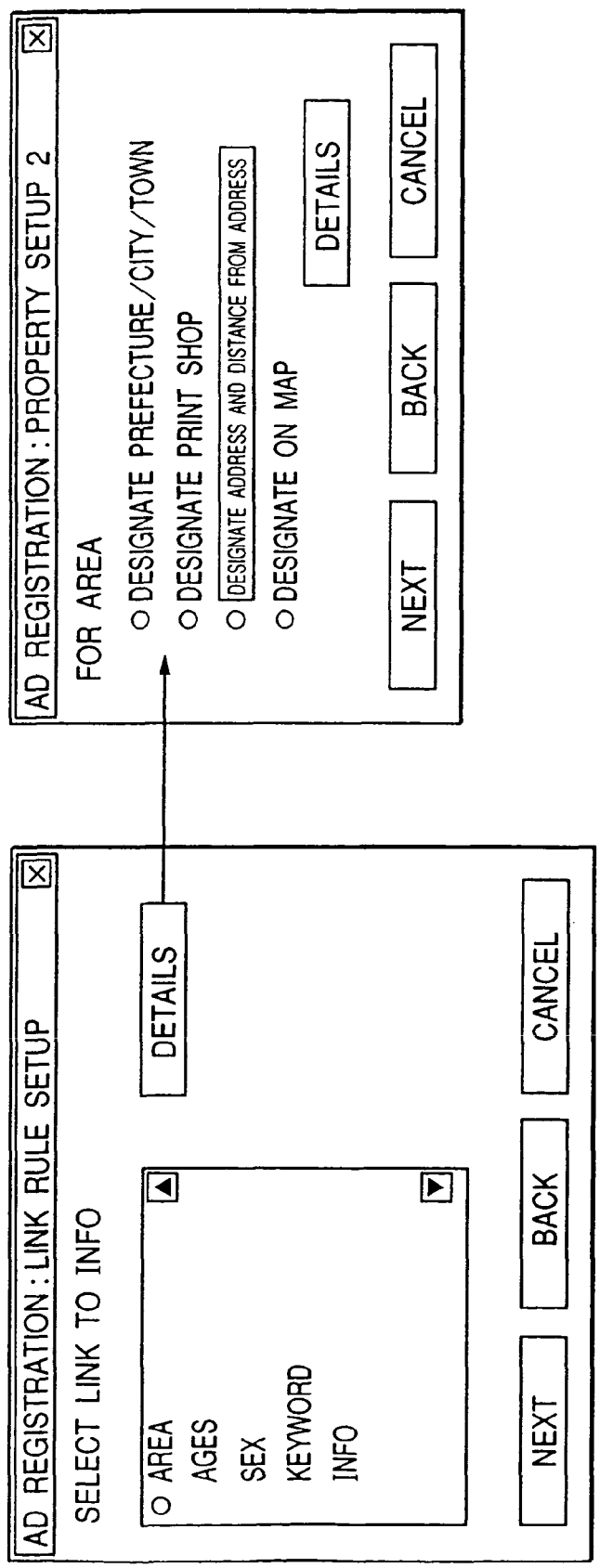
FIG. 67 is a view showing a registration display image for limiting the area where the advertisement data are printed.

Finally, on the registration display image shown in FIG. 63, the user designates whether the printout of the information by the kiosk terminal 110 is executed preferentially with legibility or page or with a default layout. In this display image there can also be designated the size and direction of the sheet in the information printout. In this display image, there can also be designated whether the two-side printing is executed preferentially if the two-side printing is required for printing the information or the advertisement.

When the user completes the registering operation on the registration display images shown in FIGS. 58 to 63, the CanDINet control unit 100 issues a P-code to the user. Also a user information table regarding such P-code is prepared and stored in the P-code DB (P-code database).

FIGS. 48A and 48B show an example of the user information table 4801, which contains the P-code at the left end column, and also stores the user property of the user having the P-code, a personal information table on such user, and information required when the P-code is used for the mail service, information registration service (delivery service) and personal information service. The personal information table is linked with the personal information table on the user having the P-code. FIG. 50 shows an example of the personal information table 5001, which stores the information entered by the user on the registration display image shown in FIGS. 58 to 63.

(Process of Kiosk Terminal)

Figure 5:
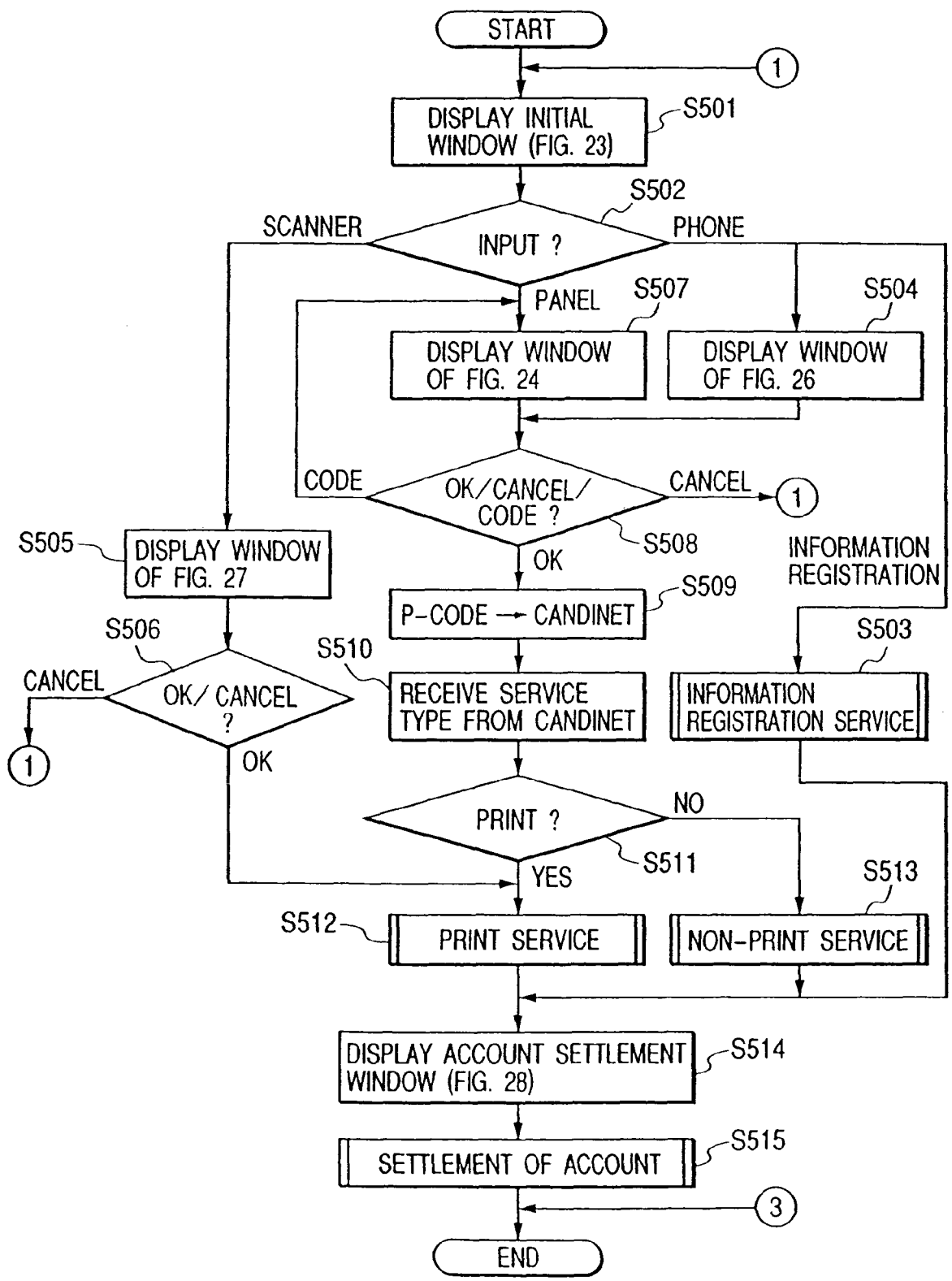
FIG. 5 is a flow chart showing the process sequence of the kiosk terminal 110.
Figure 26:
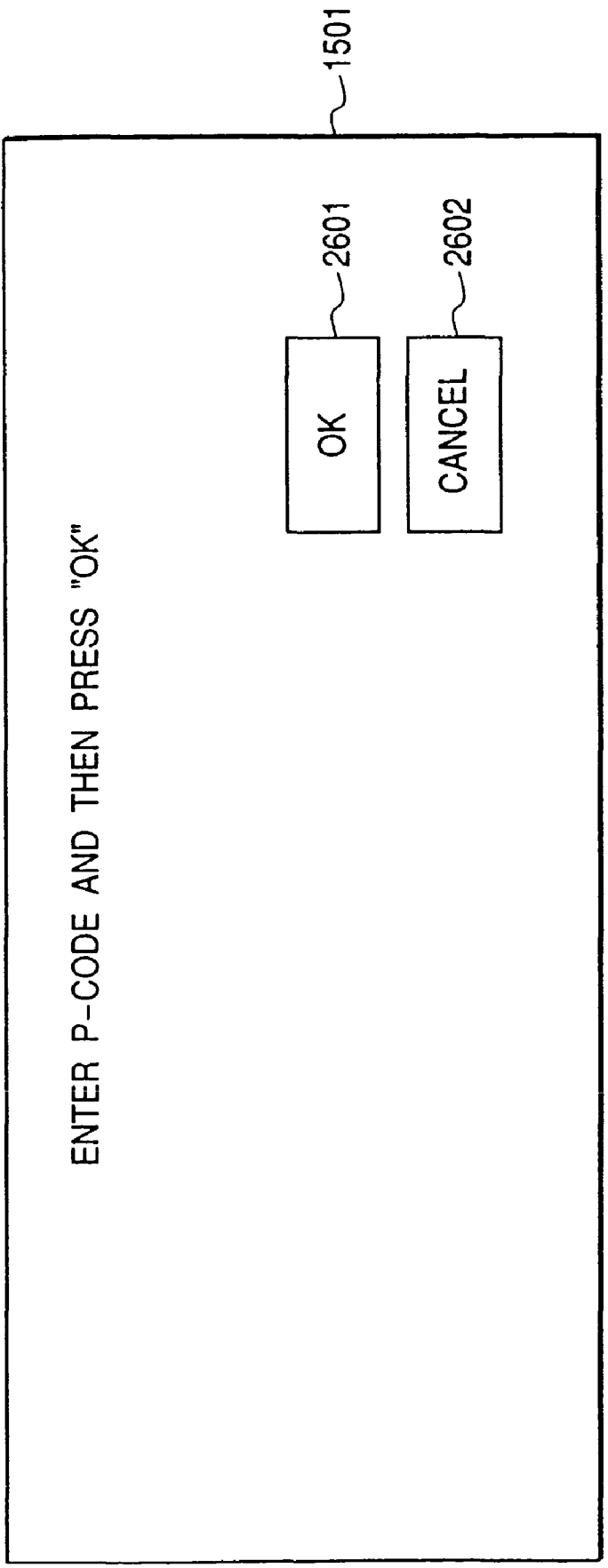
FIG. 26 is a view showing a display image for code input from a mobile telephone.

In the following there will be explained the process operations of the kiosk terminal 110. FIG. 5 is a main flow chart showing the process sequence of the kiosk terminal 110 after the user starts using the kiosk terminal 110. At first, when the user stands in front of the kiosk terminal 110, the panel of the operation unit 251 displays an initial display image shown in FIG. 23 (step S501), including three buttons 2301, 2302, 2303 for selecting the input method for P-code and a button to be used when the user wishes to utilize the information registration service. When the user depresses any of these buttons, the kiosk terminal 110 discriminates the depressed button (step S501). If the button 2302 for "input from mobile telephone" is depressed (step S501—telephone), there is displayed an image shown in FIG. 26. In response the user enters the P-code from an information terminal 120 such as a mobile telephone and depresses an "OK" button, whereupon the sequence proceeds to a step S508.

Figure 27:
FIG. 27 is a view showing a display image for code input by a handy scanner.

If the button 2303 for "input from handy scanner" is depressed (step S502—scanner), there is displayed an image shown in FIG. 27 (step S505).

In response the user uses the scanner to read a code on a handy scanner code table, provided at a side of the kiosk terminal 110, and when the kiosk terminal 110 discriminates that the user has then depressed an "OK" button (step S506—OK), the sequence shifts to a step S512. As the handy scanner code table only contains the P-code for the information print service, there is immediately initiated the process of the information print service. If there is discriminated that the user has depressed a "cancel" button (step S506—cancel), the sequence returns to the step S501 for displaying the initial image.

If a "Press here for information registration service" button is depressed on the initial image (step S501—data deposit), the sequence shifts to the process of the information registration service (also called data deposit service).

Figure 24:
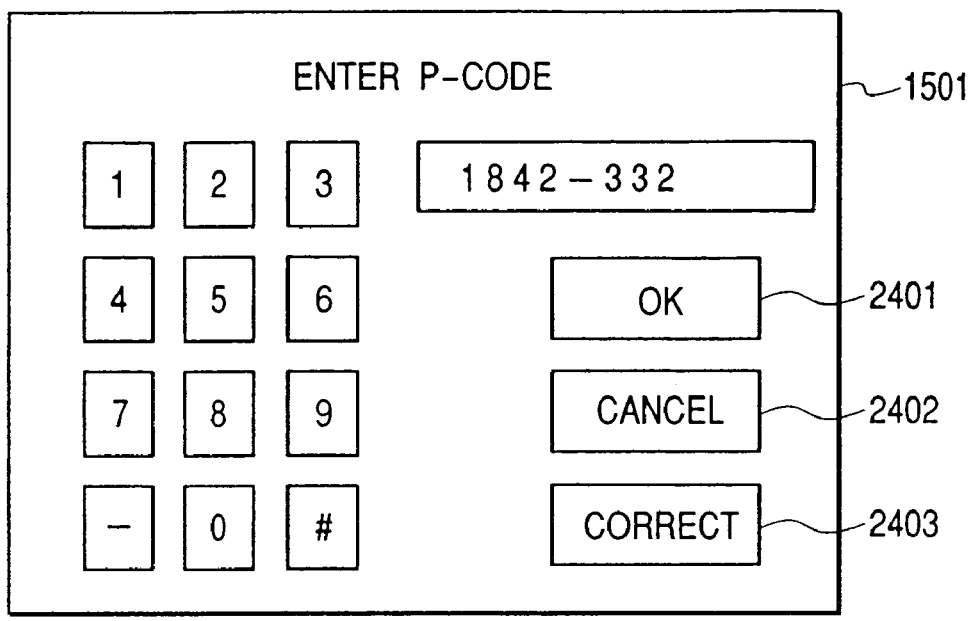
FIG. 24 is a view showing a code input display image.
Figure 25:
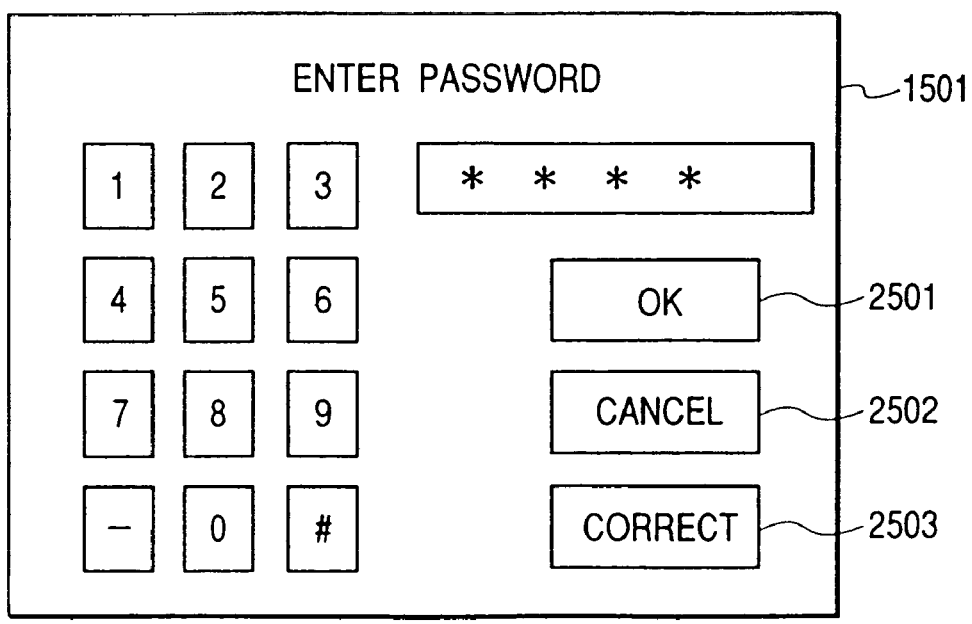
FIG. 25 is a view showing a password input display image.

If an "Input by touch panel" button is depressed on the initial image (step S502—touch panel, there is displayed a code input image shown in FIG. 24. The display contains numeral keys for entering the code and "OK", "cancel", "correction" and "code input" buttons, and the depressed button is discriminated (step S502). If a numeral key is depressed, a character or a number corresponding to the depressed key is displayed. If the "correction" key is depressed, the displayed code is canceled.

If the "cancel" button is depressed (step S508—cancel), the sequence returns to the step S501 for displaying the initial image. If the "code input" button is depressed (step S508—code input), the currently entered code is stored in the RAM 219, and the code input image is displayed anew for enabling the user to enter a next code (step S507).

If the "OK" button is depressed (step S508—OK), the code entered by the user and stored in the RAM 219 is transferred to the CanDINet control unit 100 (step S509). The CanDINet control unit 100 discriminates the service type from the received code and the kiosk terminal receives the result of discrimination service type) (step S510).

Then there is discriminated whether the received service type is the information print service (also called information service) (step S511). If not, there is executed another service process (step S513).

If the received service type is the information print service (step S511—Yes), there is executed the process of the information service (step S512), which will be explained later in more details.

Figure 28:
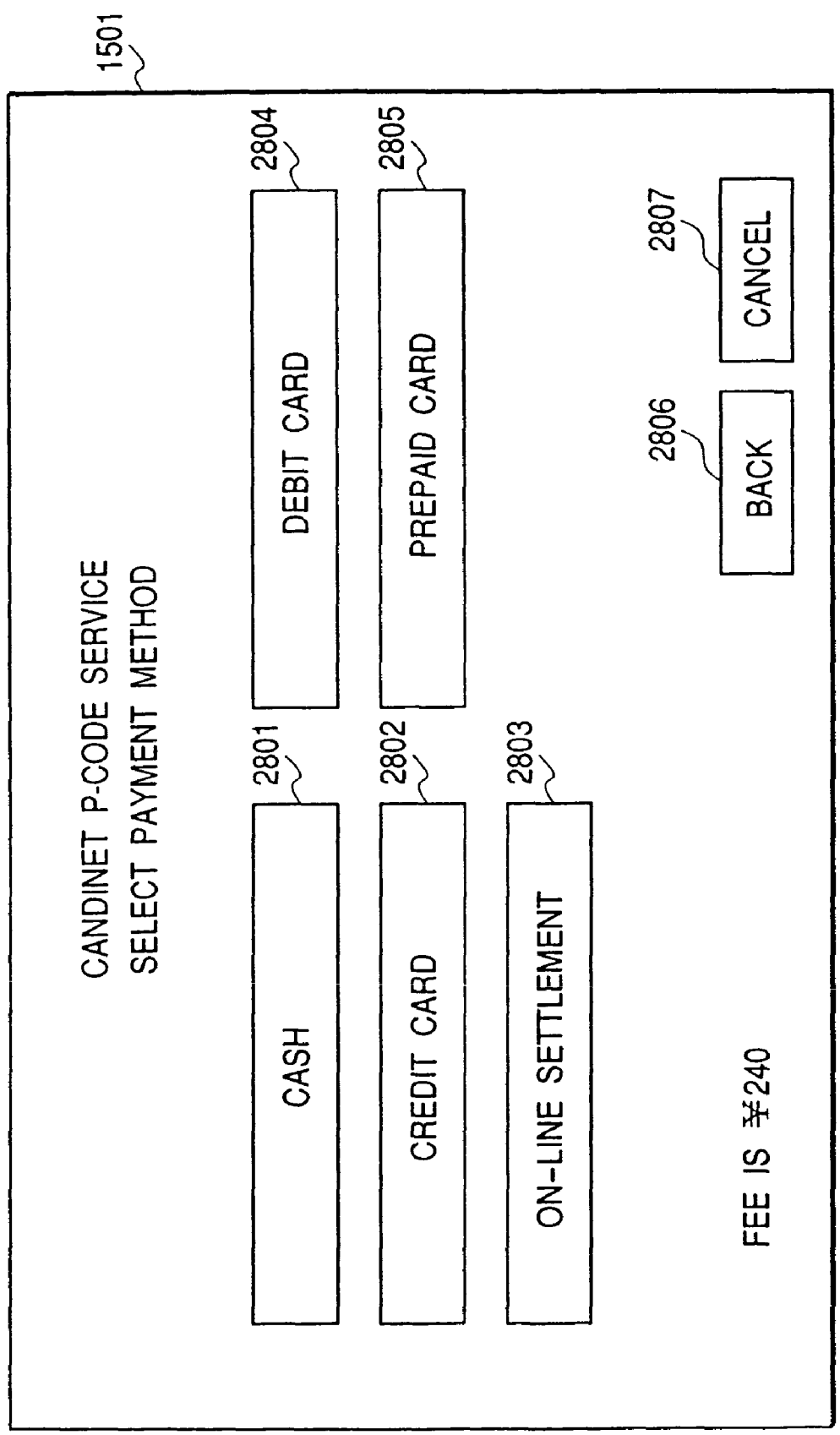
FIG. 28 is a view showing a display image for an accounting process.

When the process of each service is terminated at the step S512 or S513, there is displayed an account setting image shown in FIG. 28 (step S514) and a process for charge settling is executed (step S515). If the service charge becomes free in the course of the service process, the steps S514 and S515 are skipped and the main flow is terminated from ③.

In the following there will be explained the function of the kiosk terminal 110 in each service process and charge settling process.

(Information Service Process)

Figure 6:
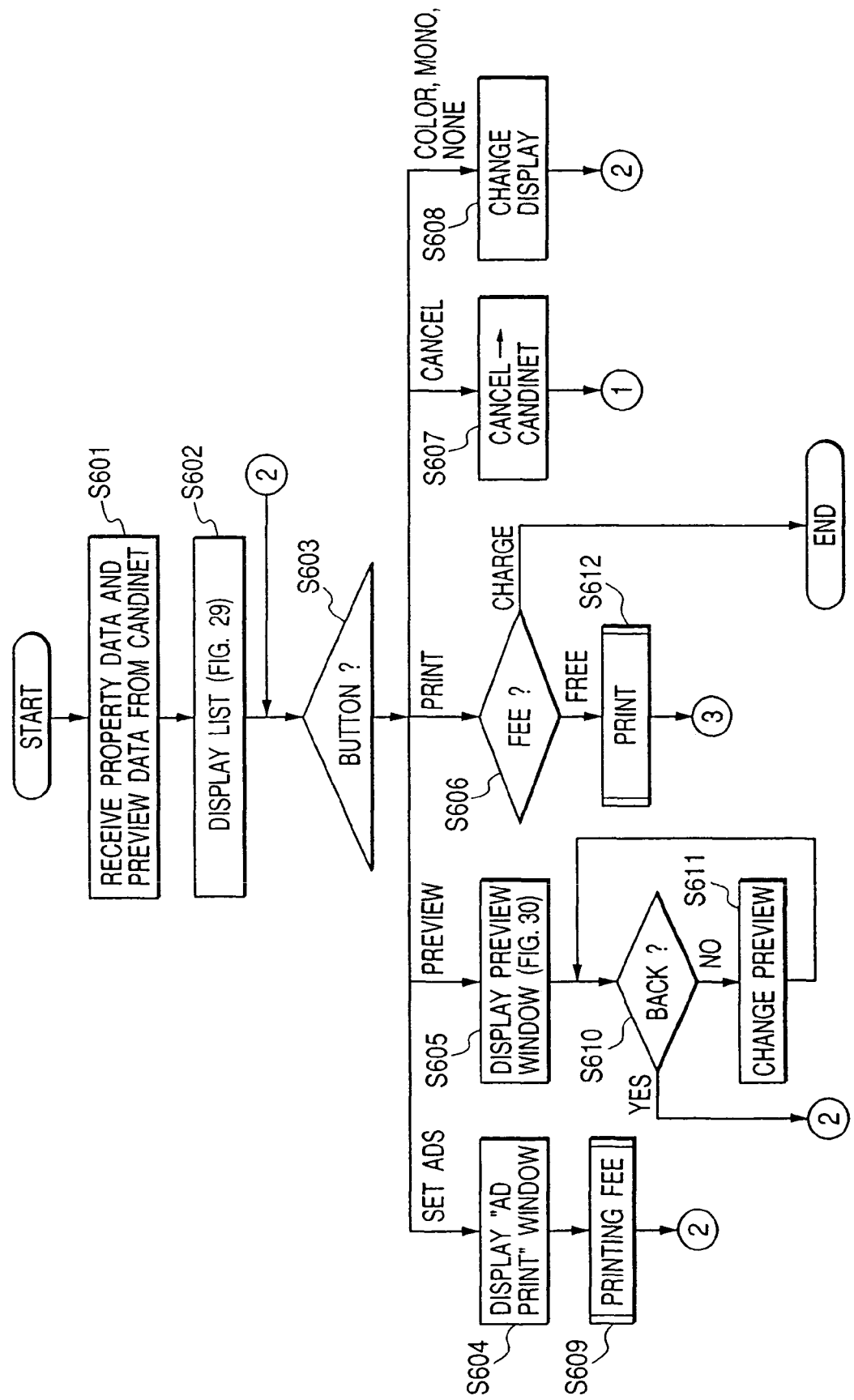
FIG. 6 is a flow chart showing the control sequence of the kiosk terminal 110 in providing an information processing service.

FIG. 6 is a flow chart showing the function of the kiosk terminal 110 in providing the information service. At first it receives, with respect to the P-code transmitted in step S509 in FIG. 5, the property data and preview image data of the information corresponding to the P-code, from the CanDINet control unit. The property data includes the title (file name) of the information, charge, number of sheets in printing, etc.

Figure 29:
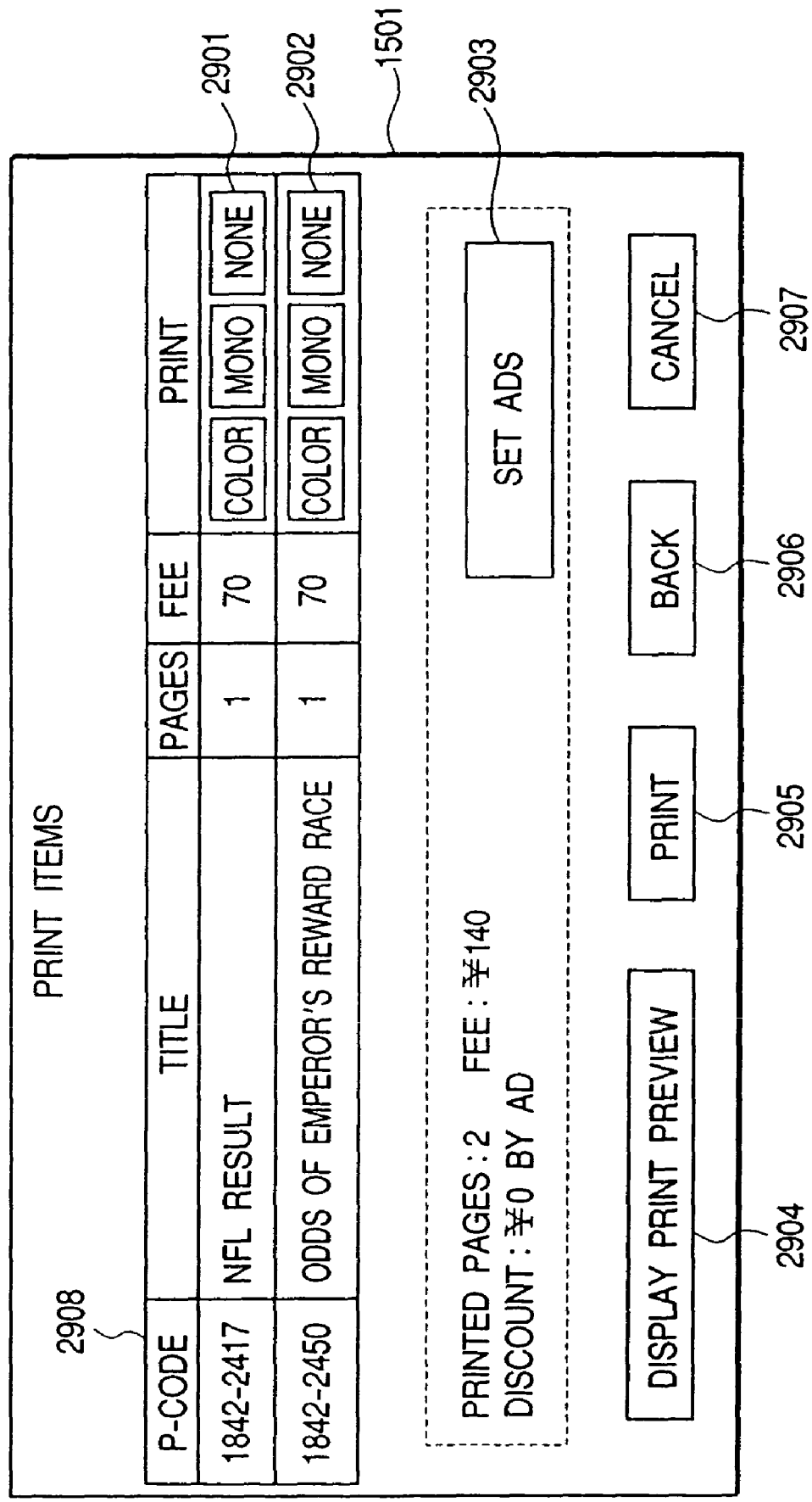
FIG. 29 is a view showing list display image.

Then, based on the acquired data, there is displayed a list image shown in FIG. 29. The list image in FIG. 29 includes an information list 2908 corresponding to the P-code entered by the user, print setting buttons 2901, 2902 corresponding to the list items, an "advertisement setting" button 2903, a "print preview display" button 2904, a "print" button 2905, a "return" button 2906 and a "cancel" button 2907.

The kiosk terminal 110 discriminates the button depressed by the user (step S602). If the print setting button is depressed (step S603—"color", "monochrome", "none"), there is memorized the depressed button among "color", "monochrome" and "none", and the display is changed accordingly. The "color", "monochrome" and "none" buttons respectively indicate whether the information corresponding to the P-code is printed in color, in monochrome or not printed. It is assumed that "color" is selected for all the P-codes at the step S29.

If the "cancel" button is depressed (step S603—cancel), an instruction for cancellation is transmitted to the CanDINet control unit and the sequence returns to the step S501 in FIG. 5.

Figure 30:
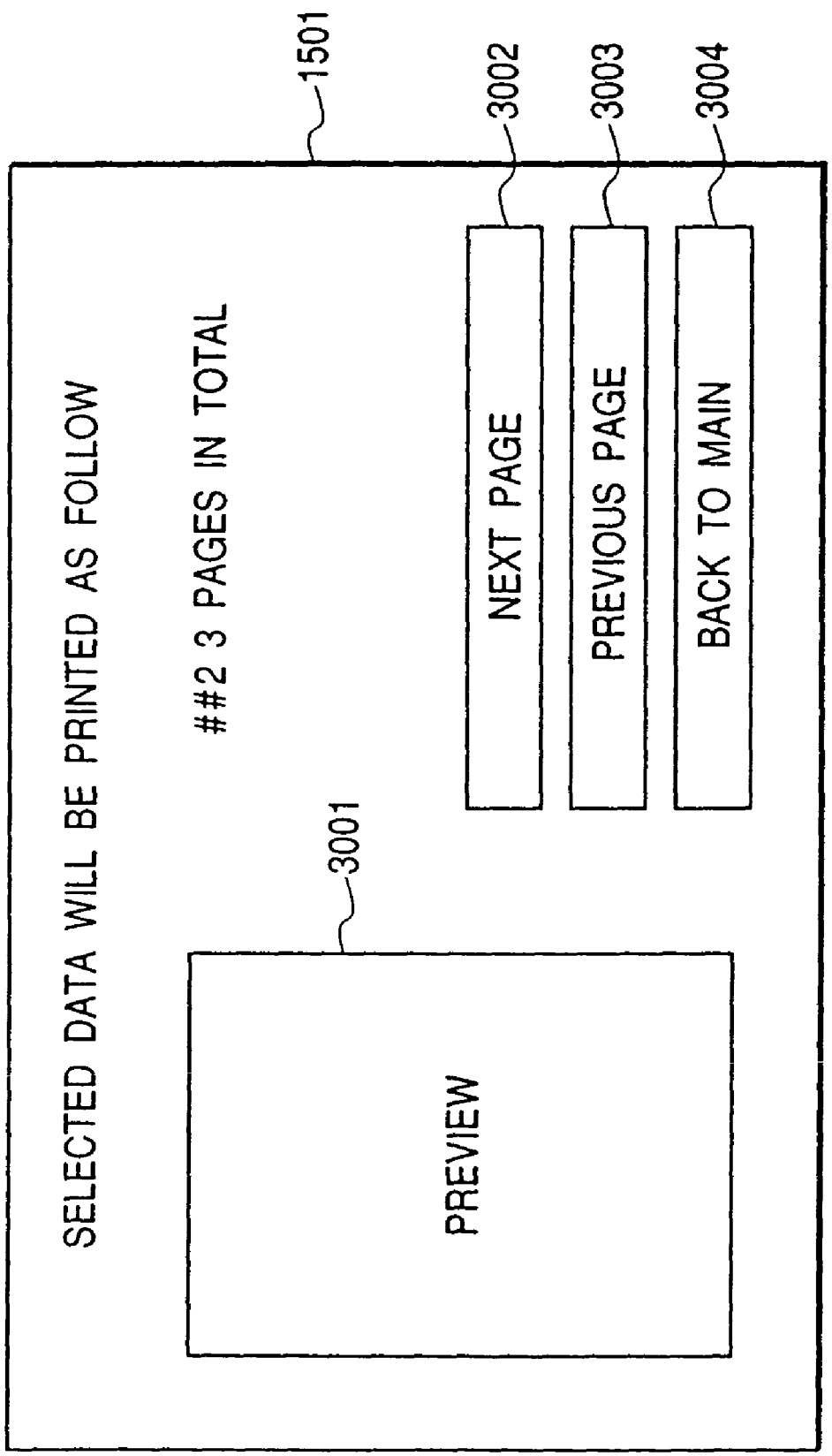
FIG. 30 is a view showing a preview display image.

If the "print preview display" button is depressed (step S603—preview), a preview image shown in FIG. 30 is displayed, based on the preview image data received in the step S601. The preview image includes a preview image 3001 schematically showing the information to be printed, a "next page" button for displaying the preview image of the next page, a "previous page" button for displaying the preview image of the previous page, and a "return to main image" button for returning to the above-mentioned list image. The kiosk terminal 110 discriminates the button depressed in the preview image (step S610).

If the "next page" or "previous page" button is depressed (step S610—No), there is displayed the preview image of the next or preceding page. If the "return to main image" button is depressed (step S610—Yes), there is displayed the list image shown in FIG. 29 and the sequence returns to the step S603.

In the foregoing description, the step S605 displays the preview image received in the step S601, but there may be displayed a preview image in consideration of the output format of the advertisement selected by the user in the "advertisement setting" to be explained in the following. In such case, the output format of the advertisement, currently selected by the user, is transferred to the CanDINet control unit, thereby causing the CanDINet control unit to prepare the preview image data with the advertisement. Then such image data are received to display the preview image with advertisement.

If the "advertisement setting" button is depressed in the list image shown in FIG. 29 (step S603—advertisement setting), there is displayed an "advertisement setting" image as shown in FIG. 31 (step S604), and there is executed a process for print charge settling (step S609).

(Print Charge Process)

In the print service, the user pays a print charge, including the service charge, at the printing of the information provided by the information provider 130. However, if an advertisement is inserted in the print, a part of the print charge is borne by the advertisement, so that the print charge is reduced. The amount of reduction of the print charge varies according to the mode of insertion of the advertisement and the amount thereof.

Consequently, in the "advertisement print" image shown in FIG. 31, the user can select the output format of the advertisement in consideration of the reduction of the print charge. The "advertisement print" image includes "yes", "no" buttons 3101 for selecting whether or not to print the advertisement in an empty space of the information, "yes", "no" buttons 3102 for selecting whether or not to print the advertisement on the back surface, "yes", "no" buttons 3103 for selecting whether or not to print the advertisement on another page, an "OK" button and a "cancel" button.

Figure 7:
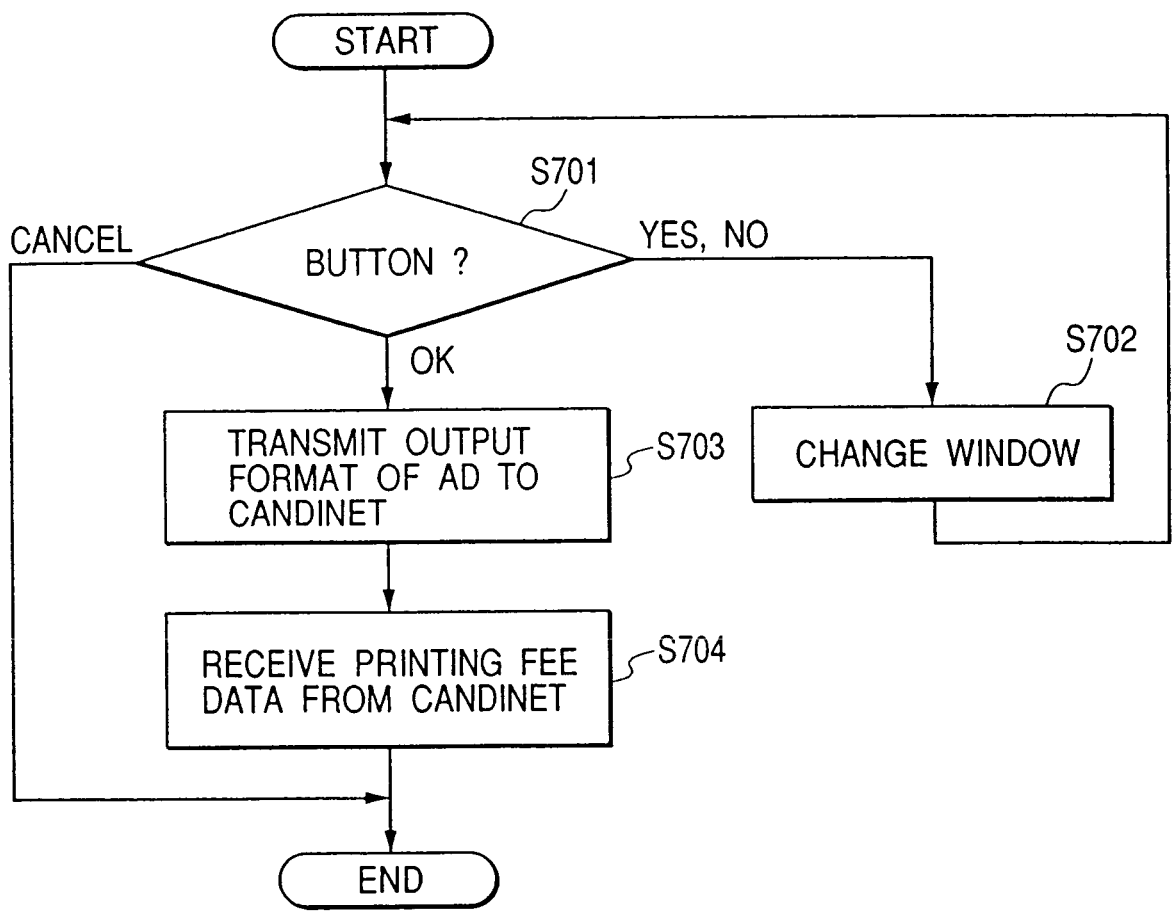
FIG. 7 is a flow chart showing the control sequence of the kiosk terminal 110 in a print fee accounting process.

FIG. 7 is a flow chart showing the function of the kiosk terminal 110 in the print charge process. At first there is discriminated the button depressed on the "advertisement print" image (step S701). If "yes" or "no" button is depressed (step S701—yes, no), there is memorized the selected output format, and the display is so changed that the depressed one of "yes" and "no" buttons is made clear to the user.

If the "cancel" button is depressed (step S701—cancel), the process is terminated without the advertisement setting. If the "OK" button is depressed, the output format of the advertisement is transmitted to the CanDINet control unit (step S703) and there is received a print charge in consideration of the output format of the advertisement.

In case the advertisement is not inserted, the CanDINet control unit 100 calculates the print charge, based on the charge entered by the information provider on the registration display image shown in FIG. 77 and stored in the information price column of the IP information registration table shown in FIG. 46. In this operation, the print charge is calculated in consideration of the fee for monochromatic or color printing and the fee for the print sheet, according to the print setting shown in FIG. 29.

In case the advertisement is inserted, the CanDINet control unit 100, after the above-mentioned calculation of the print charge, subtracts the charge discount for advertisement insertion from thus calculated print charge, thereby obtaining the print charge anew. The charge discount varies according to the amount of advertisement insertion and whether the advertisement is printed on the front or back surface.

However, if the charge after deduction of the discount charge from the normal print charge becomes negative, the print charge is set at zero or at a predetermined value.

Upon completion of the print charge process, the list image is displayed with a suitably changed print charge in the column 2903, and the sequence returns to a step S603 in FIG. 6.

(Printing Process)

If the "print" button is depressed in the list image shown in FIG. 29 (step S603—printing, in FIG. 6), there is discriminated whether the printing is currently charged or free. The print charge is calculated from the charge for the information corresponding to the P-code received in the step S601, the print charge in consideration of the advertisement received in the step S704.

If the printing is to be charged, the information service process is terminated and the sequence shifts to a step S514 in FIG. 5. If the printing is free of charge, the printing process is executed immediately (step S612) and the main flow is terminated from 3 in FIG. 5.

Figure 8:
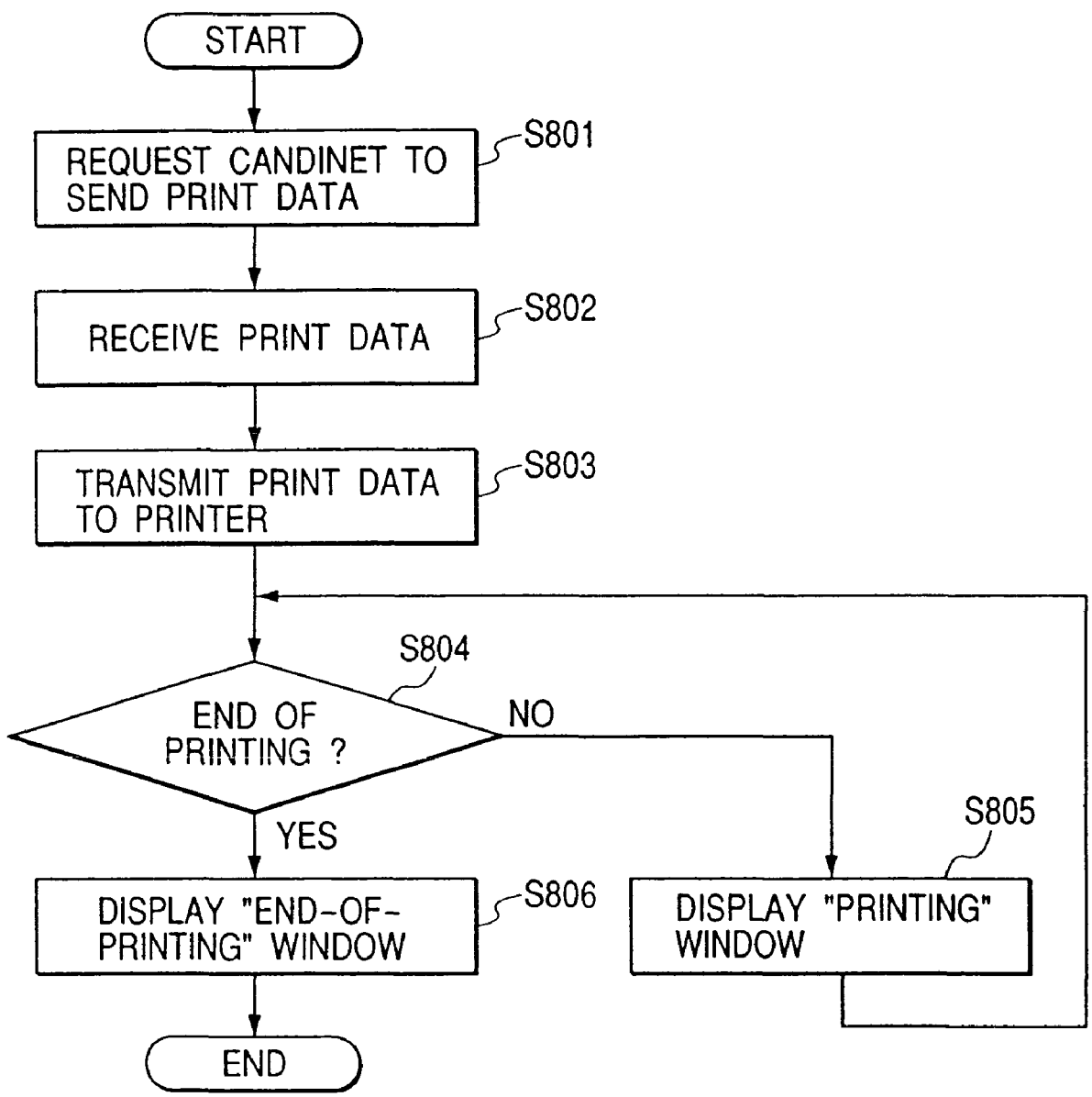
FIG. 8 is a flow chart showing the control sequence of the kiosk terminal 110 in a printing process.

FIG. 8 is a flow chart showing the function of the kiosk terminal 110 in the printing process. At first a request for the print data is given to the CanDINet control unit (step S801). In this operation, the kiosk terminal 110 requests the print data for the P-code selected for printing on the list image in FIG. 29. It also informs the CanDINet control unit whether the printing is in color or in monochrome, thereby receiving the print data for color or monochromatic printing from the CanDINet control unit. Also the output format of the advertisement, selected in the print charge process, is informed to the CanDINet control unit.

Then the print data are received from the CanDINet control unit (step S802), and transferred to the printer (print unit 17) for starting the printing operation.

Then there is discriminated whether the printing operation has been completed (step S804), and, if not (step S804—No), there is displayed an image indicating that the printing operation is in progress, but, if completed (step S804—Yes), there is displayed an image indicating that the printing operation is over.

(Other Service Processes)

In the foregoing there have been explained the operations of the kiosk terminal 110 in the information print service. In the following there will be explained the information registration service (data deposit service), personal information service and mail print service.

(Information Registration Service (Data Deposit Service))

Figure 23:
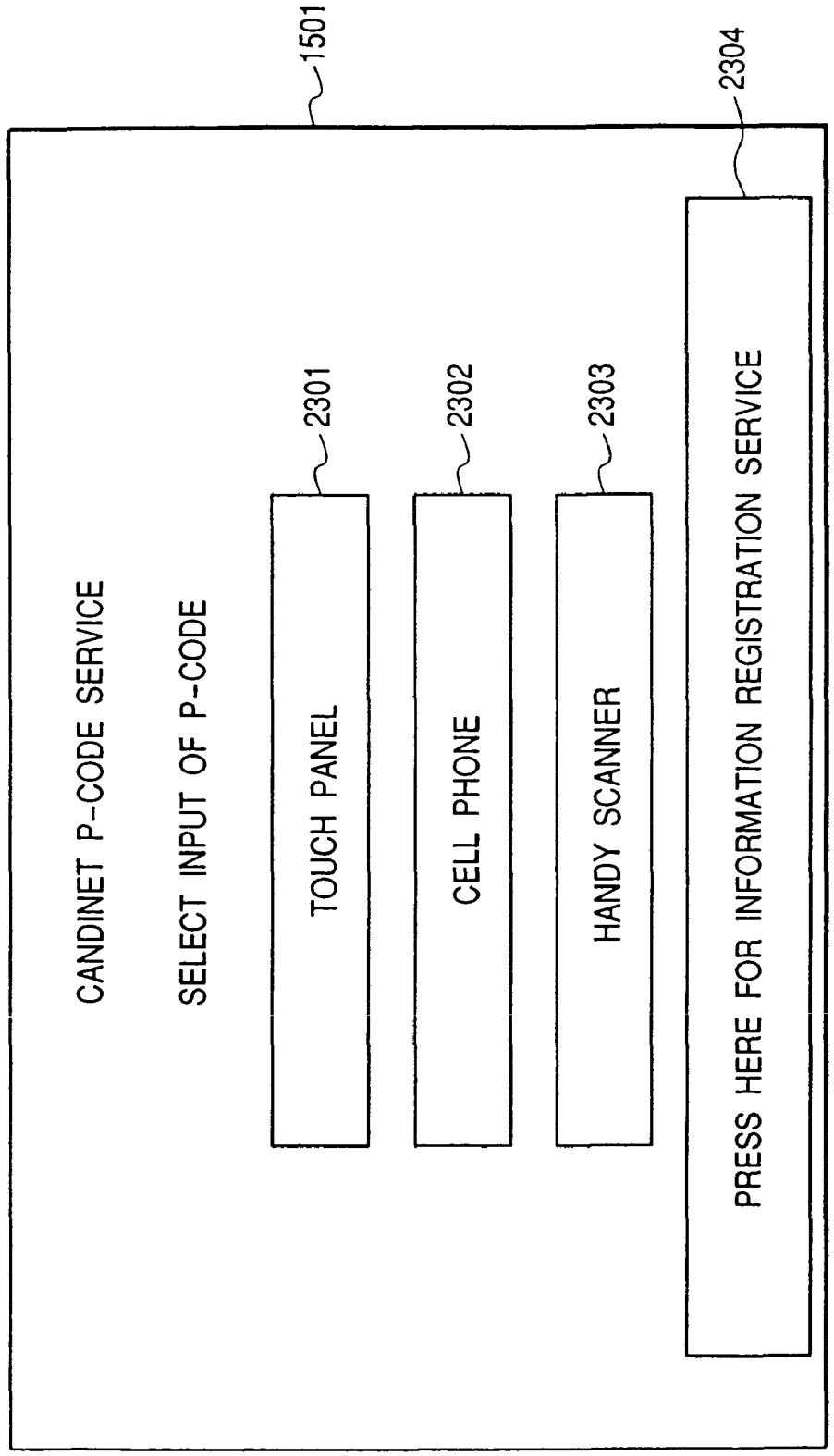
FIG. 23 is a view showing an initial display image of the kiosk terminal.

If the button "Press here for information registration service" 2304 is depressed in the initial image of the kiosk terminal 110 shown in FIG. 23 (step S502—data deposit in FIG. 5), there is executed a process for the information registration service (step S503).

Figure 14:
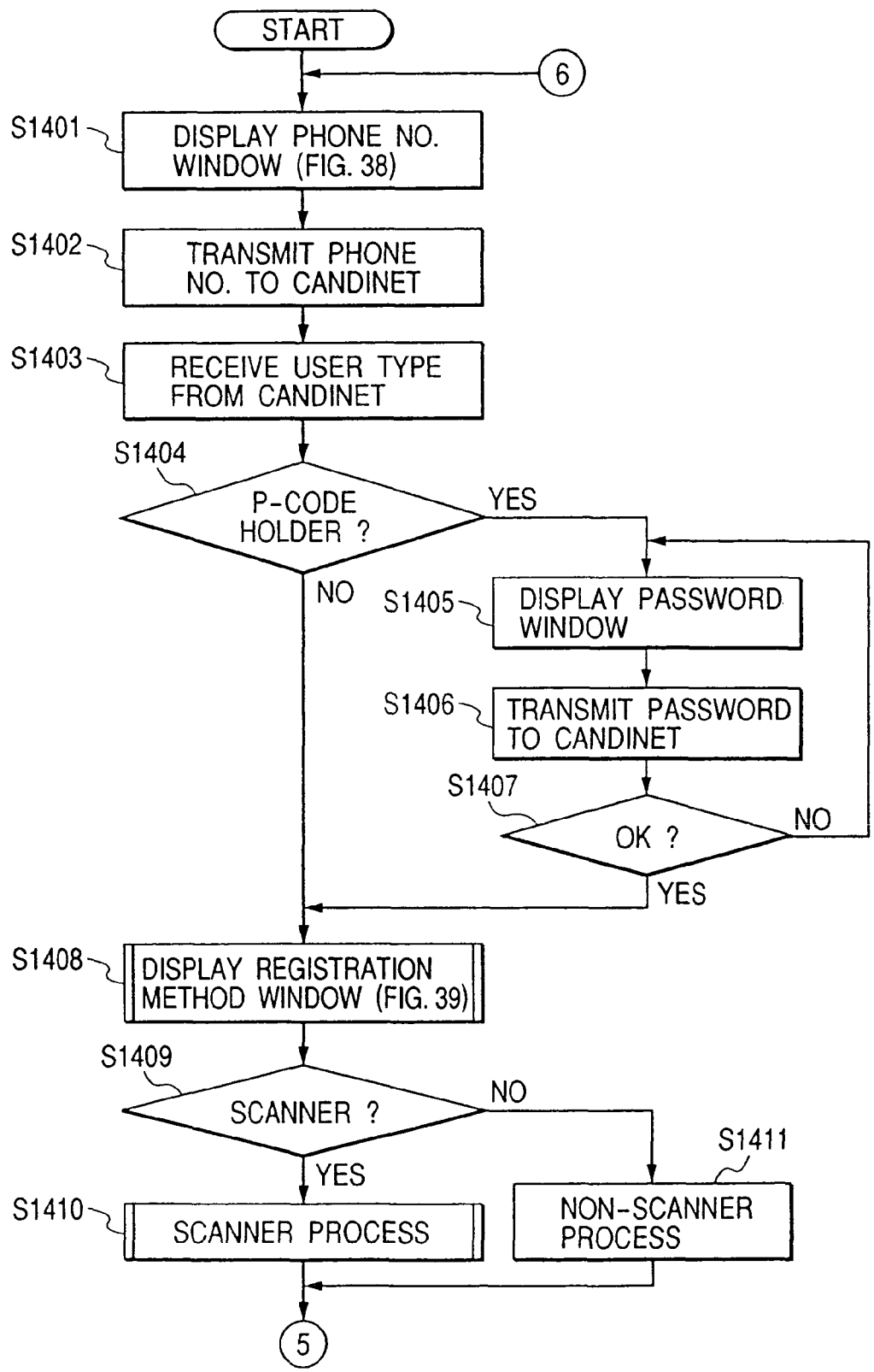
FIG. 14 is a flow chart showing the control sequence of the kiosk terminal 110 in providing an information registration service.
Figure 38:
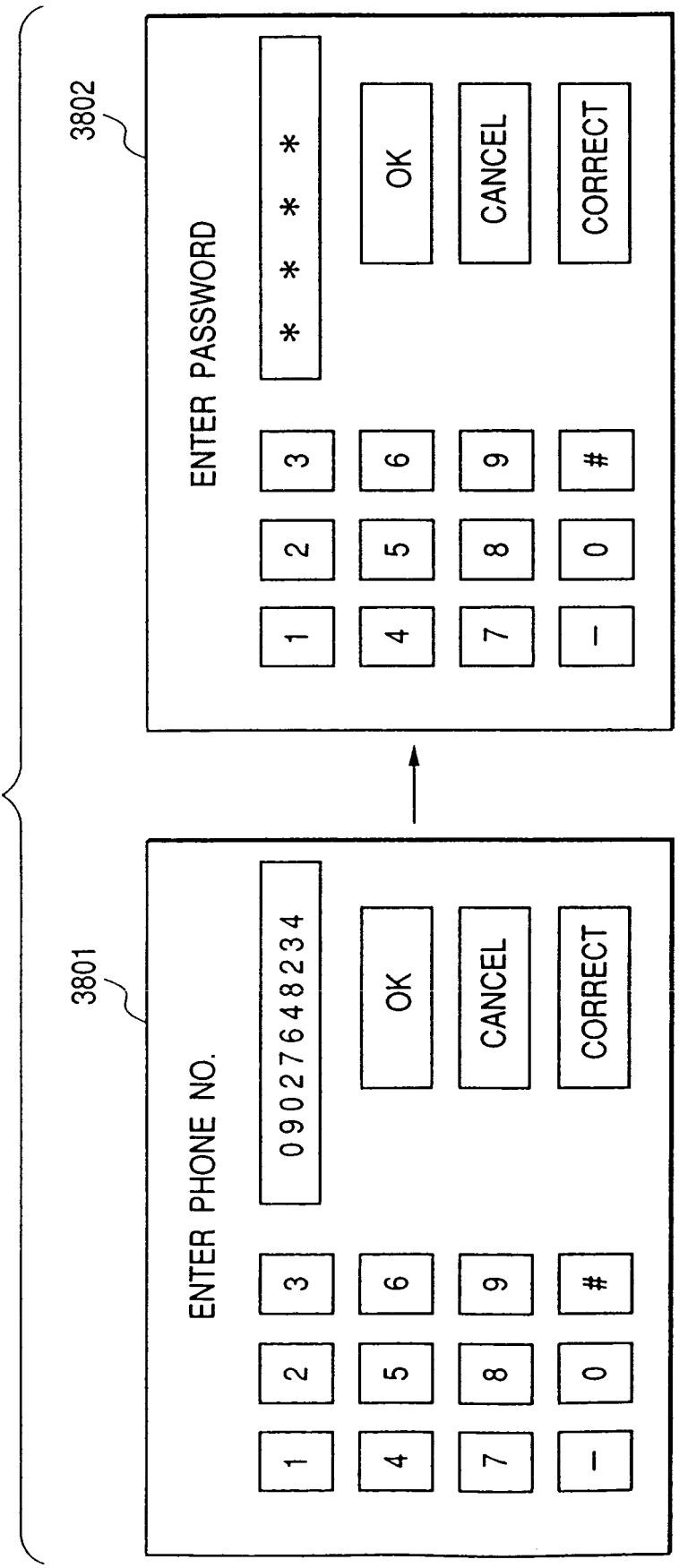
FIG. 38 is a view showing a display image for entering telephone number.

FIG. 14 is a flow chart showing the function of the kiosk terminal 110 in providing the information registration service. The user has to register his telephone number for identification. Therefore, there is at first displayed a telephone number input image 3801 as shown in FIG. 38 (step S1401). When the "OK" button is depressed by the user on this image, the entered telephone number is transmitted to the CanDINet control unit (step S1402).

In response, based on the telephone number, the CanDINet control unit discriminates whether the user is already registered, namely whether the user already has a P-code. If the user already has the P-code, the CanDINet control unit has a user information table for the P-code as shown by 4801 in FIGS. 48A and 48B.

Thus the CanDINet control unit specifies the type of the user (whether the user has the P-code) from the entered telephone number and transmits such type to the kiosk terminal 110. The kiosk terminal 110 thus receives the transmitted user type (step S1403) and discriminates whether the user is a P-code holder (step S1404).

If the user is not a P-code holder (step S1404—No), the sequence immediately shift to a step S1408, but, if the user is a P-code holder (step S1404—Yes), there is displayed a password input image 3802 shown in FIG. 38 for causing the user to enter a password. Then the password is transferred to the CanDINet control unit (step S1406), which in response executes identification of the user. If the CanDINet control unit informs that the password is correct (step S1407—Y), the sequence proceeds to a step S1408. If it is informed that the password is not correct (step S1407—N), the sequence returns to the step S1405 for the password reentry by the user.

A step S1408 displays an image for the information registering method (data depositing method).

The information can be registered either by scanning the image with a scanner, or by information input from an external equipment. In the former case, the user uses the scanner to scan a paper medium such as a notebook or a book. In the latter, the user enters the information into the kiosk terminal 110 from a notebook computer or a mobile terminal through a cable or by a wireless channel.

Figure 39:
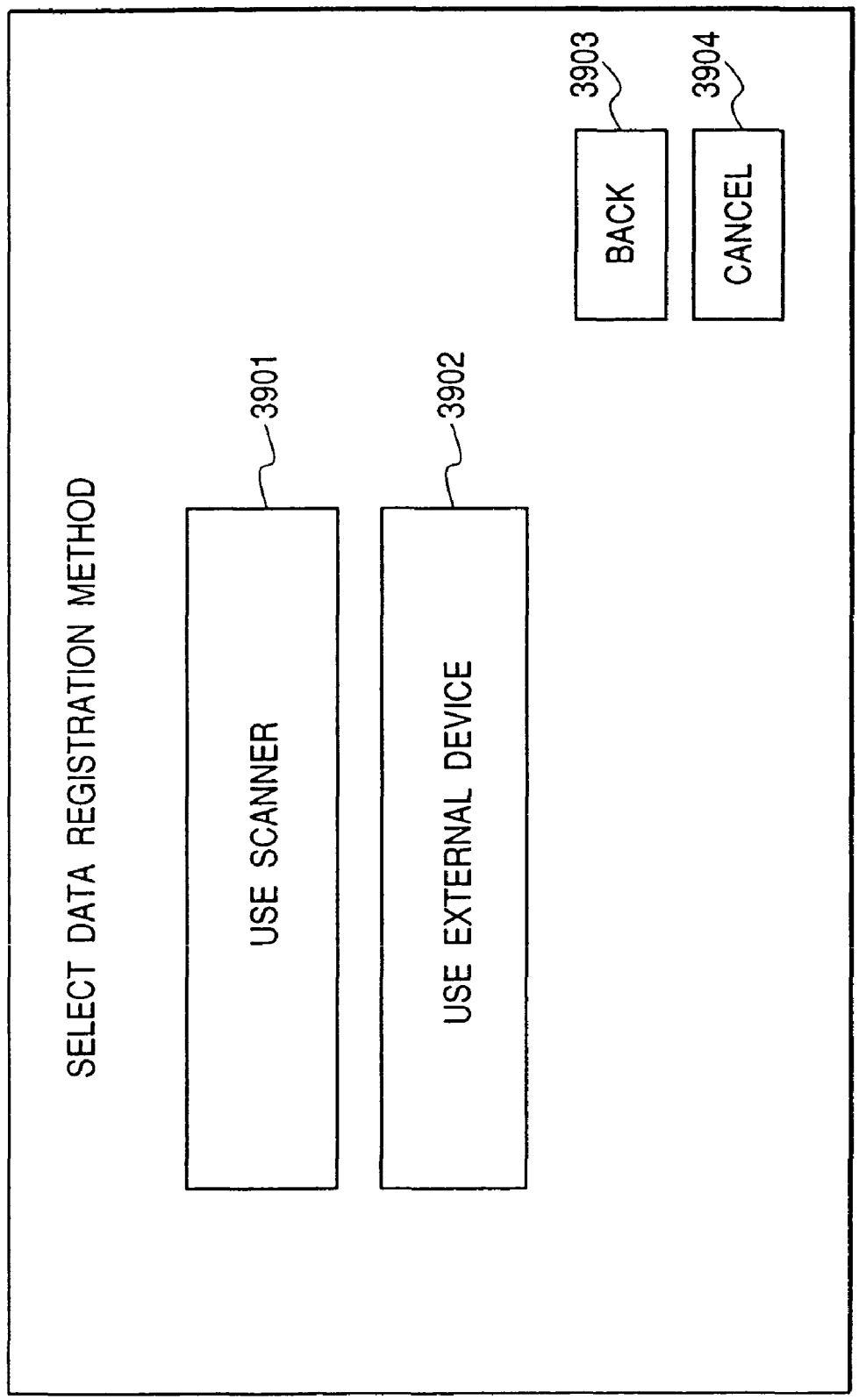
FIG. 39 is a view showing a display image indicating the information registering method.

Therefore the information registering method image shown in FIG. 39 has a "scanner" button 3901 and an "external equipment" button 3902, and there is discriminated the depressed button (step S1409).

Figure 15:
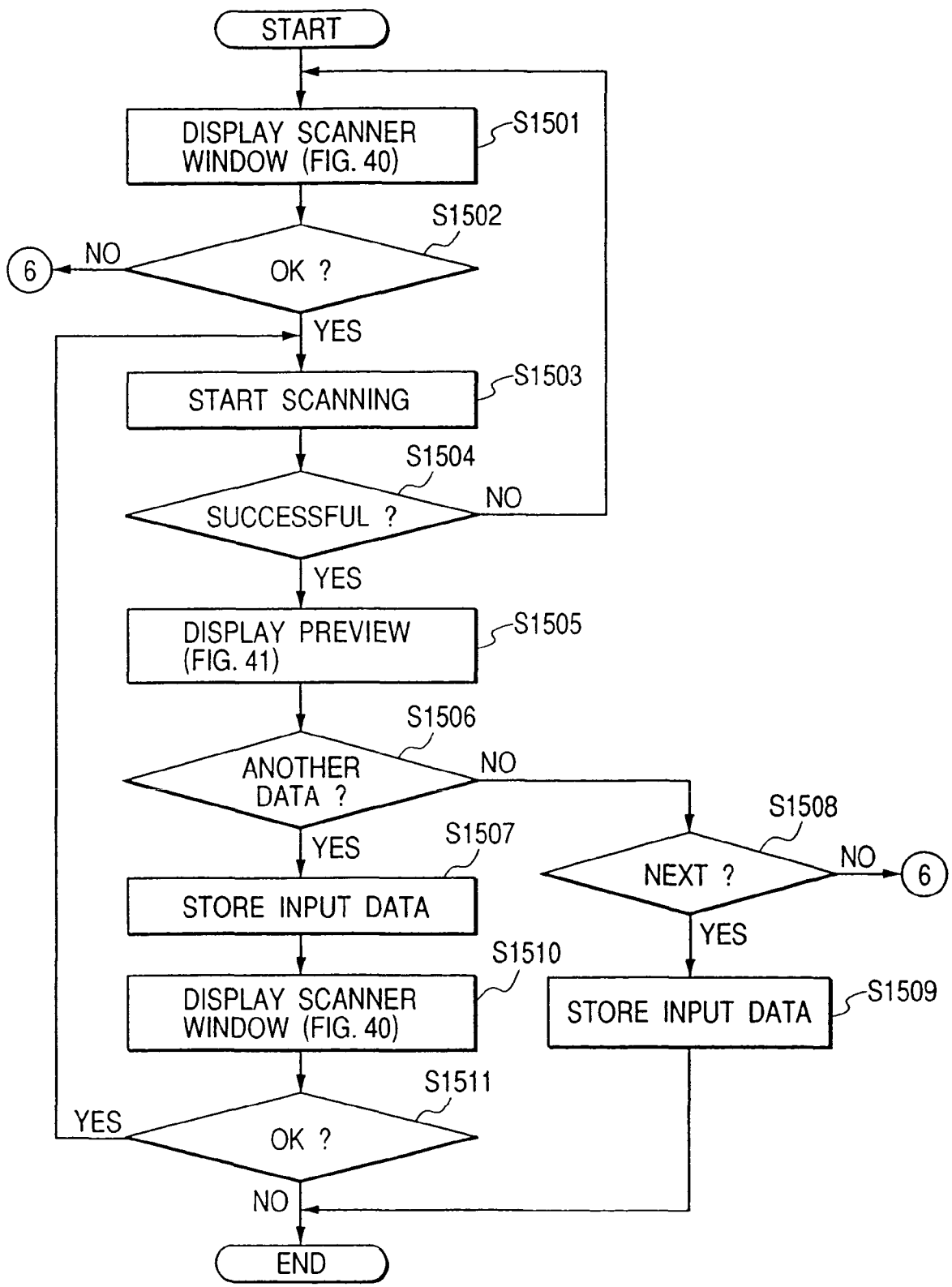
FIGS. 15 and 16 are flow charts showing the control sequence of the kiosk terminal 110 in a scanner process.
Figure 16:
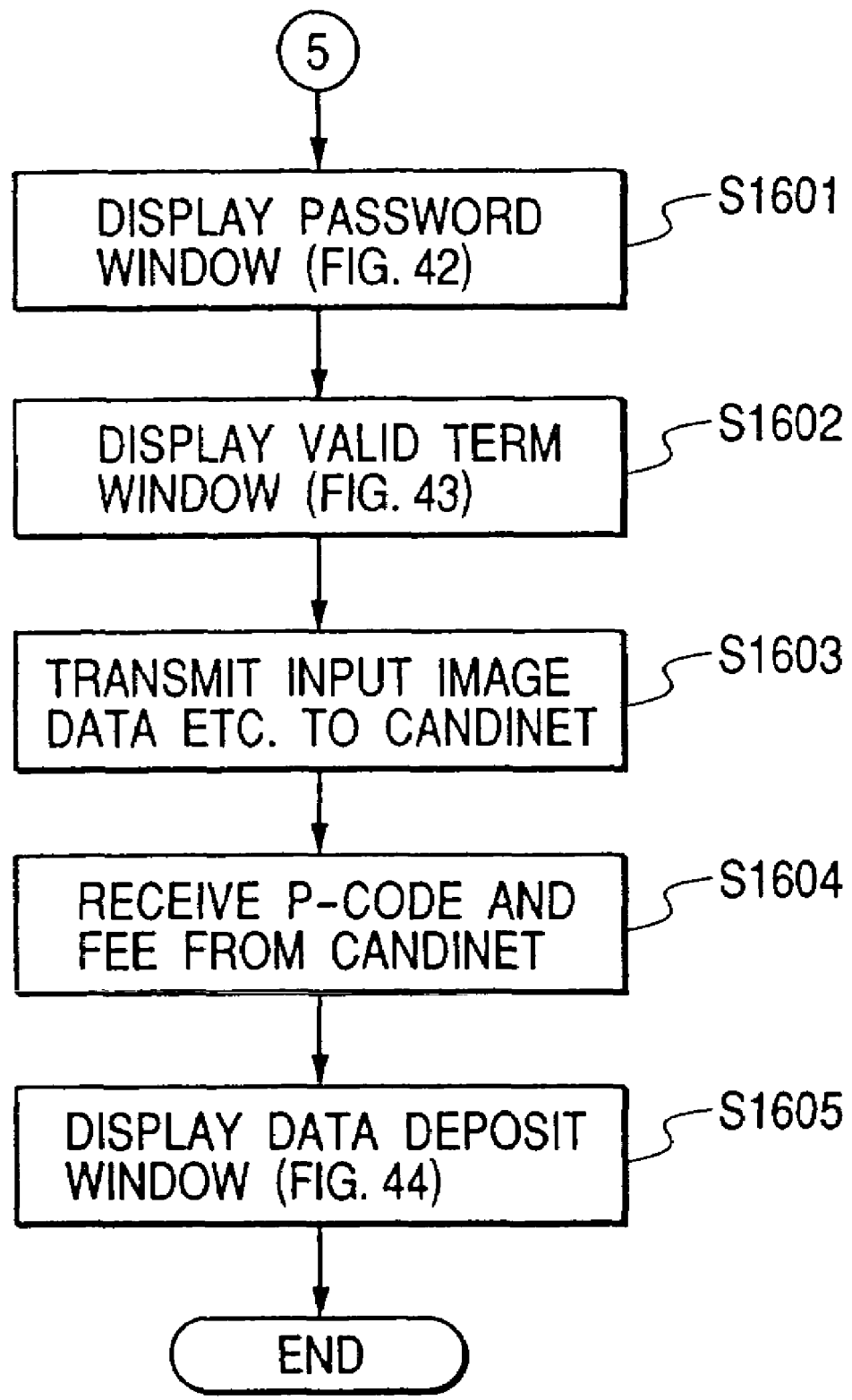
Figure 40:
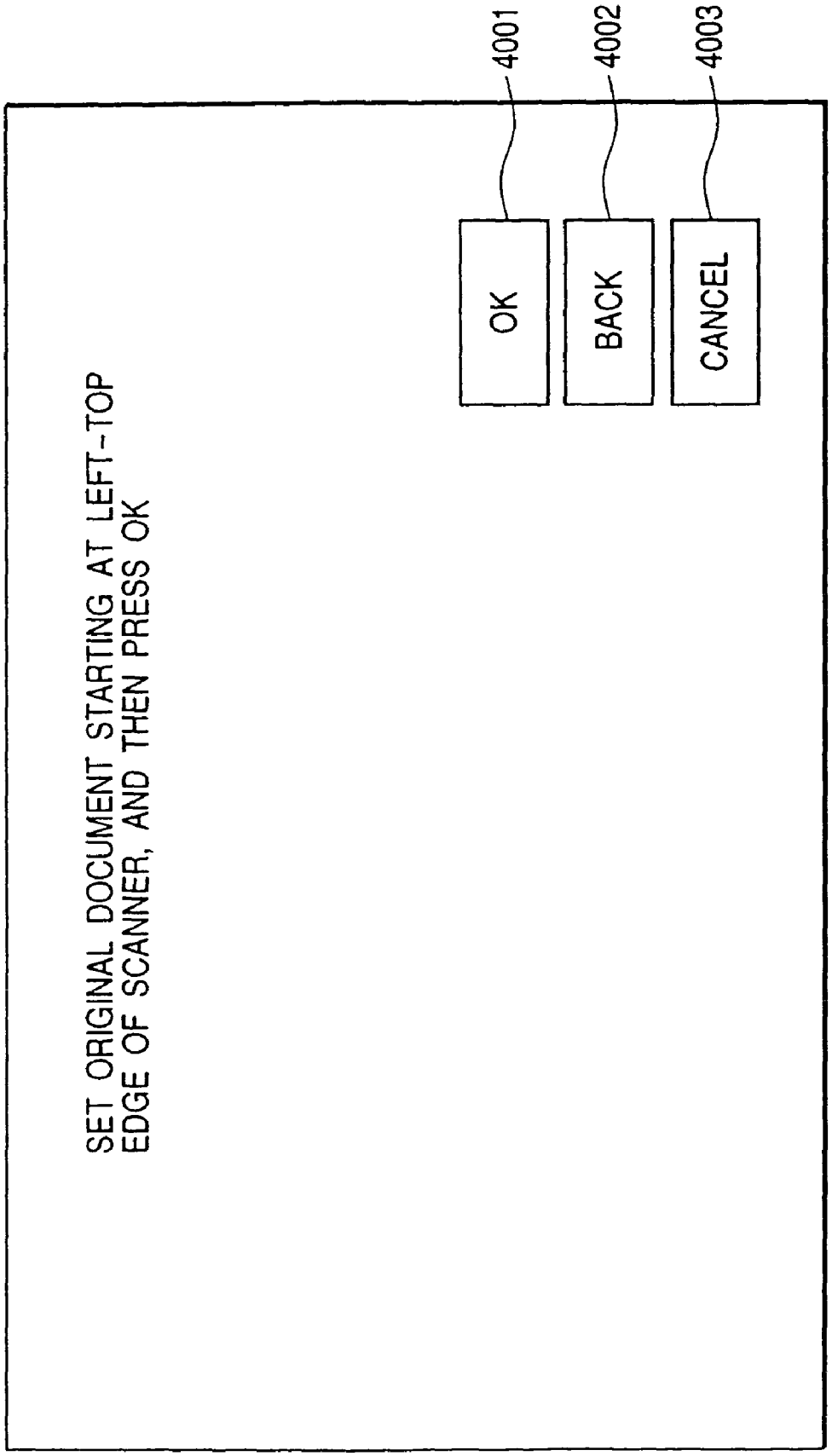
FIG. 40 is a view showing a display image for instructing scanner input.

If the "scanner" button 3901 is depressed (step S1409—Yes), there is executed a scanner process (step S1410). FIG. 15 is a flow chart showing the function of the kiosk terminal 110 in the scanner process. When the user selects the use of the scanner, there is at first displayed a scanner input designating image as shown in FIG. 40 (step S1501).

When the user sets the original and depresses the "OK" button 4001 in the scanner input designating image (step S1502—Yes), the scanner is caused to execute a scanning operation (step S1503). Then there is discriminated whether the original reading is successful (step S1504).

Figure 41:
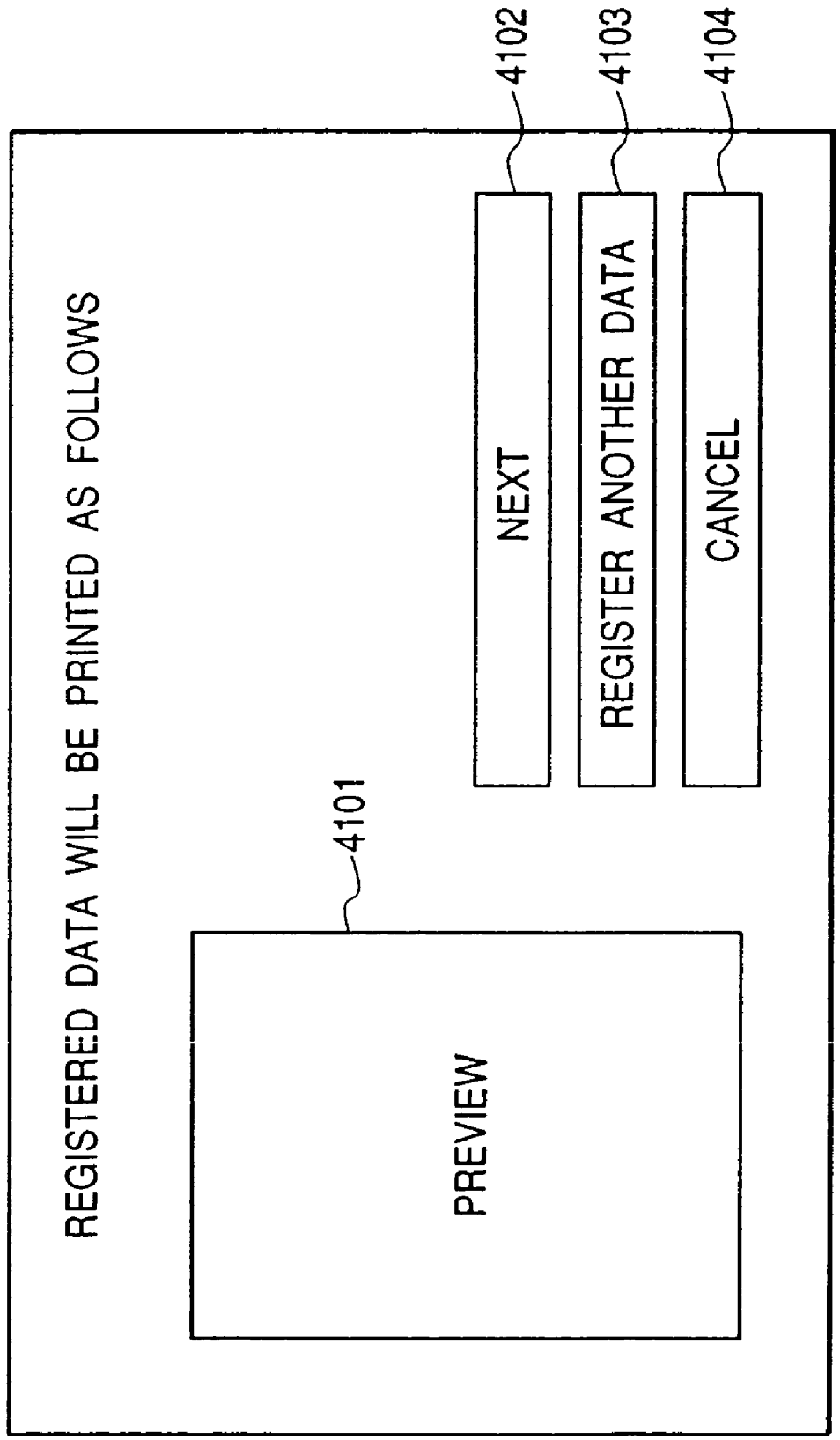
FIG. 41 is a view showing an example of the preview image.

If not successful (step S1504—N), the sequence returns to the step S1501 for repeating the original reading. If successful (step S1504—Y), there is displayed a preview image of the read image data (step S1505). FIG. 41 shows an example of the preview image, which includes a preview image 4101, a "next" button 4102, a "register other data" button 4103, and a "cancel registration" button 4104. Then there is discriminated the depressed button (step S1506).

If the "register other data" button 4102 is depressed (step S1506—Yes), the image data read in the step S1503 are stored in the RAM 19 or the external memory 14 (step S1507). Then the scanner input designating image shown in FIG. 40 is displayed again (step S1510), and, when the "OK" button therein is depressed (step S1511), the sequence returns to the step S1503.

If the "next" button is depressed on the preview image shown in FIG. 41 (step S1506—No, step S1508—Yes), the finally read image data are stored in the RAM 19 or the external memory 14 (step S1509) and the sequence is terminated. If the "cancel registration" button is depressed on the preview image shown in FIG. 41 (step S1506—No, step S1508—No), the image data stored in the step S1507 or S1509 are invalidated (or erased), and the sequence returns to the step S1401.

If the "external equipment" button 3902 is depressed on the information registration method image shown in FIG. 39 (step S1409—No), there is executed a process similar to the scanner process (step S1411). The details of the step S1411 will not be explained.

Figure 42:
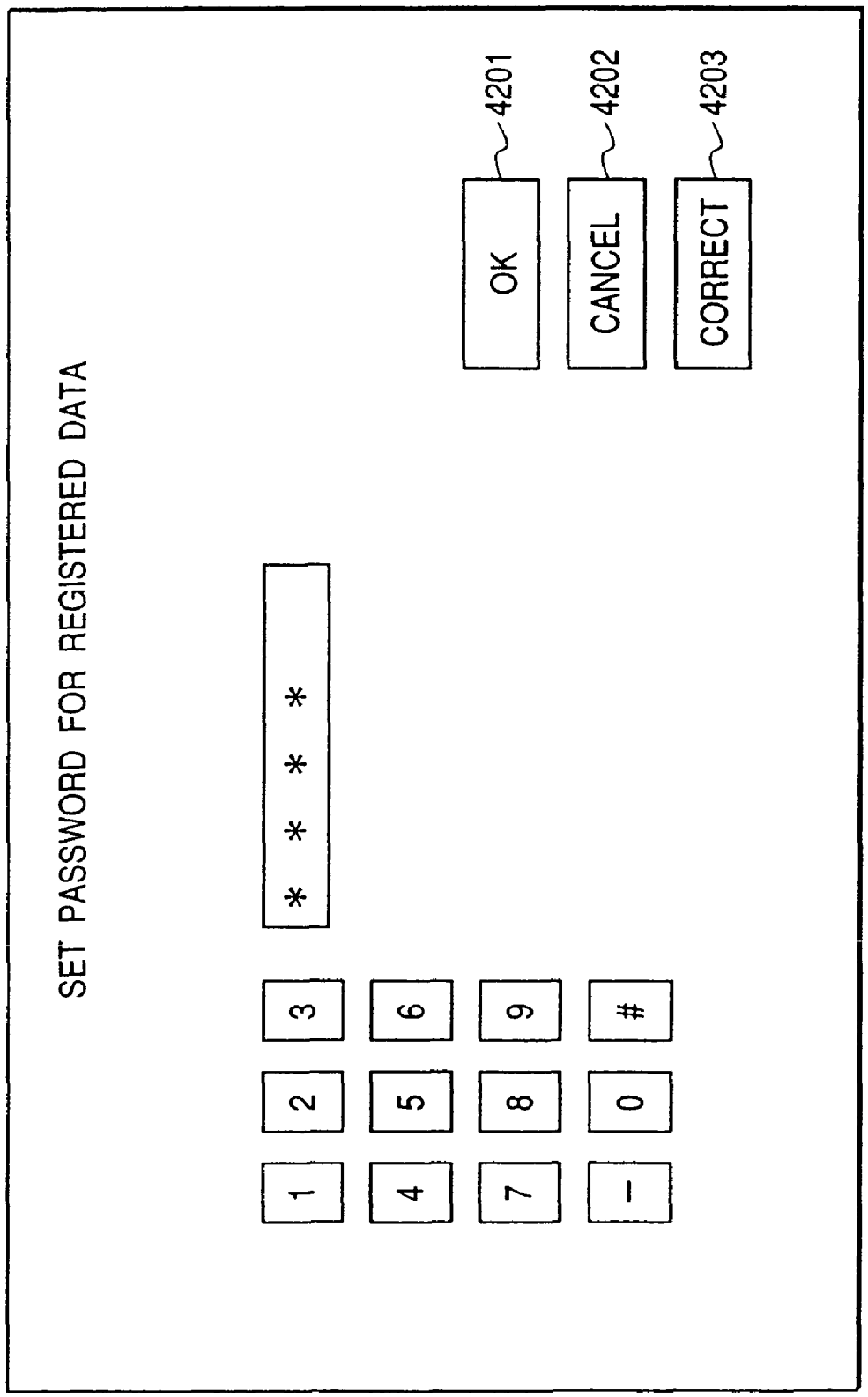
FIG. 42 is a view showing a password setting display image.

After the process of the steps S1410 and S1411, there is displayed a password setting image shown in FIG. 42. This password has to be entered in case the information registered in this service is printed by the user or by another person.

Figure 43:
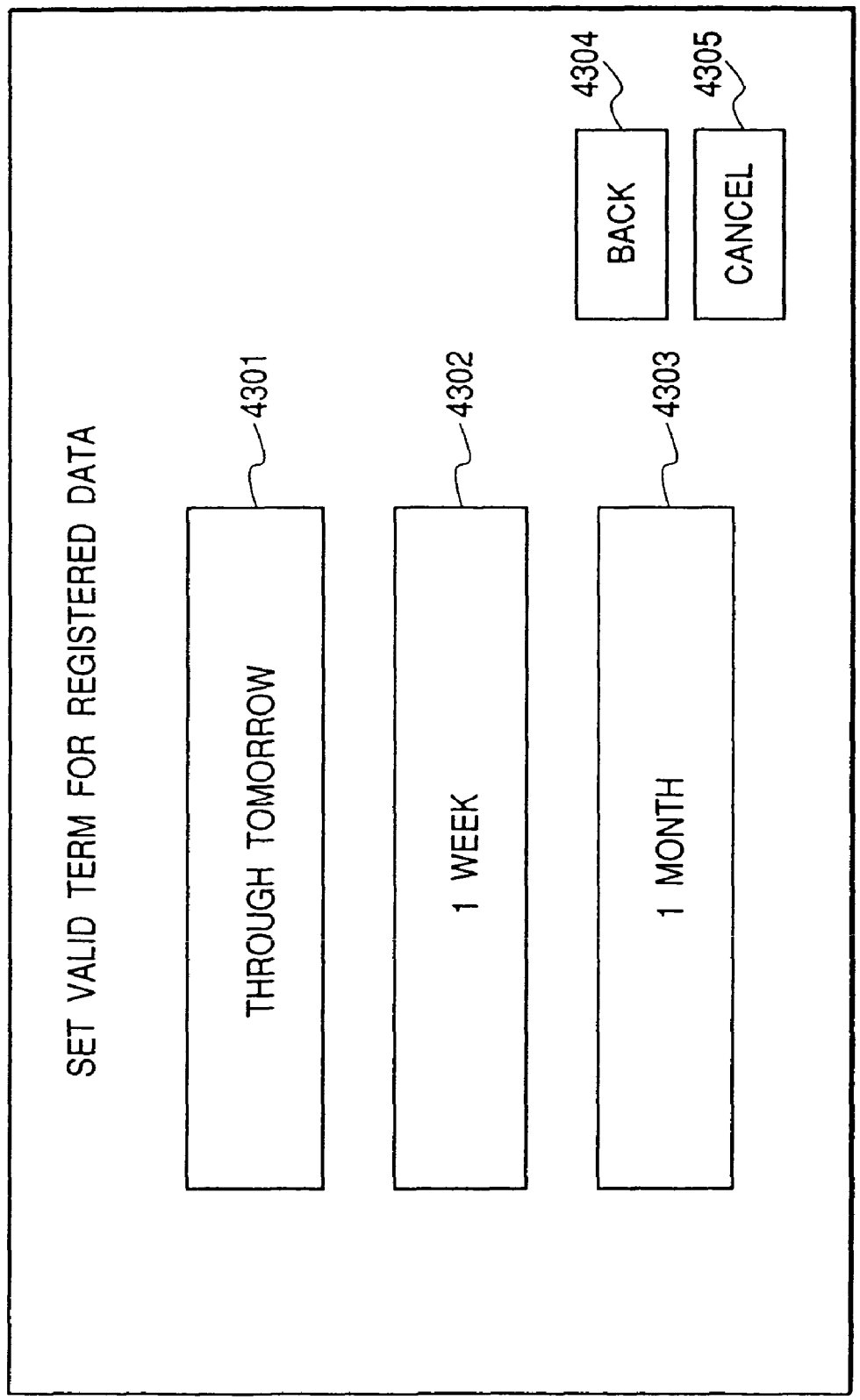
FIG. 43 is a view showing an effective term setting display image.

Then there is displayed an effective term input image as shown in FIG. 43 (step S1602), and the term of registration of the information is selected by the user. In the effective term input image shown in FIG. 43, the user can select "until tomorrow", "1 week" or "1 month", and the kiosk terminal 110 memorizes the selected term.

Subsequently, the entered image data, type thereof, page number thereof, password and effective term are transferred to the CanDINet control unit, which in response issues a P-code for the registered information. Then there are received the P-code and the registration charge transmitted from the CanDINet control unit (stp S1604).

Finally, there are displayed, as shown in FIG. 44, the P-code, password, data amount, effective term and registration charge for the deposited image data. In the example shown in FIG. 44, the registered image data can be printed out in the information print service, by designating the P-code "09027648234#4". The P-code is effective for one week, and the registered image data can no longer be printed by this P-code. The sequence is terminated upon depression of the "OK" button 4401 by the user.

(Personal Information Service)

Figure 11:
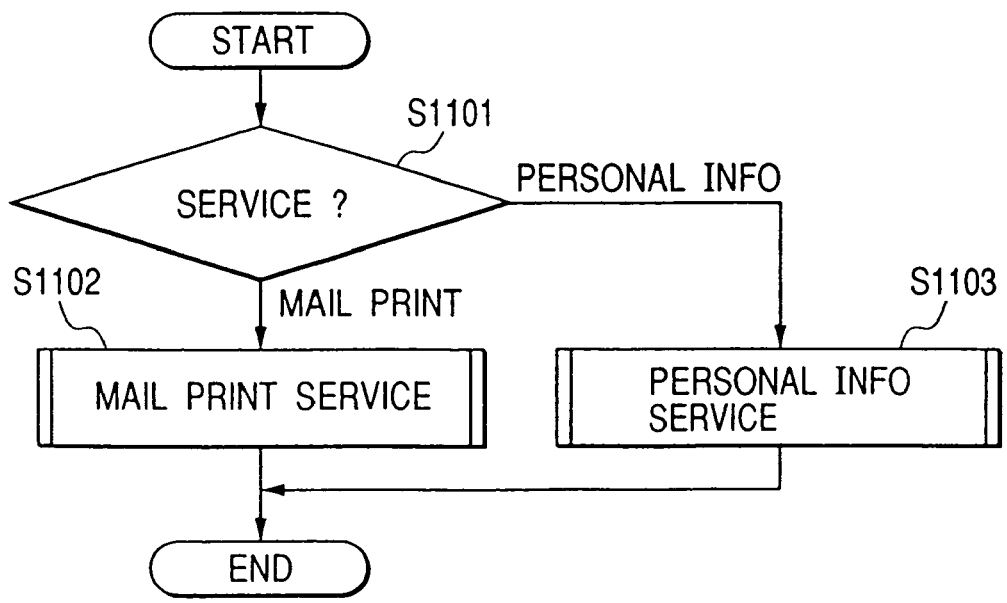
FIG. 11 is a flow chart showing the control sequence of the kiosk terminal 110 in another service.

If the step S511 in FIG. 5 identifies that the service type is other than the information print service (step S511—No), there are executed other service processes (step S512). FIG. 11 is a flow chart showing the function of the kiosk terminal 110 in such another service process. In the present embodiment, other services include the mail print service and the personal information service, so that there is discriminated whether the service type is the mail print service or the personal information service.

If the service type is the personal information service (step S1101—personal information service), there is executed a process for the personal information service (step S1103).

Figure 12:
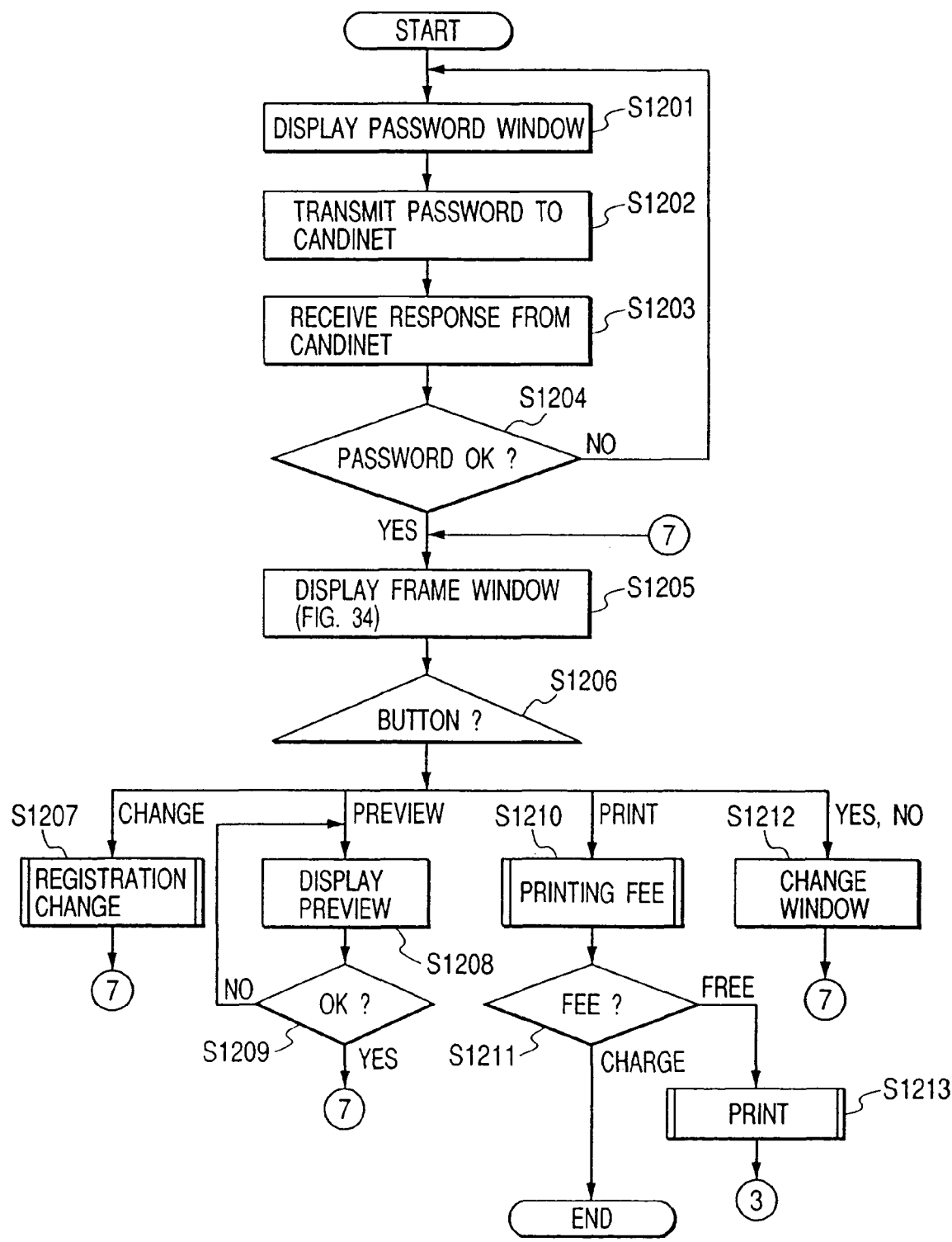
FIG. 12 is a flow chart showing the control sequence of the kiosk terminal 110 in providing a personal information service.

More specifically, the discrimination whether the service type is the personal information service is executed in the following manner. When the entered P-code is transmitted to the CanDINet control unit 100 in the step S509 in FIG. 5, the CanDINet control unit 100 discriminates if the entered P-code is "<telephone number>##" or "<telephone number>##<number>". If so, the service type is identified as the personal information service and such service type is returned to the kiosk terminal. FIG. 12 is a flow chart showing the function of the kiosk terminal 100 in providing the personal information service.

At first there is displayed a password input image 3802 shown in FIG. 38 (step S1201) for requesting the user to enter the password. Upon confirmation of the password entry by the user, the entered password is transferred to the CanDINet control unit (step S1202). In response, the CanDINet control unit searches, based on the P-code transmitted from the kiosk terminal 110 in the step S509 in FIG. 5, the user information table corresponding to the P-code. Then the value stored in the password column of the personal information table linked with such user information table is compared with the received password, and, if both coincide, the result is transmitted to the kiosk terminal 110.

The kiosk terminal 110 receives the response from the CanDINet control unit (step S1203), and discriminates whether the response indicates that the password is correct (step S1204). If the password is not correct (step S1204—N), the sequence returns to the step S1201 for the reentry of the password by the user. If the password is correct, there is displayed a registration frame image as shown in FIG. 34 (step S1205).

By registering one or plural P-codes in the registration frame, the user can easily obtain the printout of one or plural information data registered for the registration frame, by simply entering the P-code (called personal P-code in this case) corresponding to the registration frame into the kiosk terminal.

Figure 34:
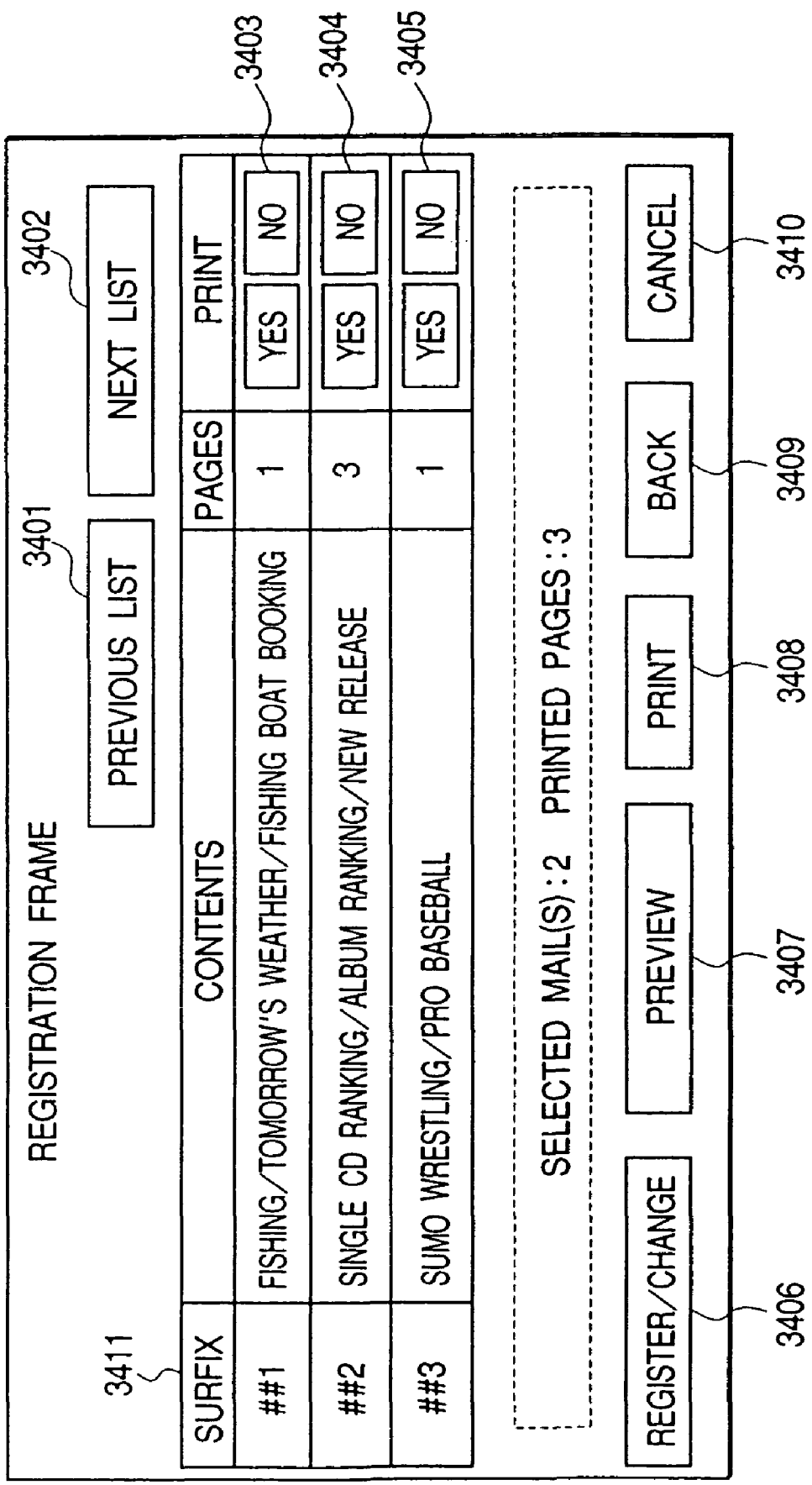
FIG. 34 is a view showing a registration frame display image.

For example, in the registration frame "Yesterday's sumo wrestling/pro baseball" shown in FIG. 34, the user can obtained a personal print containing the information on the sumo wrestling and pro baseball by registering plural P-codes such as those related to the sumo wrestling and those related to the pro baseball in this registration frame.

A personal P-code is issued for each registration frame, and the personal P-code in this case is given by "<user P-code>##<frame number>". As an example, if the user P-code entered in the step S507 in FIG. 5 is "24535", the personal P-code for the first registration frame shown in FIG. 34 is "24535##1".

When the user selects the personal information service in the registration image shown in FIG. 60, the personal P-code is registered in the "personal P-code service information" column of the user information table shown in FIGS. 48A and 48B, and the personal P-code table is prepared as shown in FIG. 49. Since this is the first registration frame, the personal P-code becomes "<user P-code>##1". There can be prepared plural registration frames, and the personal P-code for the second registration frame becomes "<user P-code>##2". In the present embodiment, the user P-code is assumed to be the telephone number of the user. The P-code registered for the registration frame is stored in the "P-code list" shown in FIG. 49.

The information corresponding to the P-code registered for the registration frame may be fixed information, but is generally variable in time, such as "stock market final price" or "tomorrow's weather forecast".

Stated differently, the information data corresponding to the P-code stored in the "P-code list" shown in FIG. 49 can be renewed in time. Also the P-code stored in the "P-code list" can be the personal P-code (this personal P-code being referred to as B, while the original personal P-code being referred to as A), and, in such case, among the personal P-codes registered as B, the one with the latest information data can be made the personal P-code registered as A.

Figure 81:
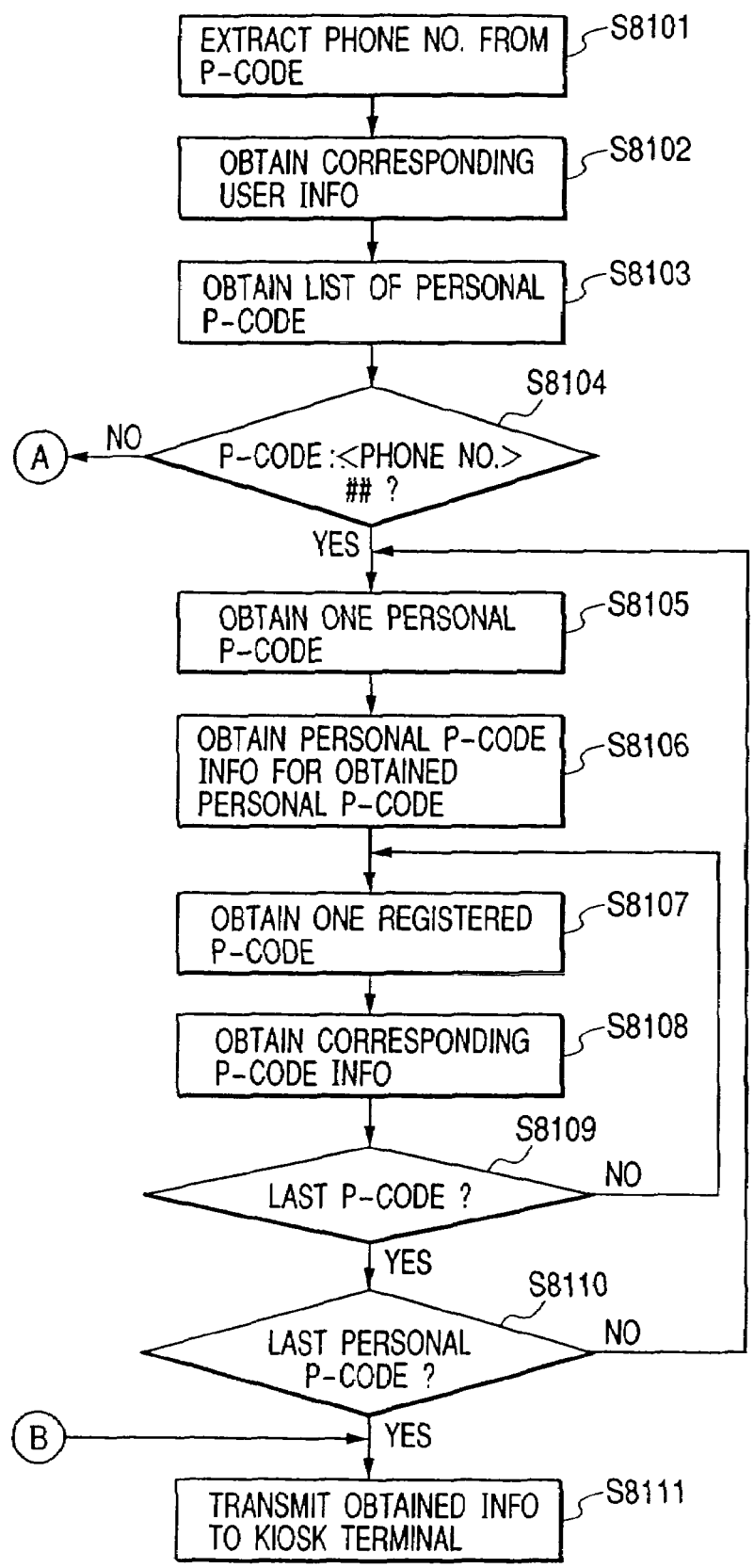
FIGS. 81 and 82 are flow charts showing the control sequence of the CanDINet control unit 100 in displaying a registration frame image.
Figure 82:
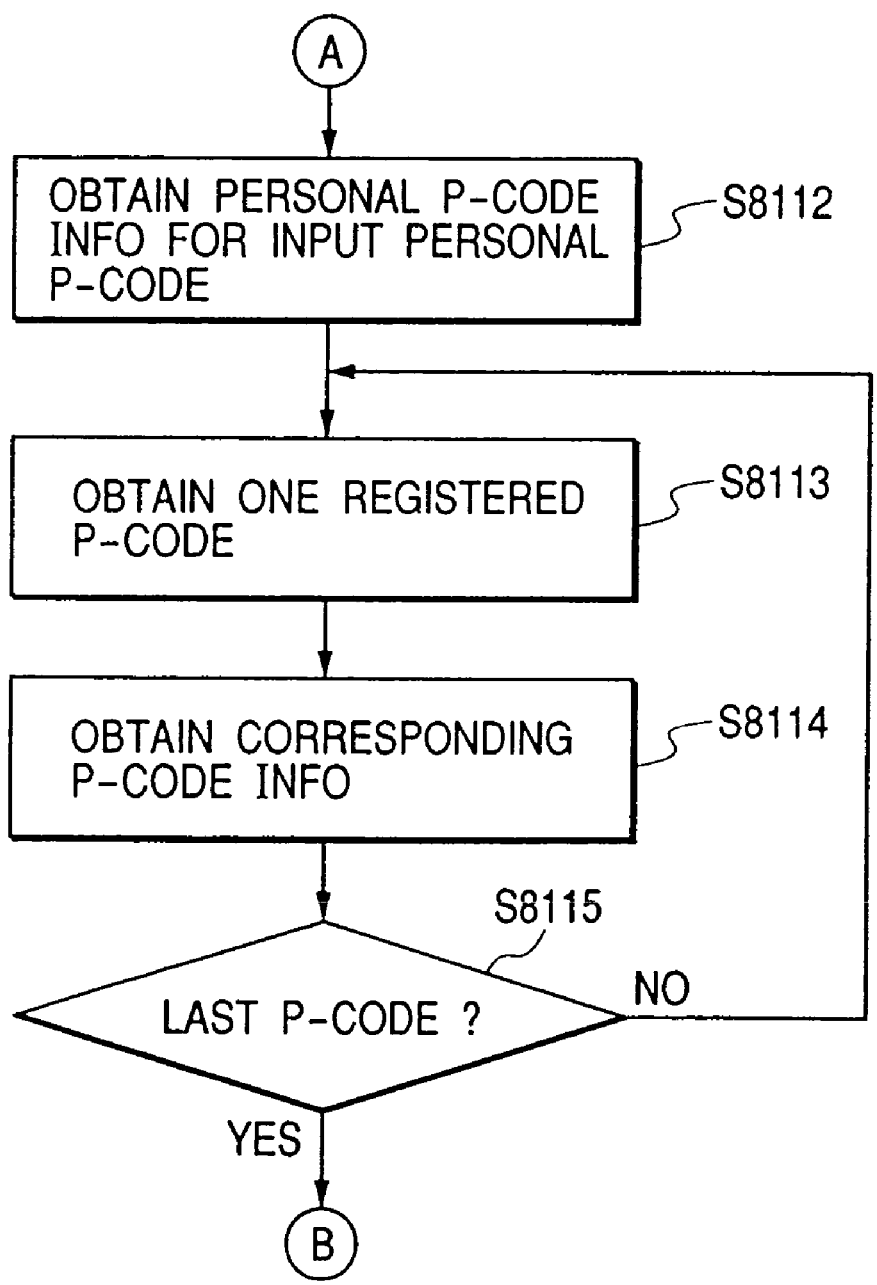

FIGS. 81 and 82 are flow charts showing the function of the CanDINet control unit 100 in displaying the registration frame image in the step S1205. At first, from the P-code entered in the kiosk terminal 110, there is extracted a part of the user P-code (telephone number) (step S8101). Then the user information table shown in FIGS. 48A and 48B is searched with the user P-code, whereby the information on such user p-code is acquired (step S8102). If the user receives the personal information service, the personal P-code is issued to such user and is stored in the user information table (personal P-code service information).

Then there is discriminated whether the P-code entered by the kiosk terminal 110 is terminated by "##" (step S8104), and, if not, namely if the personal P-code is directly entered, there is executed a flow chart shown in FIG. 82. If it is terminated by "##", there is executed a process of steps S8105 to S8110 in order to acquire information on all the P-codes issued to this user.

In case the P-code is terminated with "##", the personal P-codes are acquired one by one from the list thereof contained in the aforementioned personal P-code service information (step S8105). Then the P-code table for the personal P-code service is searched with thus obtained personal P-codes to acquire the information relating thereto (step S8106).

If the P-code is registered in the registration frame, such registered P-code is stored in the P-code table for the personal P-code service (registered P-code information). Therefore, the P-codes are acquired one by one from the P-code list contained in the registered P-code information (step S8107).

Then the IP information registration table shown in FIG. 46 is searched with thus acquired P-codes to obtain information relating thereto (step S8108). The information thus acquires includes, for example, the title of the P-code.

In acquiring the information relating to the P-code, there is checked an identifier portion of the IP information registration table. At first there is discriminated whether a "link" column stores the P-code of a linked object. If the P-code is stored, the linked object of the P-code has tangible information (such as information data to be printed), so that the IP information registration table shown in FIG. 46 is reconstructed with thus linked P-code in order to acquire the information relating to such P-code.

In case the "link" column does not store the P-code of the linked object, there is then discriminated whether a sub-code is present, by checking the value stored in "flag for sub-code" column. The sub-code, if present, is frame information.

The frame information is equivalent to the registration frame described above, but is different in that it is provided by the information provider. Stated differently, in case the information provider wishes to provide plural information (for which P-codes are respectively issued) under a P-code, there is prepared frame information. For example, the history of information data varying in time is managed by the sub-code, in such a manner that the access to the history can be made with a single P-code.

It is assumed that the largest sub-code indicates the latest information, and, if the sub-code is identified present, the IP information registration table is searched again with the largest one of the P-codes stored in the "sub-code" area, whereby the information on such P-code is acquired.

Then there is discriminated whether the P-code acquired in the step S8107 is the last one in the registered P-code information (step S8109), and, if not, the sequence returns to the step S8107 for acquiring the information on the next P-code.

If it is the last one, there is discriminated whether the personal P-code acquired in the step S8105 is the last one in the personal P-code service information (step S8110), and, if it is not the last one, the sequence returns to the step S8105 for acquiring the information on the next personal P-code, but, if it the last one, the sequence proceeds to a step S8111.

On the other hand, if the step S8104 identifies that the P-code is not terminated with "##", the P-code table for the personal P-code service in FIG. 49 is searched with the entered personal P-code to acquire the information on such personal P-code (step S8112).

Then the P-codes are acquired one by one from the P-code list in the registered P-code information (step S8113), and the IP information registration table is searched with such P-codes to acquire the information thereon (step S8114). The acquired information is similar to that in the step S8108.

Finally, there is discriminated whether the P-code acquired in the S8113 is the last one in the registered P-code information (step S8115). If not, the sequence returns to the step S8113 for acquiring the information on the next P-code, but, if it is the last one, the sequence proceeds to the step S8111.

A step S8111 transmits the information acquired in the step S8106, S8108, S8112 or S8114 to the kiosk terminal 110. Such information includes the title of the personal P-code (registration frame) and the title of each registered P-code. Based on this information, the kiosk terminal 110 generates the display image shown in FIG. 34 or 36.

The registration frame image in FIG. 34 includes a list 3411 of the registration frames currently prepared by the user, an "information registration/change" button 3406, a "print preview" button 3407, a "print" button 3408 and "yes", "no" buttons.

The kiosk terminal 110 discriminates the button depressed in the registration frame image (step S1206). If the "yes" or "no" button is depressed (step S1206—yes/no), there is accordingly changed a flag indicating whether or not to print each registration frame, and the display image is also accordingly changed.

Figure 13:
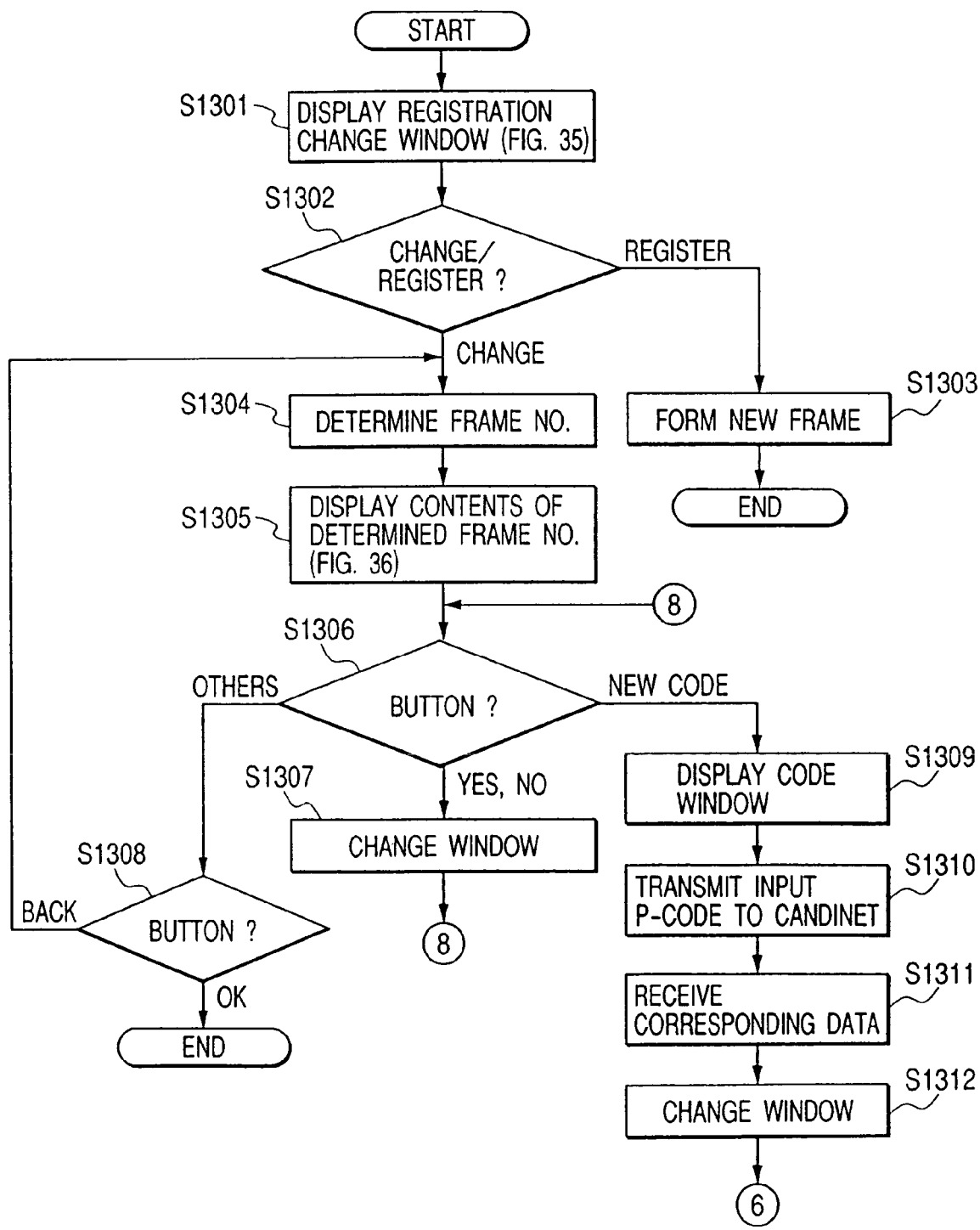
FIG. 13 is a flow chart showing the control sequence of the kiosk terminal 110 in a registration changing process.
Figure 35:
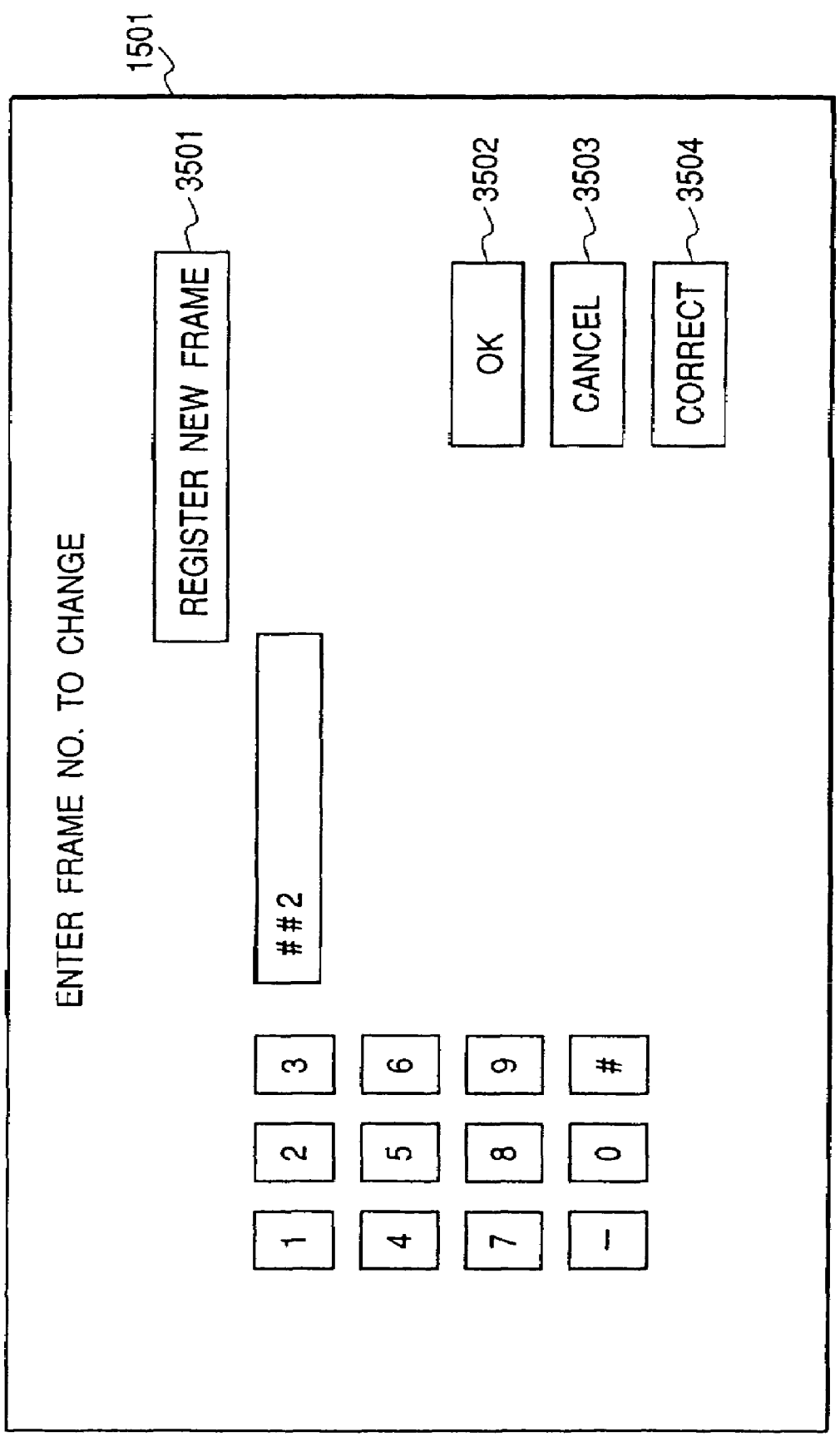
FIG. 35 is a view showing a change registering display image.

If the "information registration/change" button is depressed (step S1206—registration change), there is executed a process of changing the registration (step S1207). FIG. 13 is a flow chart showing the function of the kiosk terminal 110 in case of the process for registration change. At first, the kiosk terminal 110 displays a registration changing image as shown in FIG. 35. The image includes numeral keys for designating the registration of a new frame, an "OK" button 3502, and a "new frame registration" button 3501 for instructing the registration of a new frame, and the kiosk terminal 110 discriminates the depressed button (step S1302).

If the "new frame registration" button 3501 is depressed (step S1302—registration), a new frame is prepared (step S1303) and is listed on the registration frame image shown in FIG. 34.

Figure 36:
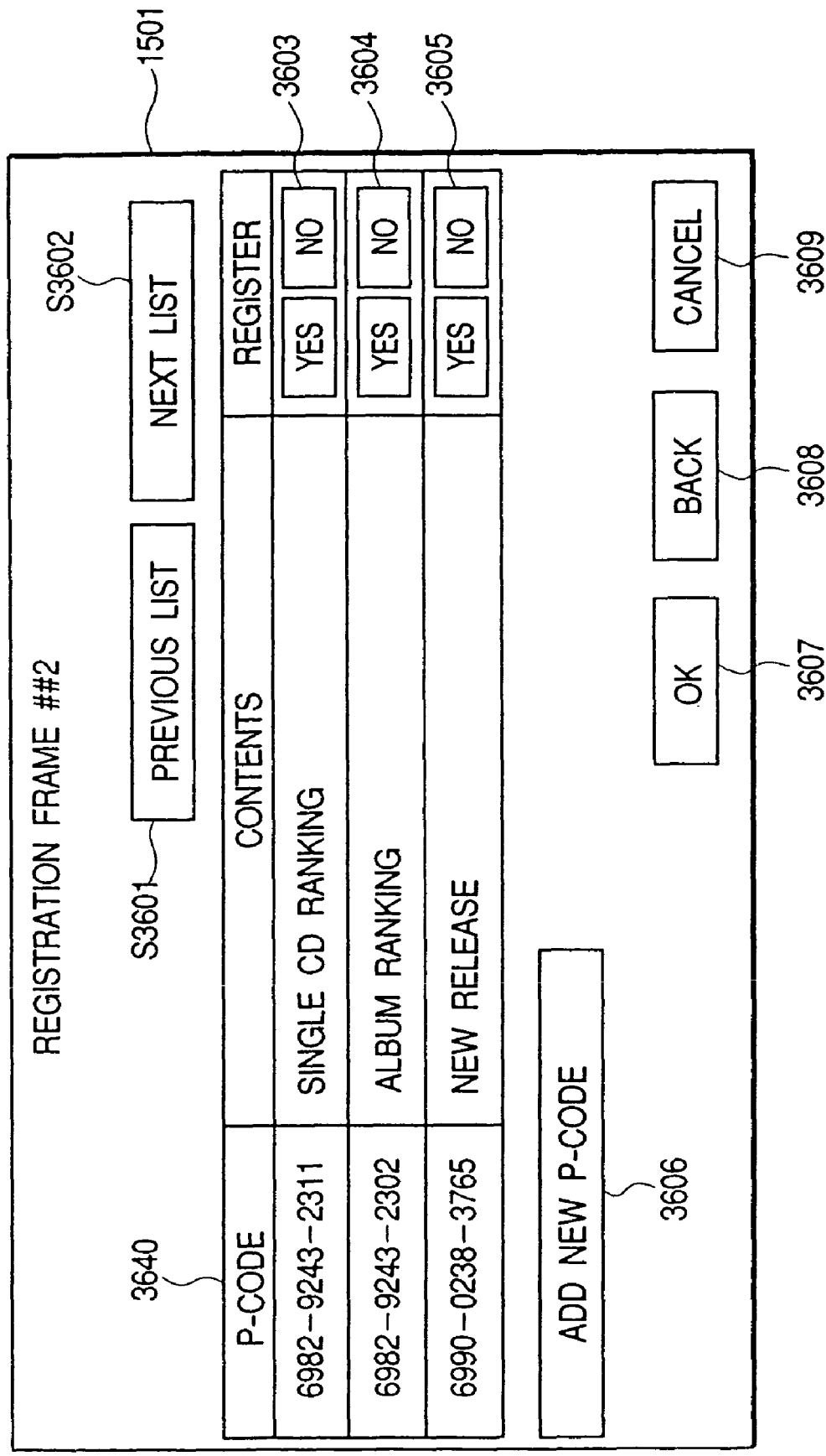
FIG. 36 is a view showing a display image showing the content of the registered frame corresponding to the frame number.

If the numeral keys are depressed followed by the depression of the "OK" button 3502 (step S1302—change), the entered frame number is specified (step, S1304), and the content of the registration frame corresponding to such frame number is displayed as shown in FIG. 36 (step S1305). This display includes a list 3640 of the P-codes registered in the registration frame, a "add new P-code" button, "yes", "no"

buttons for designating whether or not to register each P-code, an "OK" button and a "return" button.

The kiosk terminal 110 discriminates whether any of these buttons has been depressed on this image (step S1306). If the "yes" or "no" button is depressed (step S1306—yes, no), there is changed a flag indicating whether or not to register each P-code, and the display image is accordingly changed (step S1307).

In case there is selected not to register a P-code, such selection is transmitted from the kiosk terminal 110 to the CanDINet control unit 100, which in response deletes such P-code from the P-code list of the registered P-code information shown in FIG. 49.

If the "add new P-code" button 3606 is depressed (step S1306—new code), the code input image is displayed for causing the user to enter a P-code. Then the entered P-code is transferred to the CanDINet control unit 100, whereby the content of the information data corresponding to the P-code is received. Then the newly registered P-code is listed on the image shown in FIG. 36 (step S1312), and the sequence returns to the step S1306.

If the "return" button is depressed on the image shown in FIG. 36 (step S1306—other; step S1308—return), the sequence returns to the step S1304, but, if the "OK" button is depressed (step S1306—other, step S1308—OK), the present process is terminated.

Figure 37:
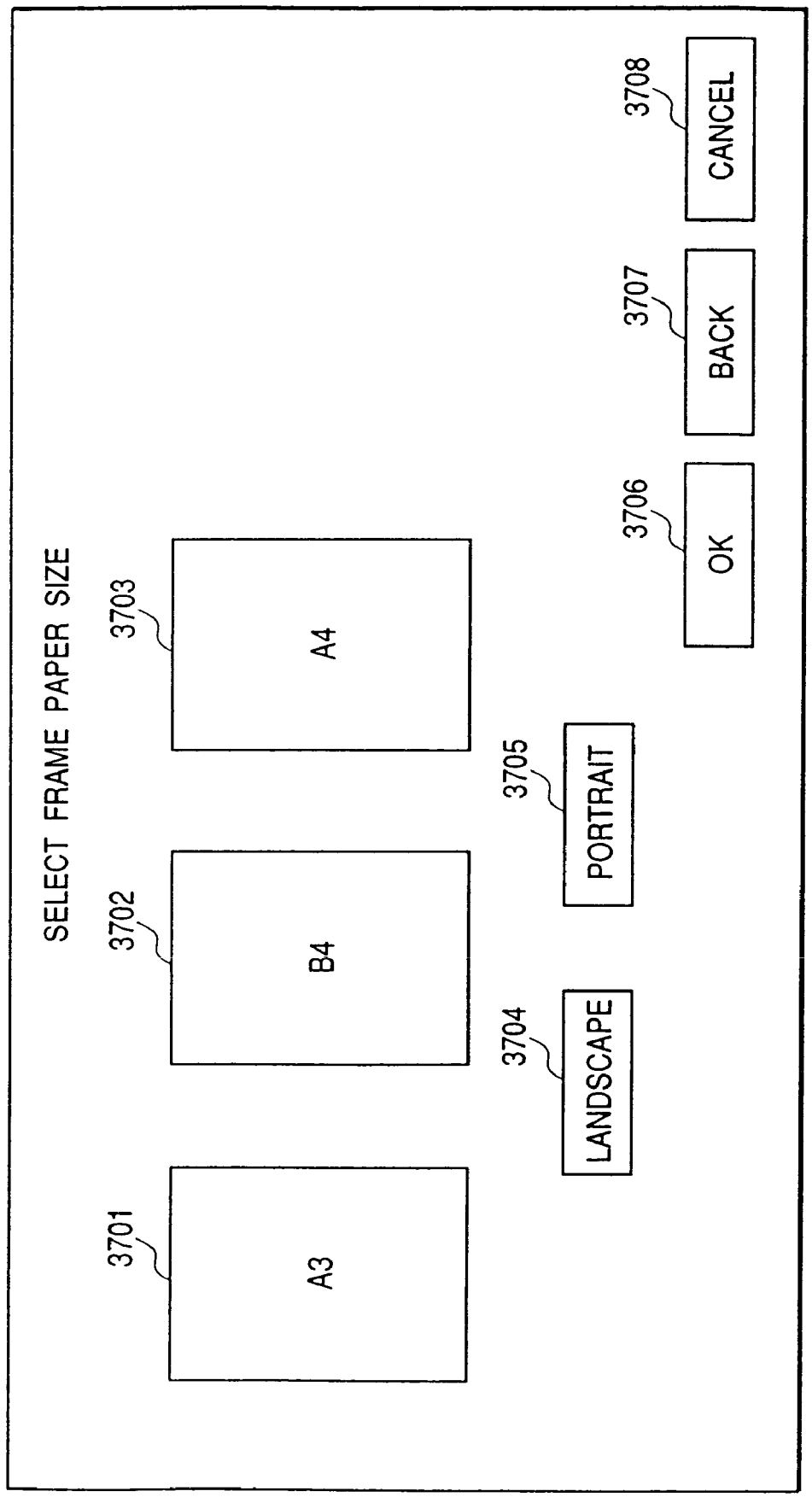
FIG. 37 is a view showing a display image for selecting the frame sheet size or sheet direction.

If the "print preview" button 3407 is depressed in the registration frame image shown in FIG. 34 (step S1206—preview), the information data corresponding to the P-code registered in the registration frame are received, and the preview image is displayed, based on such data. Otherwise there are received preview data schematically representing the above-mentioned data and the preview image may be displayed based on such schematic preview data. Also in this step, there may be displayed an image as shown in FIG. 37, for enabling the selection of the sheet size or the sheet direction. When the "OK" button is depressed on the preview image, the sequence returns to the step S1205.

Finally, when the "print" button is depressed on the registration frame image shown in FIG. 34 (step S1206), there is executed the print charge process (step S1210). The print charge process is as shown in FIG. 7. In the present embodiment, the advertisement is assumed to be printed with the predetermined output format in case of the personal information service. However, it is also possible, as in the information print service, to form an "advertisement setting" button in the registration frame image shown in FIG. 34, and to provide a process similar to that of the step S604 and S609 in FIG. 6, after the step S1206.

After the print charge process, there is discriminated whether the printing is charged or not (step S1211). If it is free of charge (step S1211—N), there is immediately executed the printing process (step S1213), but, if it is charged (step S1211—Y), the present process is terminated without executing the printing.

(Mail Print Service)

In case the step S1101 in FIG. 11 identifies that the service type is the mail print service (step S1101—mail print service), there is executed a process for the mail print service (step S1102).

The process of the mail print service is similar to that of the information service shown in FIG. 6, except that the step S602 in FIG. 6 receives the property data and preview image data of the mail instead the property data and preview image data of the information, from the CanDINet control unit 100.

Figure 32:
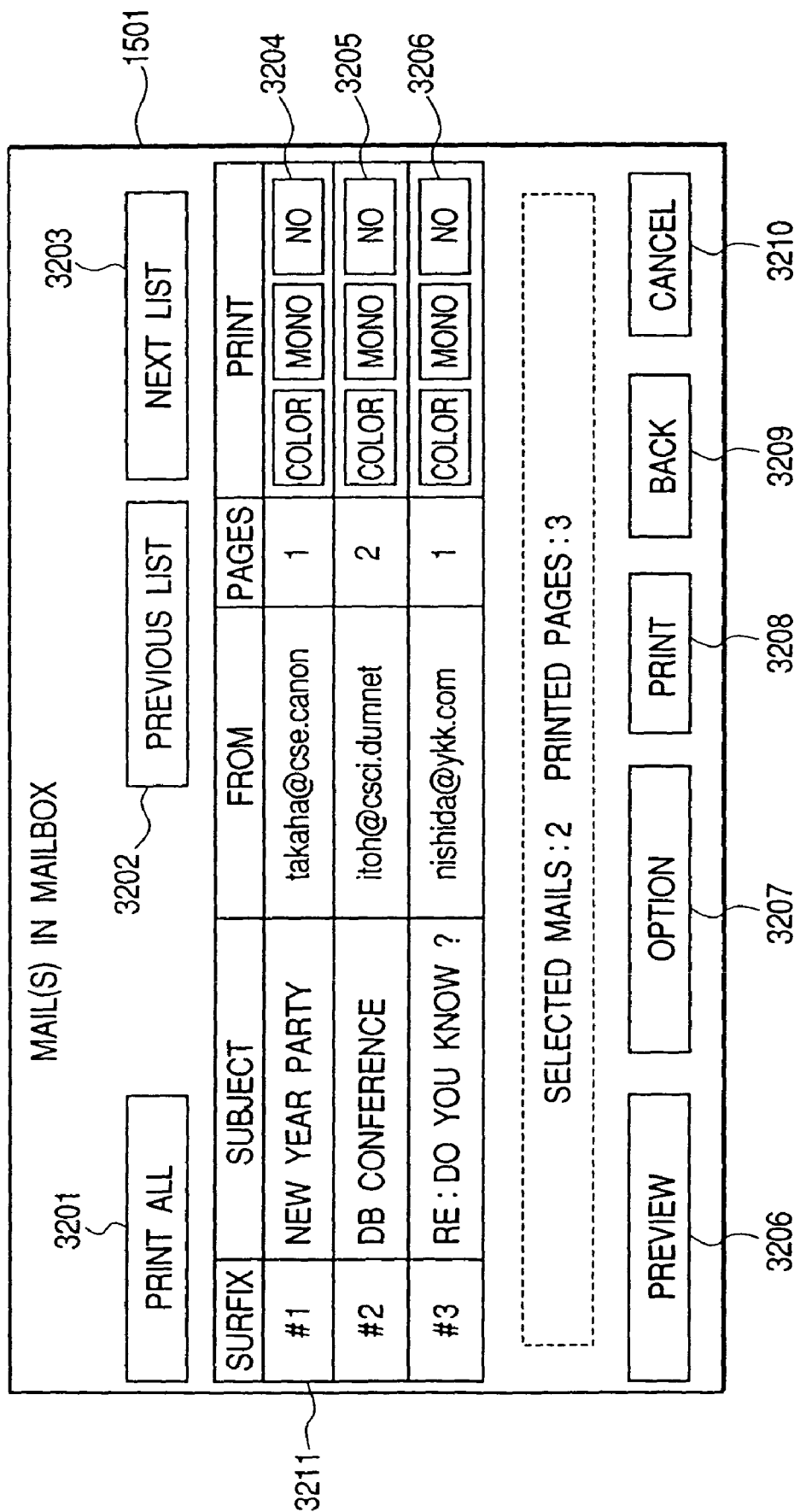
FIG. 32 is a view showing a mailbox display image.
Figure 33:
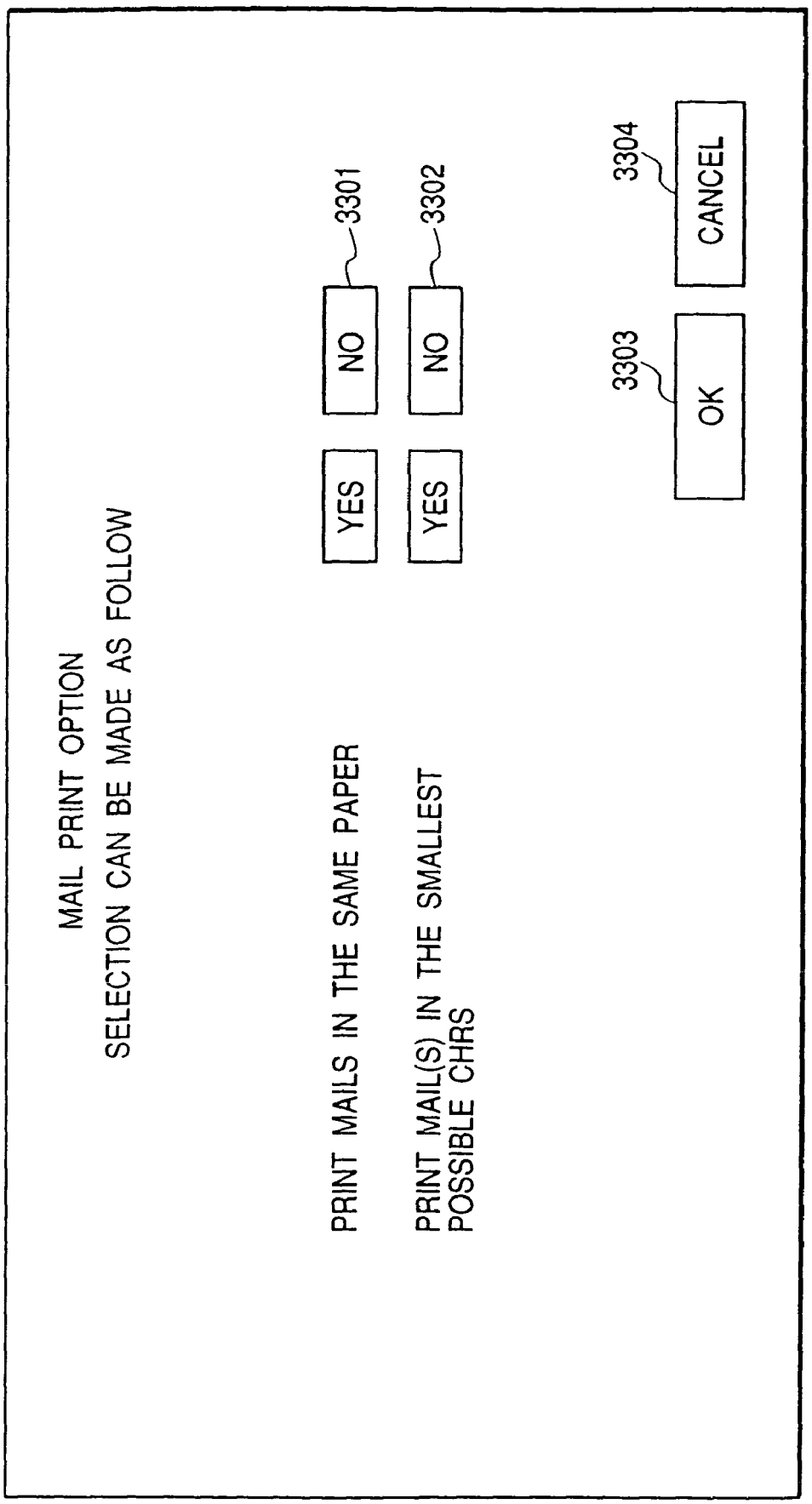
FIG. 33 is a view showing a display image for selecting the mail printout method.

Also the step S602 display a mailbox image shown in FIG. 32, instead of the image shown in FIG. 29. The mailbox image in FIG. 32 includes a mail list 3211 addressed to the user, print setting buttons 3204, 3205, 3206 for the respective items, an "option" button 3207, a "print preview display" button 3207, a "print" button 3208, a "return" button 3209 and a "cancel" button 3210. The difference from the information service process lies in a fact that, when the "option" button is depressed, an image shown in FIG. 33 is displayed to allow the user to select the method of mail printout. As the mails are principally transmitted by text data, plural mails can be collectively printed on a sheet, and the user can execute selection as shown in FIG. 33.

In the present embodiment, the advertisement is assumed to be printed with the predetermined output format in case of the mail print service. It is also possible, however, as in the case of information print service, to provide the "advertisement setting" button in the mailbox image shown in FIG. 32 and to provide a process similar to the steps S604 and S609 in FIG. 6.

(Charge Settling Process)

Each service process is terminated in the step S512 in FIG. 5 but the printing process is not executed in such service process, there is displayed e charge settling image as shown in FIG. 28 (step S514) and a charge settling process is executed (step S515).

The charge settling image shown in FIG. 28 includes a "cash payment" button 2801, a "credit card" button 2802, an "on-line settlement" button 2803, a "debit card" button 2804, a "prepaid card" button 2805 etc. for enabling the user to select a desired method among plural settling methods.

FIG. 9 is a flow chart showing the function of the kiosk terminal 110 in the charge settlement process. After the display of the charge settling image, there is discriminated the button depressed by the user (step S902). If the "cancel" button is depressed (step S902—cancel), an instruction for cancellation is given to the CanDINet control unit 100 and the sequence returns to the step S501 in FIG. 5.

If the "on-line settlement" button 2803 is depressed (step S902—online process), there is displayed an image for entering the name and the password (step S909), and the entered information is transferred to the CanDINet control unit 100 (step S910) for executing a predetermined on-line process.

If the "debit card" or "credit card" button is depressed (step S902—debit/credit card), there is at first read the card information (step S904). Then there is discriminated whether card reading is successful (step S905), and, if not (step S905—N), the sequence returns to the step S904.

If successful (step S905—Y), the on-line process is requested to the CanDINet control unit 100 based on the card information (step S907), and the result of the on-line process is received (step S907). If the result of the on-line process indicates that the settlement is not possible (step S908—No), the sequence returns to the step S902 for causing the user to select another settling method, but, if the settlement is possible (step S908—Yes), the sequence proceeds to the printing process.

Figure 10:
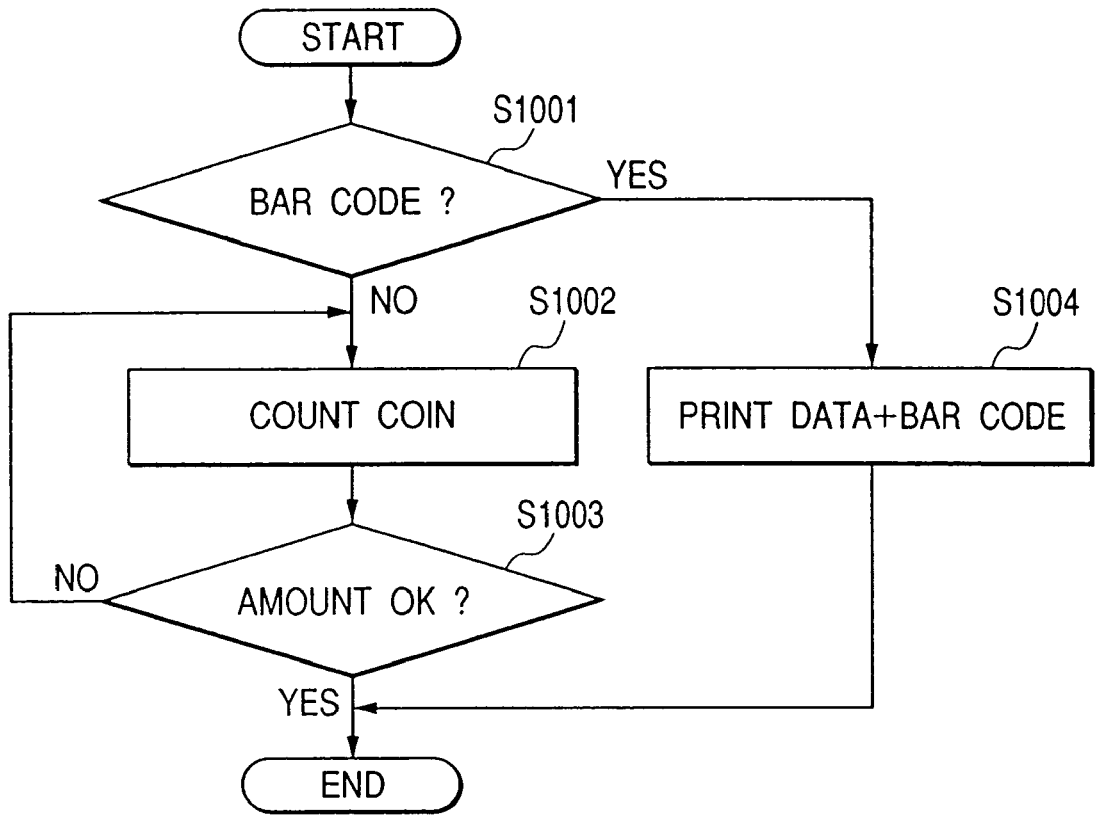
FIG. 10 is a flow chart showing the control sequence of the kiosk terminal 110 in a cash accounting process.

If the "cash payment" button is depressed (step S902—cash), there is executed a cash payment process (step S903). FIG. 10 is a flow chart showing the function of the kiosk terminal 110 in the cash payment process. Depending on the option of the kiosk terminal or the operating principle of the store, the cash payment may be achieved by cash payment at the pay counter of the store or by cash deposit in a coin receiver provided in the kiosk terminal 110.

In cash of cash payment at the store counter, namely in case a bar code is to be printed on the sheet (step S1001—Y), bar code print data are generated according to the print charge, in preparation for attaching to the print data received from the CanDINet control unit 100.

In case of cash deposit into the coin receiver (step S1001—N), there are counted coins (step S1002), and there is discriminated whether the deposited cash covers the print charge (step S1003). The process is terminated when the print charge is paid (step S1003—Yes).

When the settlement is completed by any of the settling methods, the printing process is executed (step S912).

(Generation of Print Data)

Figure 17:
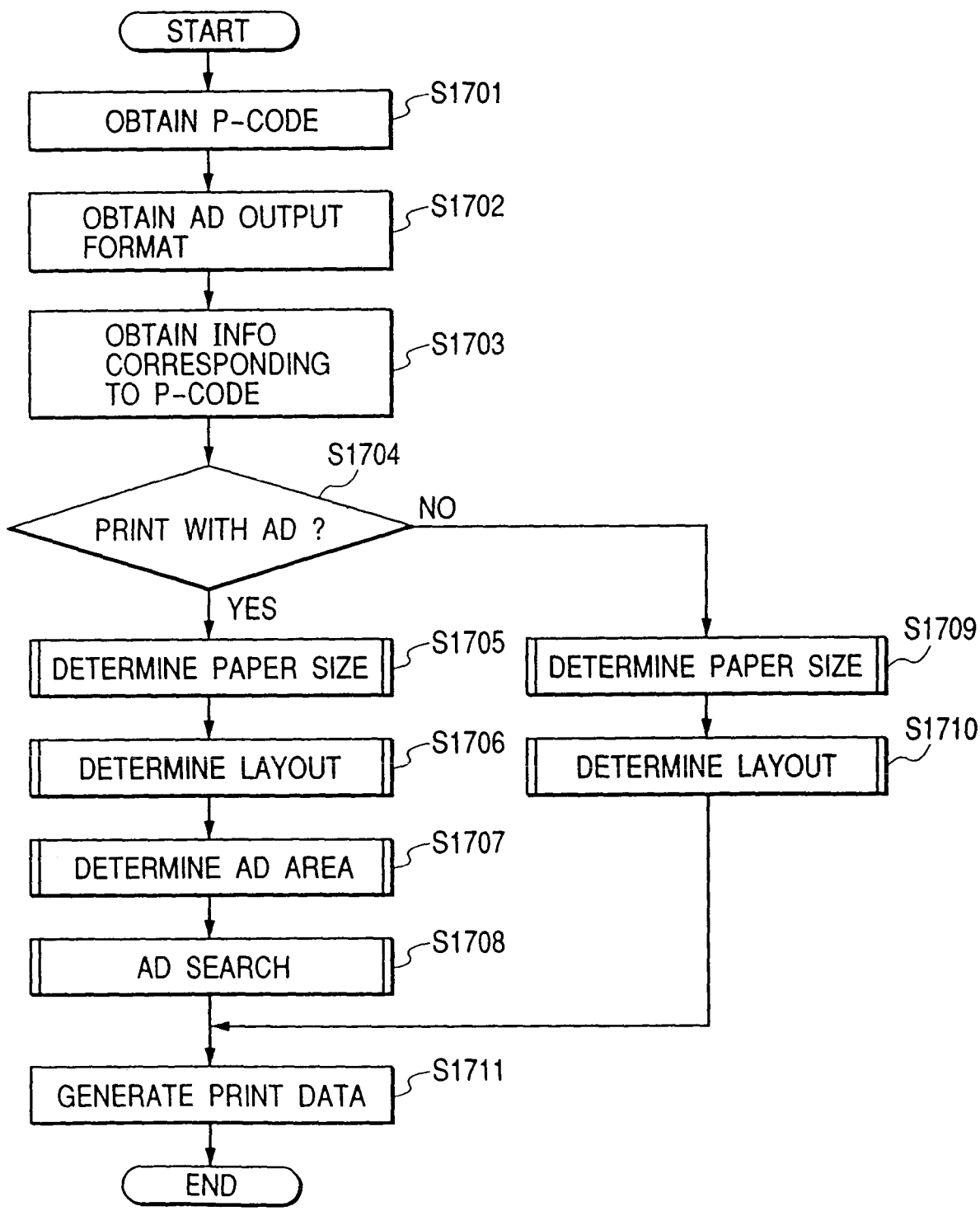
FIG. 17 is a flow chart showing the control sequence of the CanDINet control unit 100 in generating print data with advertisement.
Figure 53:
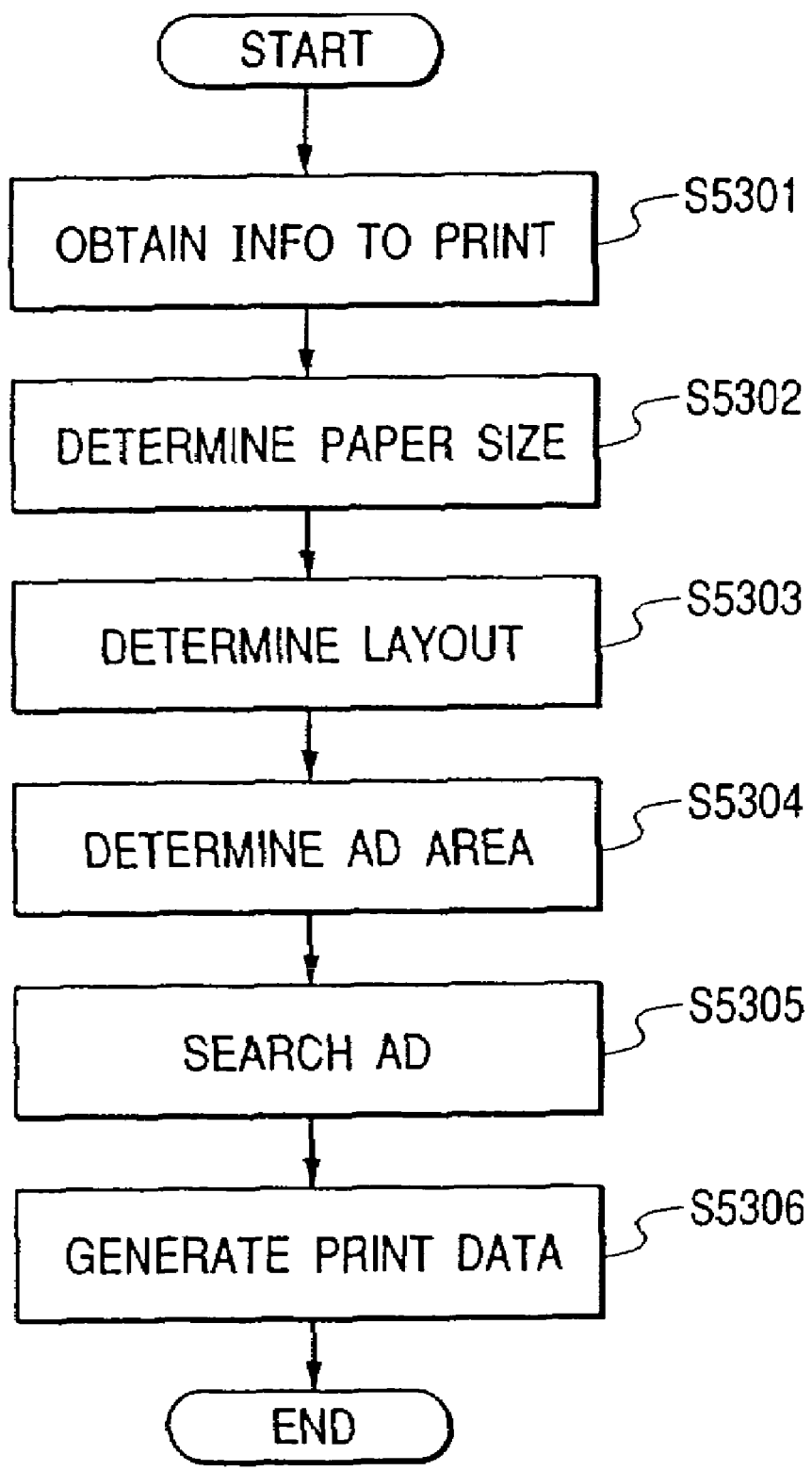
FIG. 53 is a basic flow chart showing the control sequence of the CanDINet control unit 100 in generating print data.

In the following there will be explained the function of the CanDINet control unit 100 in generating the print data, based on the P-code transmitted from the kiosk terminal 110 and the output format of the advertisement. When the print data are requested from the kiosk terminal 110, the CanDINet control unit 100 starts generation of the print data. FIG. 53 is a basic flow chart showing the function of the CanDINet control unit 100 in generating the print data, and FIG. 17 is a flow chart showing the function of the CanDINet control unit 100 in generating the print data with advertisement. In the following description, reference is made to the flow chart shown in FIG. 17. In the following there will principally be explained a case of generating the print data from the information data, but the process remains same even when the information data are replaced by mail data.

At first the CanDINet control unit 100 acquires a P-code for which the user wishes printout (step S1701). When the print data are requested from the kiosk terminal, the P-code is also delivered therefrom, so that the P-code is acquired at this point.

Then the CanDINet control unit 100 acquires the advertisement setting (output format of advertisement) (step S1702). In the information print service in the present embodiment, the user can select the output format of the advertisement on the kiosk terminal 110 (based on the display image shown in FIG. 31), so that the output format transmitted from the kiosk terminal is acquired. Also in case the information provider 130 designates the condition whether or not to insert the advertisement at the issuance of the P-code from the CanDINet control unit 100, such condition is stored in the basic property of the information of the IPO information registration table (1601 in FIG. 46) corresponding to the P-code, so that the output format of the advertisement is determined according to such condition.

Then the information data, corresponding to the P-code acquired in the step S1701, are acquired from the database (step S1703). Also there is discriminated whether or not to generate the print data with advertisement, based on the output format of the advertisement acquired in the step S1702 (step S1704).

In case of generating the print data with advertisement (step S1704—Yes), there are executed in succession a sheet size determination process (step S1705), a layout determination process (step S1706), an advertisement size determination process (step S1707), and an advertisement search process (step S1708). In case of generating the print data without advertisement (step S1704—No), there are executed in succession a sheet size determination process (step S1709) and a layout determination process (step S1710).

These processes will be explained in the following.

(Sheet Size Determination Process)

Figure 18:
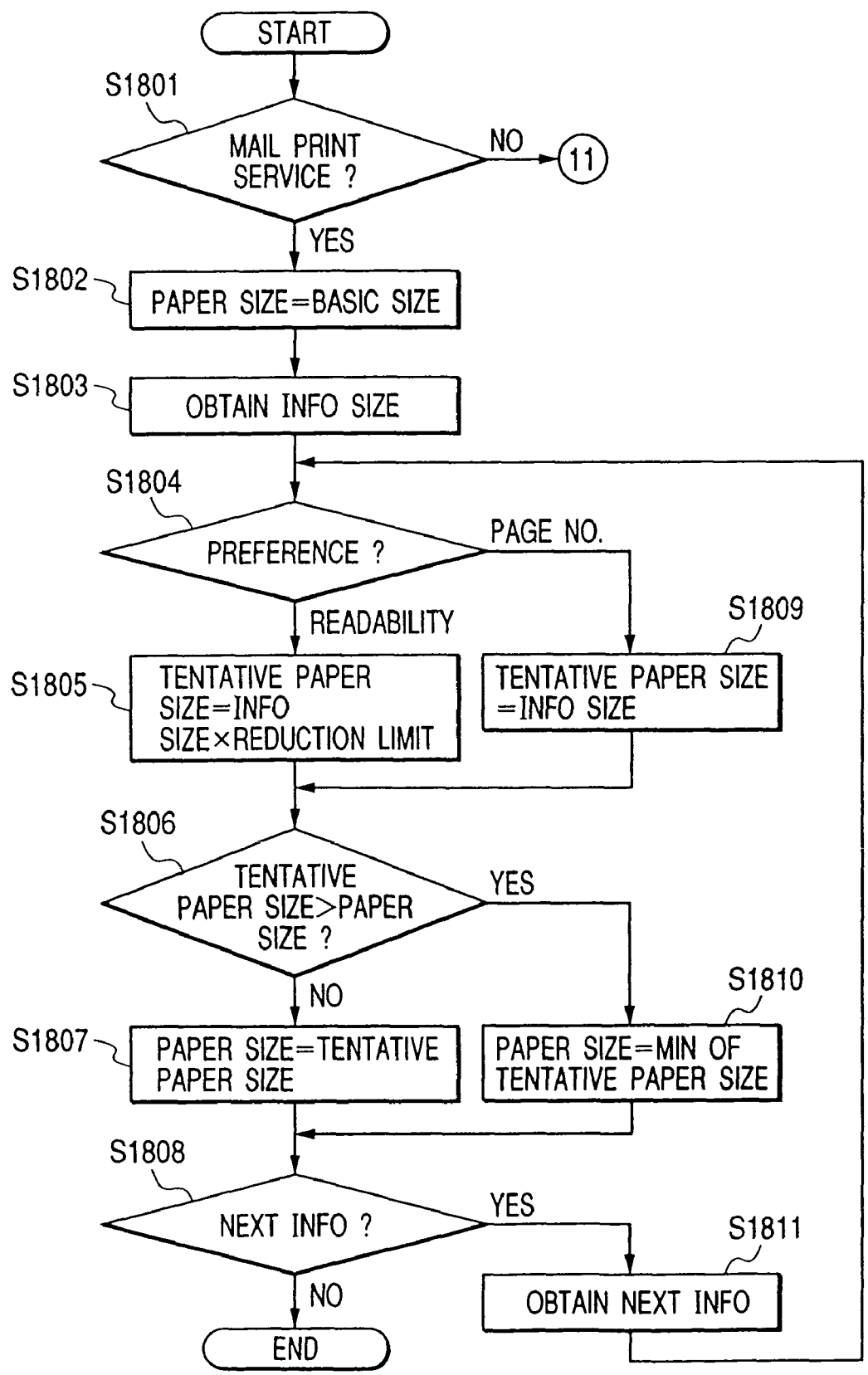
FIG. 18 is a flow chart showing the control sequence of the CanDINet control unit 100 in a sheet size determining process.

FIG. 18 is a flow chart showing the function of the CanDINet control unit 100 in the sheet size determination process.

At first the service type is confirmed, and there is discriminated whether the service type is the mail print service (step S1801). If not the mail print service (step S1801—Y), the process is started according to the flow chart shown in FIG. 18. If the service type is the mail print service (step S1801—N), the process is started according to the flow chart shown in FIG. 19.

At first, a step S1802 sets the sheet size at a basic sheet size. The basic sheet size is the sheet size designated in the registration image shown in FIG. 63 in case the user applies for the registration to the CanDINet control unit 100, or the sheet size designated on a display image as shown in FIG. 37 in case the user can designate the sheet size on such display image on the kiosk terminal. If the user does not execute designation in either case, the basic sheet size is set as A4 size. The information necessary for determining the sheet size is memorized in a table format 4502 in FIG. 45 according to the designation by the user, in case the user applies for the registration to the CanDINet control unit 100, but in a format 4503 in FIG. 45 if the user does not apply for the registration to the CanDINet control unit 100.

Then there is acquired the information size of the initial information data (step S1803). The above-mentioned information size is not the data amount of the information data but indicates the print size on the print sheet. In the present embodiment, when the information provider 130 registers the information data in the CanDINet control unit 100, the setting of printout of the information data is stored in a table format 4501 as shown in FIG. 45.

Figure 45:
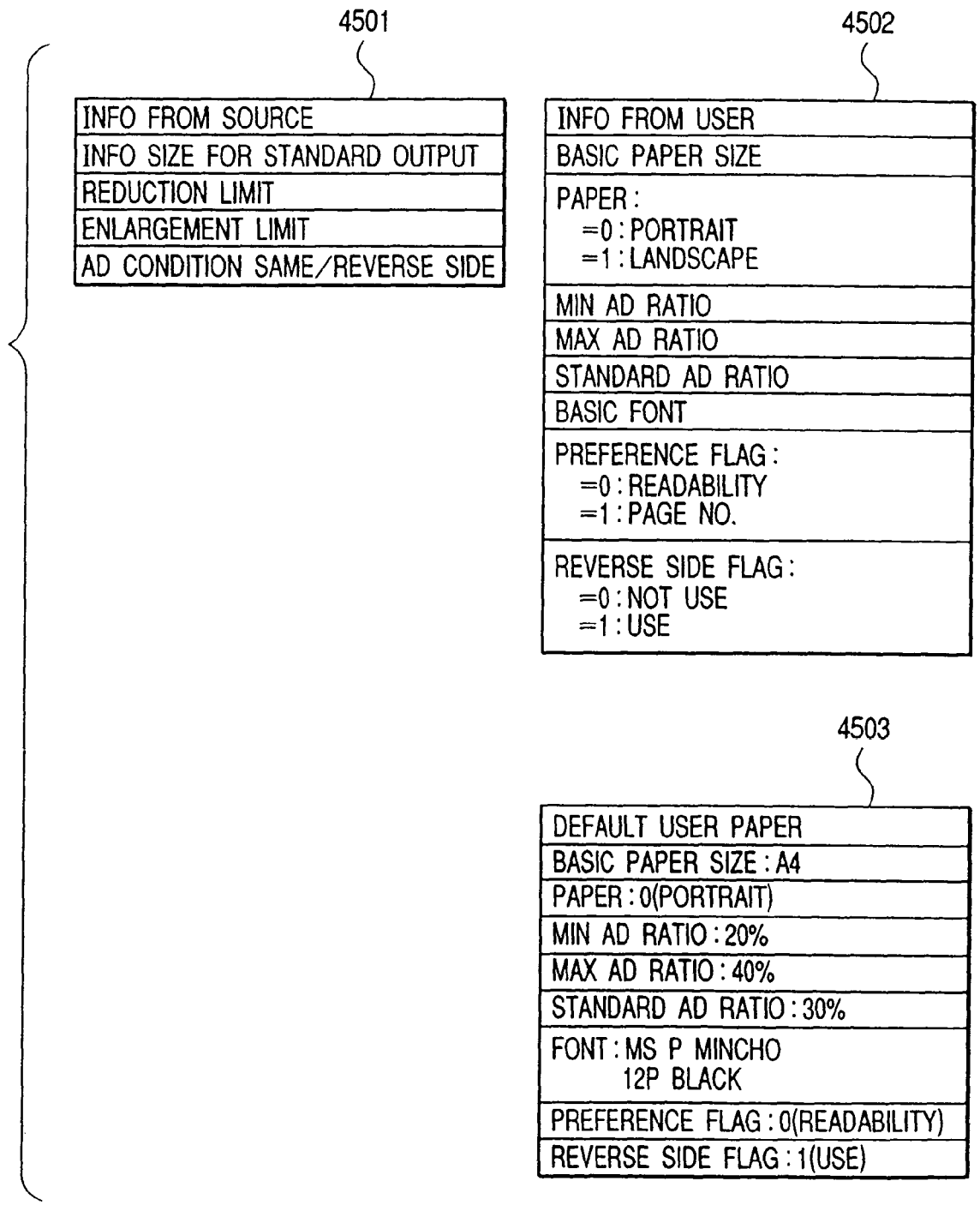
FIG. 45 is a view showing a display image indicating information necessary for determining the sheet size.

Then, according to the priority flag 4502 or 4503 in FIG. 45, there is discriminated whether the priority is given to the visibility or page number in the print data generation (step S1804). If the priority is given to visibility, a temporary sheet size is calculated by information size×reduction limit value (step S1805). If the priority is given to page number, a temporary sheet size is selected equal to the information size (step S1809).

Then there is discriminated whether the temporary sheet size determined in the step S1805 or S1809 is larger than the sheet size (step S1806). If the temporary sheet size is larger than the sheet size (step S1806—Yes), there is selected the minimum sheet size satisfying the condition that sheet size=temporary sheet size (step S1810). If the temporary sheet size is not larger than the sheet size, or if the temporary sheet size is same as the sheet size, the temporary sheet size is selected as the sheet size (step S1807).

Once the sheet size is determined, there is discriminated whether next information data are present (step S1808). If present (step S1808—Yes), there is acquired the information size of such information data (step S1811) and the sequence returns to the step S1804. If the next information data are absent (step S1808—No), the final sheet size is determined from the current sheet size and the standard advertisement ratio, and the present process is terminated.

Figure 19:
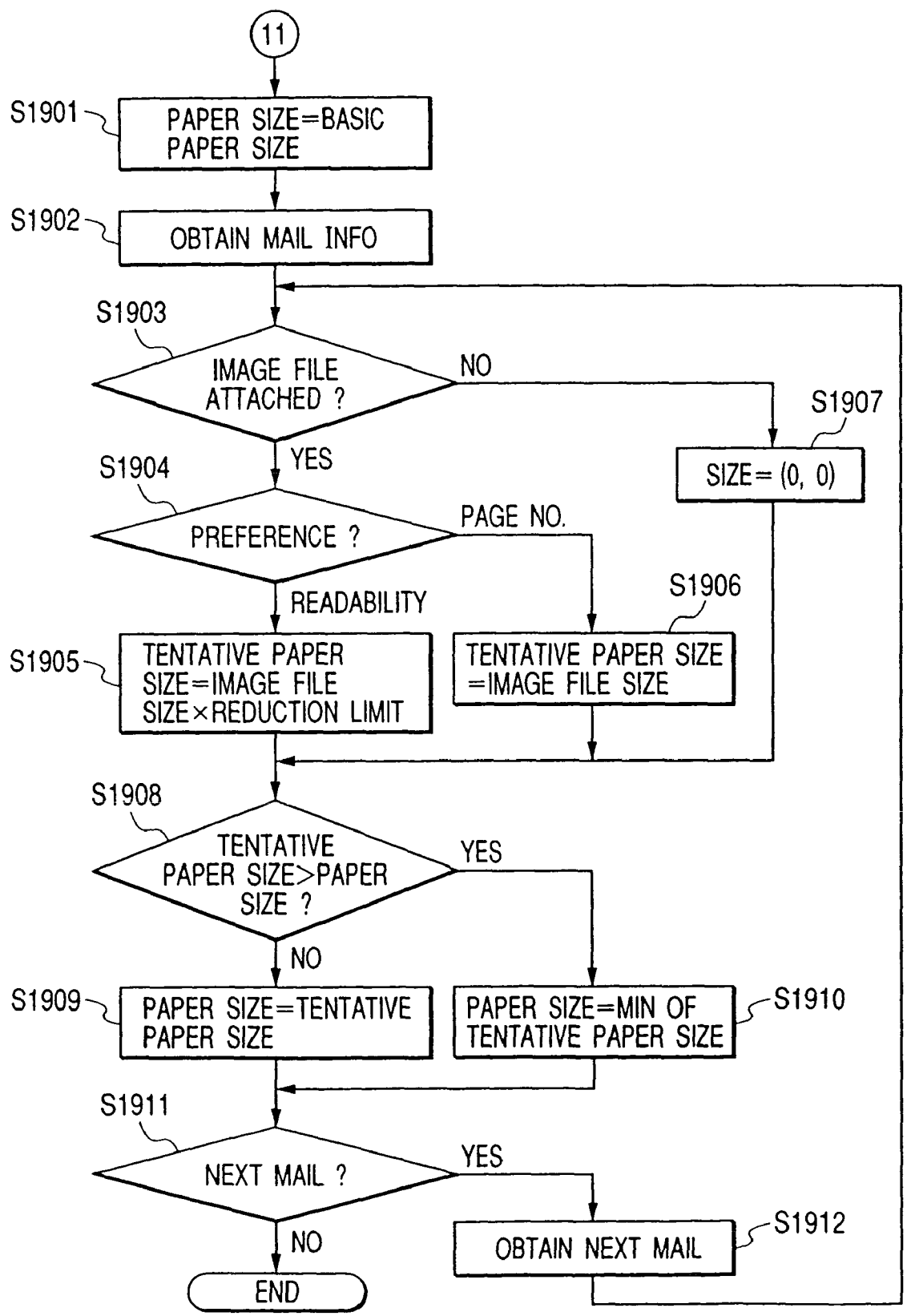
FIG. 19 is a flow chart showing the control sequence of the CanDINet control unit 100 in a sheet size determining process in a mail print service.

On the other hand, if the service type is the mail print service, a process is executed according to the flow chart shown in FIG. 19. At first, a step S1901 sets the sheet size at a basic sheet size. The basic sheet size is the sheet size designated in the registration image shown in FIG. 63 in case the user applies for the registration to the CanDINet control unit 100, or the sheet size designated on a display image as shown in FIG. 37 in case the user can designate the sheet size on such display image on the kiosk terminal. If the user does not execute designation in either case, the basic sheet size is set as A4 size. The information necessary for determining the sheet size is memorized in a table format 4502 in FIG. 45 according to the designation by the user, in case the user applies for the registration to the CanDINet control unit 100, but in a format 4503 in FIG. 45 if the user does not apply for the registration to the CanDINet control unit 100.

Then there is acquired the information on the initial mail (step S1902). The above-mentioned information on mail includes whether the mail has an attached image file, and the size of such image file if it is present.

Then there is discriminated whether an image file is attached to the mail (step S1903). If not attached (step S1903—No), a temporary sheet size is selected as 0×0 (step S1907). If the image file is attached (step S1903—Yes), the sequence proceeds to a step S1904.

Then, according to the priority flag 4502 or 4503 in FIG. 45, there is discriminated whether the priority is given to the visibility or page number in the print data generation (step S1904). If the priority is given to visibility, a temporary sheet size is calculated by image file size×reduction limit value (step S1905). If the priority is given to page number, a temporary sheet size is selected equal to the image file size (step S1906).

Then there is discriminated whether the temporary sheet size determined in the step S1905, S1906 or S1907 is larger than the sheet size (step S1908). If the temporary sheet size is larger than the sheet size (step S1908—Yes), there is selected the minimum sheet size satisfying the condition that sheet size=temporary sheet size (step S1910). If the temporary sheet size is not larger than the sheet size, or if the temporary sheet size is same as the sheet size, the temporary sheet size is selected as the sheet size (step S1909).

Once the sheet size is determined, there is discriminated whether a next mail is present (step S1911). If present (step S1911—Yes), there is acquired the information on such mail (step S1912) and the sequence returns to the step S1903. If the next mail is absent (step S1911—No), the final sheet size is determined from the current sheet size and the advertisement ratio, and the present process is terminated. In the present embodiment, the advertisement ratio is selected same as the standard ratio of the amount of the advertisement 4502 or 4503 in FIG. 45.

(Layout Determination Process)

Figure 20:
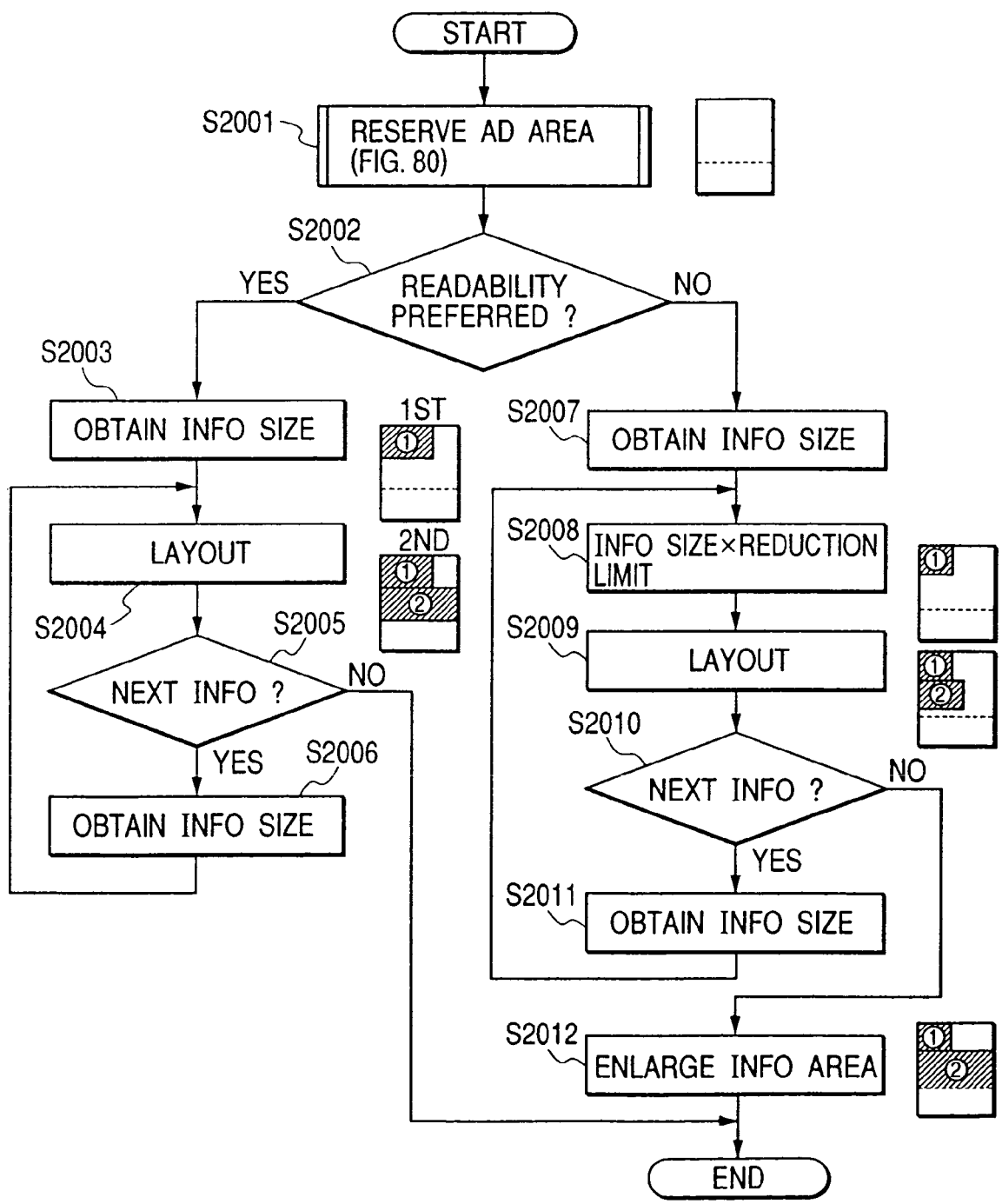
FIG. 20 is a flow chart showing the control sequence of the CanDINet control unit 100 in a layout determining process.

In the following there will be explained the layout determination process. FIG. 20 is a flow chart showing the function of the CanDINet control unit 100 in the layout determination process. At first the CanDINet control unit 100 executes an advertisement area securing process for securing an advertisement area (step S2001).

Figure 80:
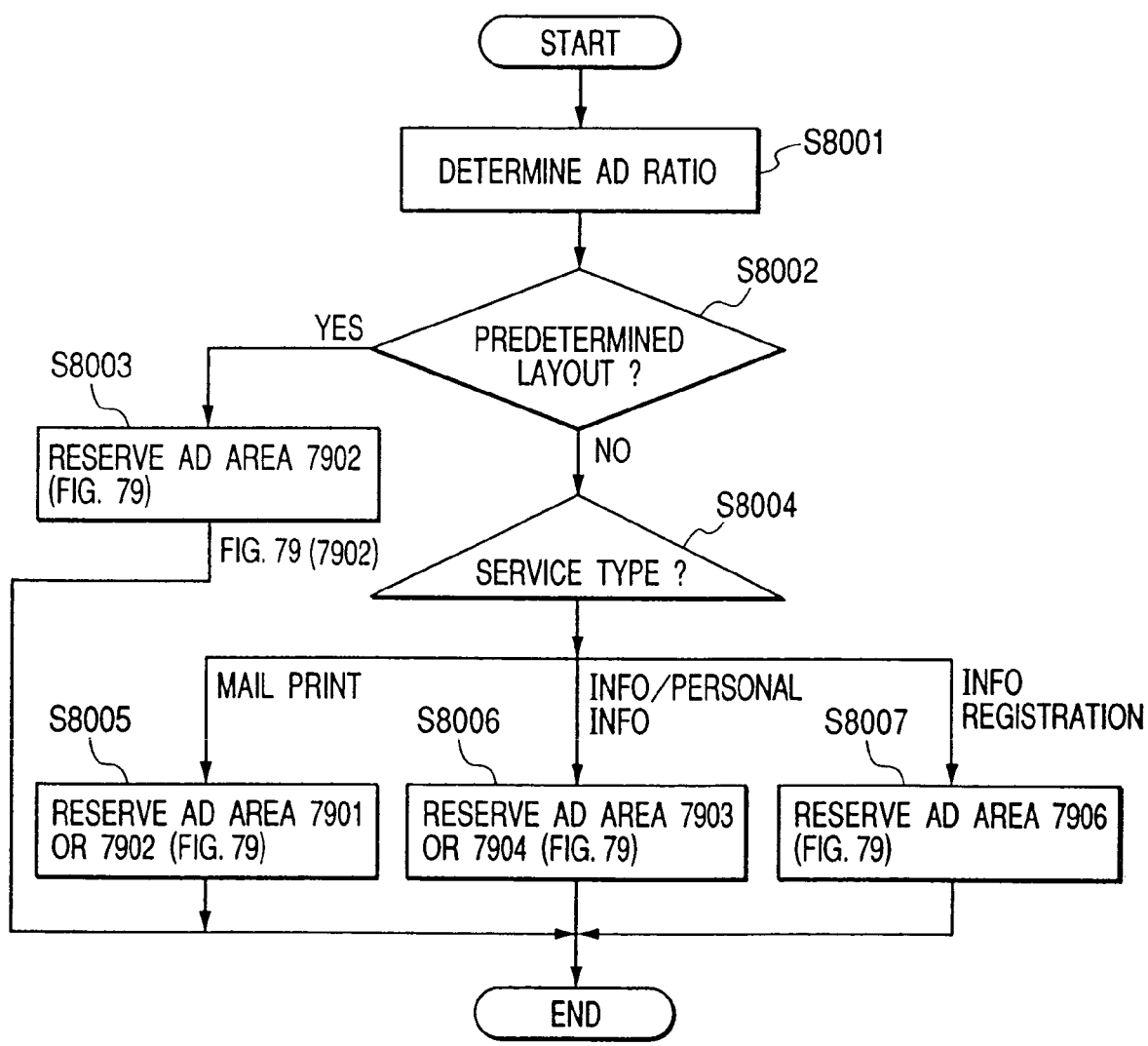
FIG. 80 is a flow chart showing the control sequence of the CanDINet control unit 100 in an advertisement area securing process.

FIG. 80 is a flow chart showing the function of the CanDINet control unit 100 in the advertisement area securing process. At first there is determined the ratio of the amount of advertisement (step S8001). In the present embodiment, the advertisement ratio is selected same as the standard ratio of the amount of the advertisement 4502 or 4503 in FIG. 45. However, if the user selects not to print in the space of the information, in the input image shown in FIG. 31 and also selects either or both of (1) printing the advertisement on the back side and (2) printing the advertisement on the separate sheet, the advertisement ratio in this stage is selected as 0. It is however memorized to form an advertisement area on the back side in case of selection (1), and to form an advertisement area on another sheet in case of selection (2).

Then there is discriminated whether a predetermined layout is to be used for all the services, or the layout is to be changed for different service types. This is determined according to the mode of the CanDINet control unit 100 for providing the advertisement service.

Figure 79:
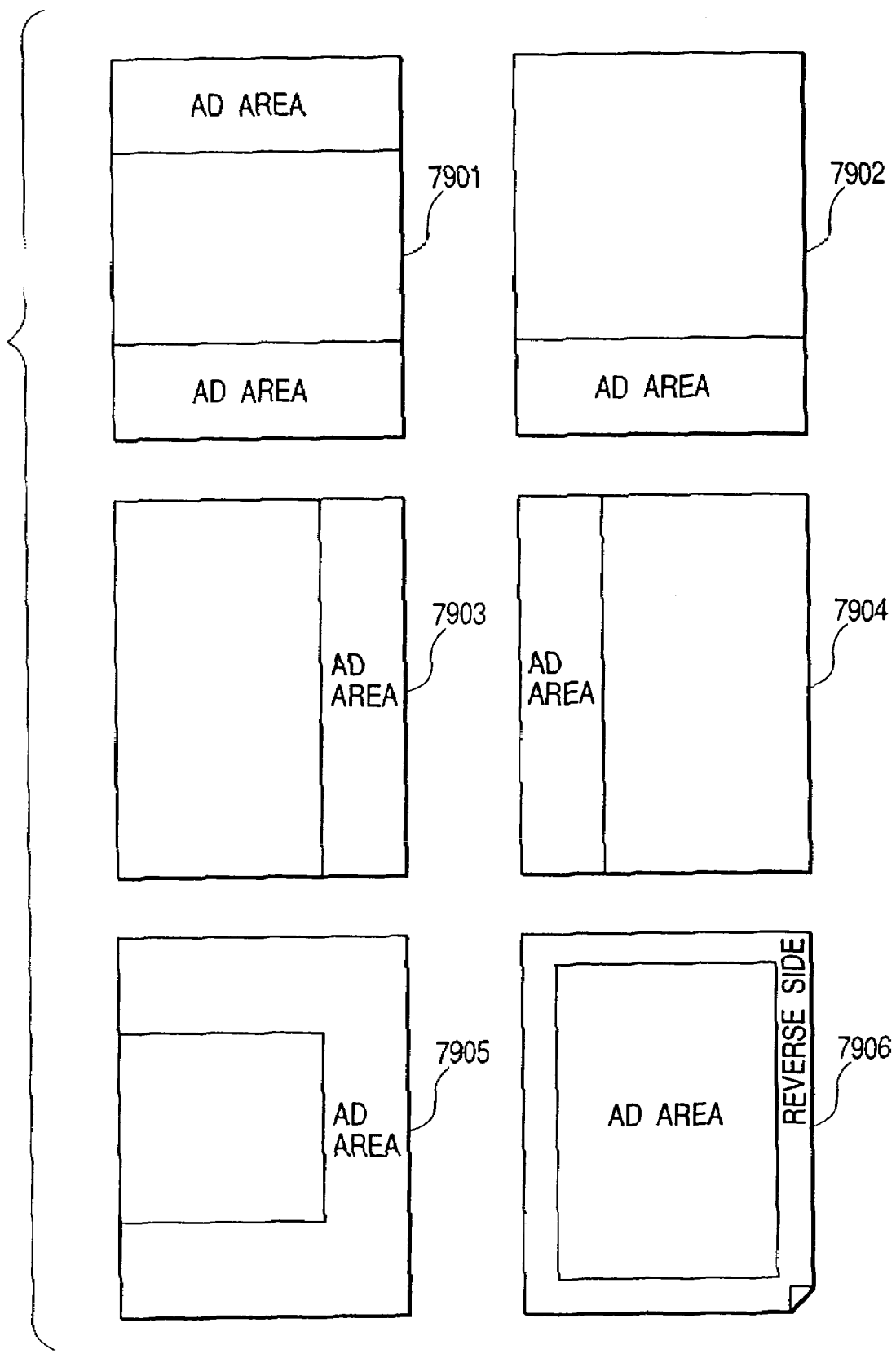
FIG. 79 is a view showing different kinds of layout.

If the predetermined layout is to be used for all the services, the advertisement area is secured with such predetermined layout. In this case, the size of the advertisement area follows the ratio of amount of the advertisement. In the present embodiment, the predetermined layout is given by 7902 in FIG. 79.

If the layout is to be changed according to the service type, the advertisement area is secured with a layout corresponding to each service type. Also in this case, the size of the advertisement area follows the ratio of amount of the advertisement. In the present embodiment, the layout for the mail print service is given by 7901 or 7902 in FIG. 79, that for the information service and the personal information service is given by 7903 or 7904, and that for the information registration service (data deposit service) is given by 7906.

In the flow chart in FIG. 20, there is assumed a layout 7902. After the step S2001, according to the priority flag 4502 or 4503 in FIG. 45, there is discriminated whether the priority is given to the visibility or page number in the print data generation.

If the priority is given to visibility (step S2002—Yes), there is acquired the information size of the initial information data (step S2003). Then the information data are placed at the upper left corner of the sheet (FIG. 20 ①), and there is secured an area corresponding to the information size, for placing such information data (step S2004).

Then there is discriminated whether next information data are present (step S2005). If present (step S2005—Yes), there is acquired the information size of such information data (step S2006). Then such next information data are placed under the initial information data (FIG. 20 ②) and there is secured an area corresponding to the information size for placing such next information data (step S2004). This process is repeated until the next information data are no longer present. In case the step S2004 places the information data and tries to secure the area of the information size for placing such information data but such area overflows from the sheet size or invades the advertisement area, the layout is made on the next page.

If the priority is given to the page number in generating the print data (step S2002—No), there is at first acquired the information size of the initial information data (step S2007), which is then multiplied by the reduction limit value (step S2008). In case the information data include a text and an image, and an item "size variable" is checked in the registration display image shown in FIG. 75, the reduction limit value is multiplied, within the variable range, on each of the text and the image. Then the information data are placed at the upper left corner of the sheet (FIG. 20 ①), and there is secured an area of (information size×reduction limit value), for placing such information data (step S2009).

Then there is discriminated whether next information data are present (step S2010). If present (step S2010—Yes), there is acquired the information size of such information data (step S2011). Then such next information data are placed under the initial information data (FIG. 20 ②) and there is secured an area of (information size×reduction limit value) for placing such next information data (step S2008). This process is repeated until the next information data are no longer present.

When the next information data are no longer present (step S2010—No), the area containing the information data is enlarged within an extent not overflowing from the sheet size and not invading the advertisement area (step S2012), thereby expanding the information data as far as possible.

If the step S2009 places the information data and tries to secure the area of the information size for placing such information data but such area overflows from the sheet size or invades the advertisement area, the layout is made on the next page.

(Advertisement Area Determination Process)

Figure 21:
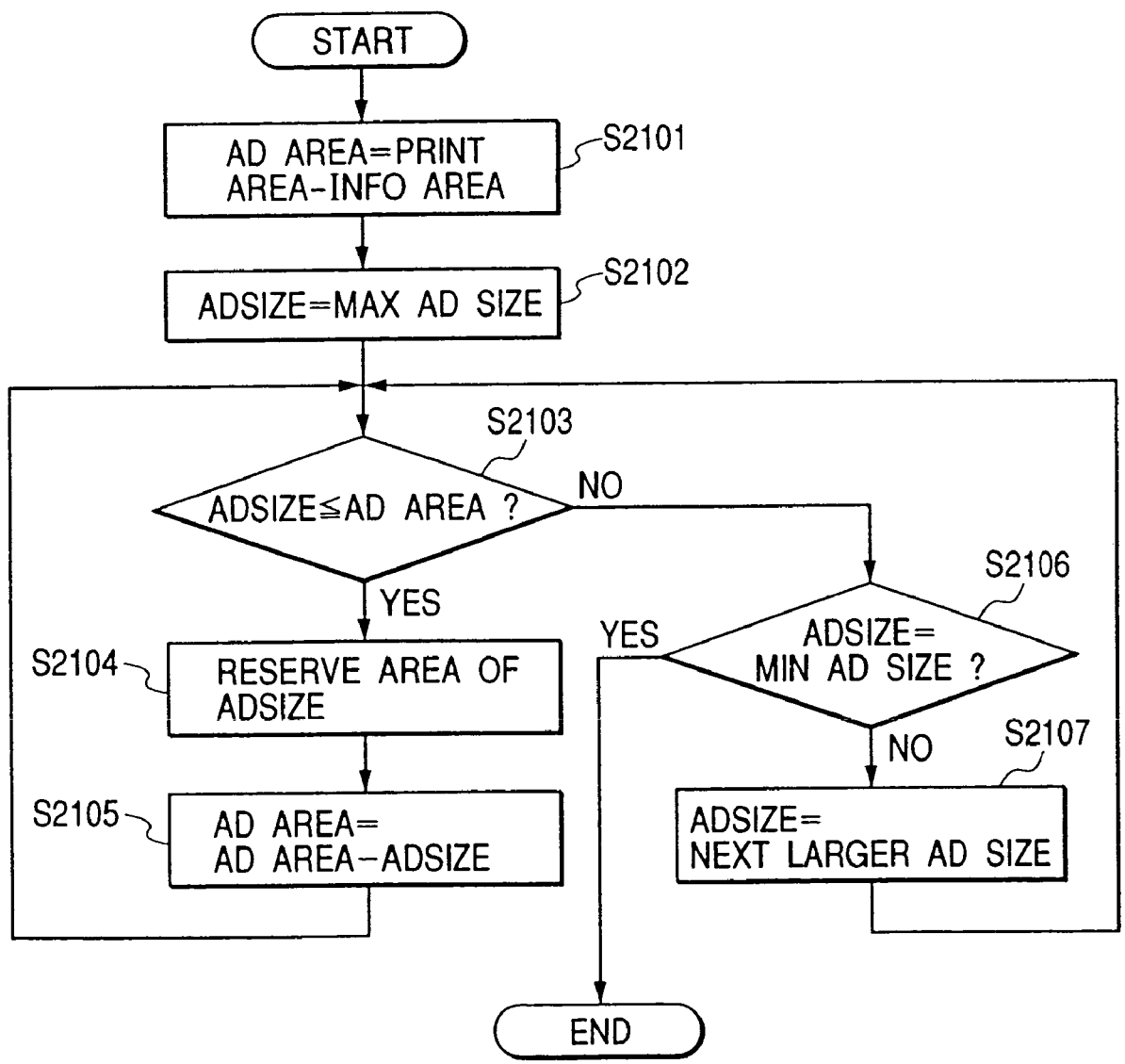
FIG. 21 is a flow chart showing the control sequence of the CanDINet control unit 100 in an advertisement area determining process.

In the following there will be explained a process for determining the advertisement area. FIG. 21 is a flow chart showing the function of the CanDINet control unit 100 in determining the advertisement area.

At first, the advertisement area is selected as the print area by the printing unit of the kiosk terminal minus the information data area (step S2101).

Then there is prepared a variable "advertisement size", which is initially selected as the largest advertisement size (step S8302). In the present embodiment, the advertisement size is limited to predetermined plural sizes. The advertisement provider is to select one of such predetermined sizes at the registration of the advertisement.

Then there is discriminated whether the advertisement size can be accommodated in the advertisement area (step S2103). If accommodatable (step S2103—Yes), there is secured an advertisement area of such advertisement size (step S2104), and the advertisement area is defined as the remaining advertisement area after such securing (step S2105).

If the advertisement size cannot be accommodated in the advertisement area (step S2103—No), there is discriminated whether the advertisement size is the smallest advertisement size (step S2106). If there is a smaller advertisement size (step S2106—No), the next largest advertisement size is selected as the advertisement size (step S2107) and the sequence returns to the step S2103. If there is no smaller advertisement size (step S2106—Yes), the present process is terminated. In the step S2104, there are memorized the secured advertisement size and the secured location.

Figure 83:
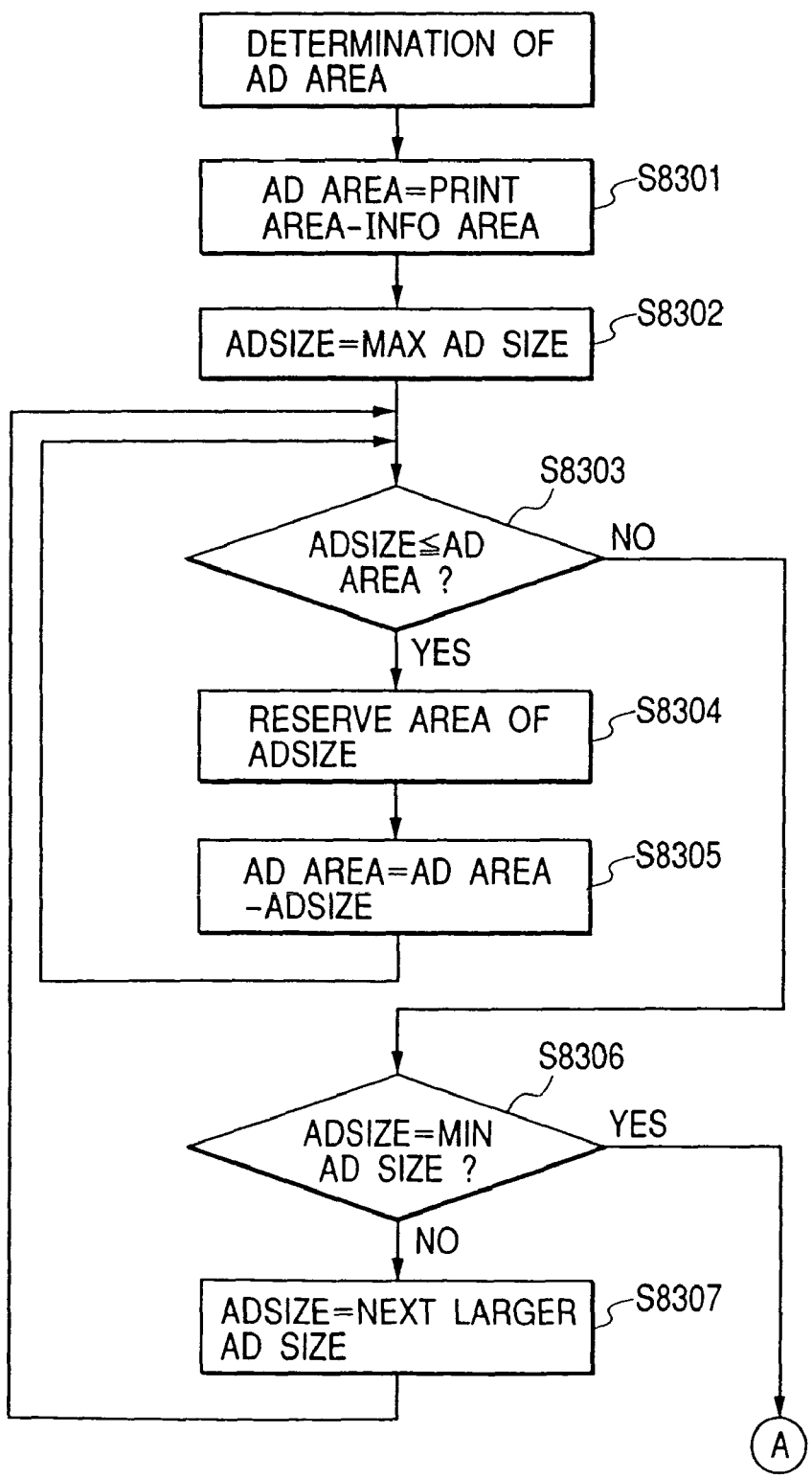
FIG. 83 is a flow chart showing the control sequence of the CanDINet control unit 100 in an advertisement area determining process on the front surface.
Figure 84:
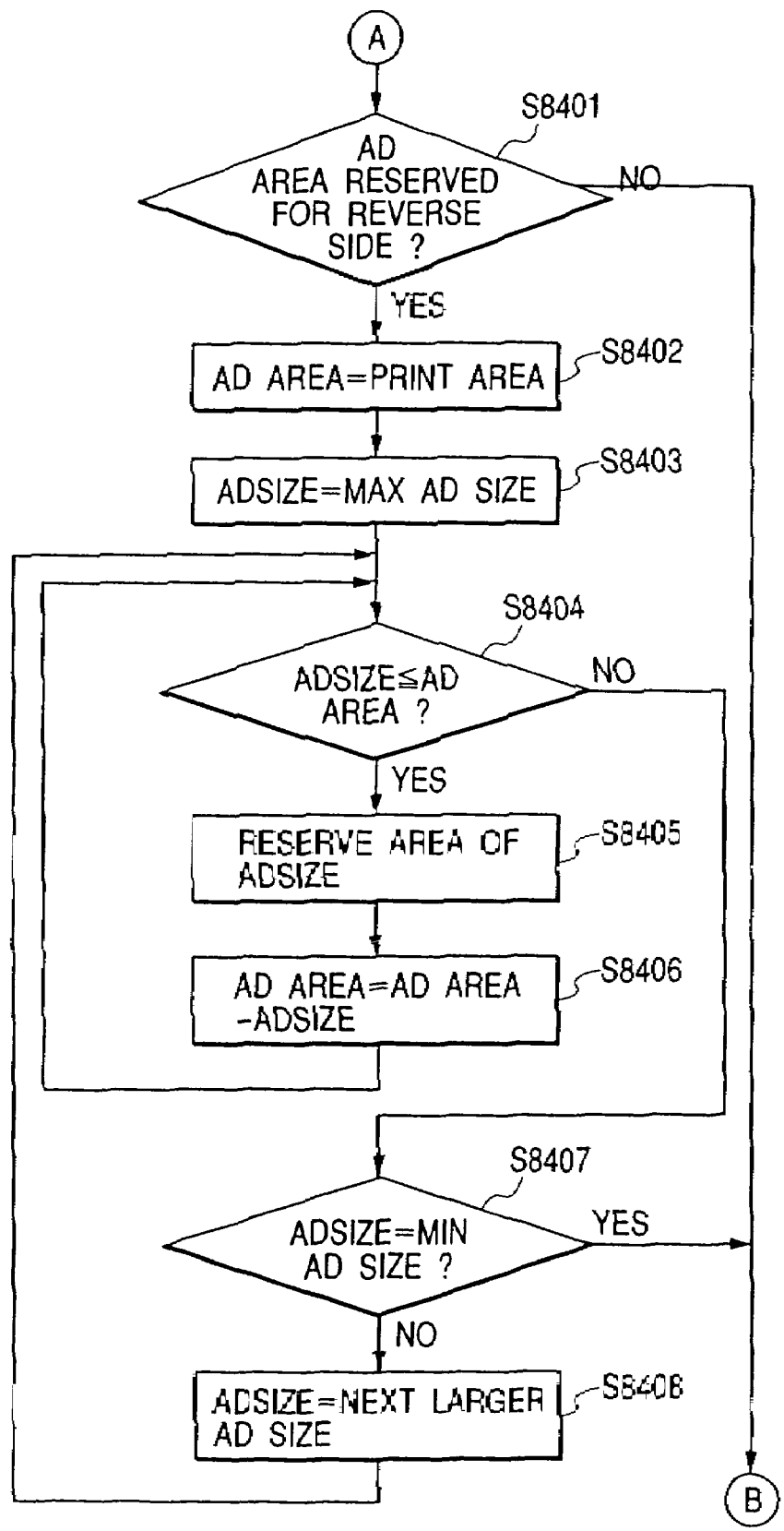
FIG. 84 is a flow chart showing the control sequence of the CanDINet control unit 100 in an advertisement area determining process on the back surface.
Figure 85:
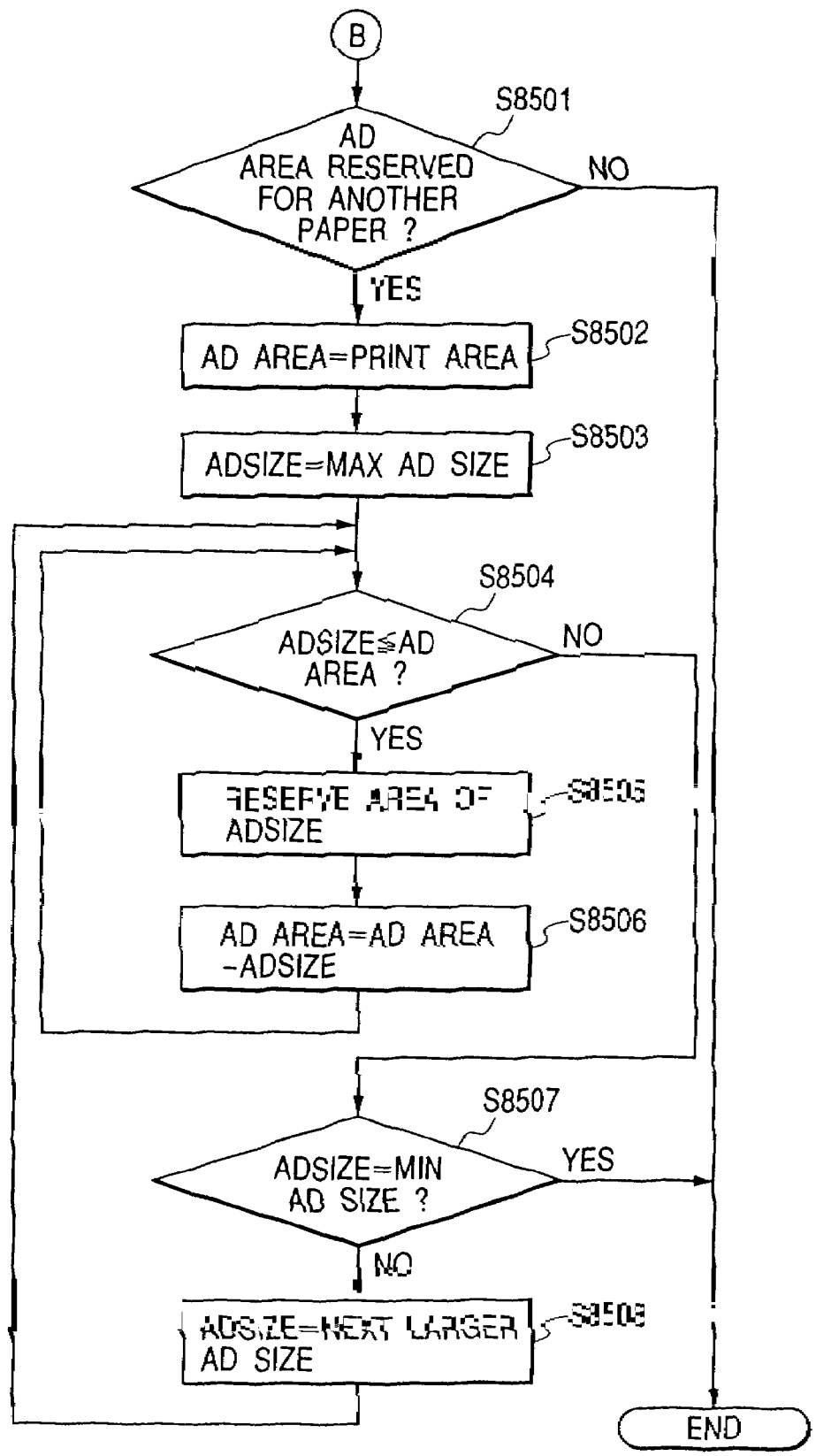
FIG. 85 is a flow chart showing the control sequence of the CanDINet control unit 100 in an advertisement area determining process on a separate sheet.

In the following there will be explained the process of determining the advertisement area in case the advertisement is to be printed on the back side or on another sheet. FIGS. 83 to 85 are flow charts showing the function of the CanDINet control unit 100 in determining the advertisement area.

At first, the advertisement area is selected as the print area by the printing unit of the kiosk terminal minus the information data area (step S8301).

Then there is prepared a variable "advertisement size", which is initially selected as the largest advertisement size (step S8302). In the present embodiment, the advertisement size is limited to predetermined plural sizes. The advertisement provider is to select one of such predetermined sizes at the registration of the advertisement.

Then there is discriminated whether the advertisement size can be accommodated in the advertisement area (step S8303). If accommodatable (step S8303—Yes), there is secured an advertisement area of such advertisement size (step S8304), and the advertisement area is defined as the remaining advertisement area after such securing (step S8305).

If the advertisement size cannot be accommodated in the advertisement area (step S8303—No), there is discriminated whether the advertisement size is the smallest advertisement size (step S8306). If there is a smaller advertisement size (step S8306—No), the next largest advertisement size is selected as the advertisement size (step S8307) and the sequence returns to the step S8303. If there is no smaller advertisement size (step S8306—Yes), the sequence proceeds to a step S84 in FIG. 84.

A flow chart shown in FIG. 84 determines the advertisement area in case the advertisement area is secured on the back side. For this purpose, there is at first discriminated whether an advertisement area is secured on the back side (step S8401). The discrimination is made by checking whether the step S8001 in FIG. 80 has memorized securing the advertisement area on the back side.

If the advertisement area is secured on the back side, the advertisement area is selected as the print area by the printing unit of the kiosk terminal minus the information data area (step S8402). Steps S8403 to 8408 will not be explained as they are similar to the step S8303 to S8308 in FIG. 83. In case the step S8407 identifies the absence of smaller advertisement size, the sequence proceeds to a step S8501 in FIG. 85.

When an advertisement area is secured in another sheet, the flow chart in FIG. 85 executes a process for determining the advertisement area. For this purpose, there is at first discriminated whether an advertisement area is secured on another sheet (step S8501). The discrimination is made by checking whether the step S8001 in FIG. 80 has memorized securing the advertisement area on another sheet.

If the advertisement area is secured on another sheet, the advertisement area is selected as the print area by the printing unit of the kiosk terminal (step S8502). Steps S8503 to 8508 will not be explained as they are similar to the step S8303 to S8308 in FIG. 83. In case the step S8507 identifies the absence of smaller advertisement size, the advertisement area determining process is terminated. The steps S8304, S8404 and S8504 memorize the secured advertisement size and the secured location.

Figure 54:
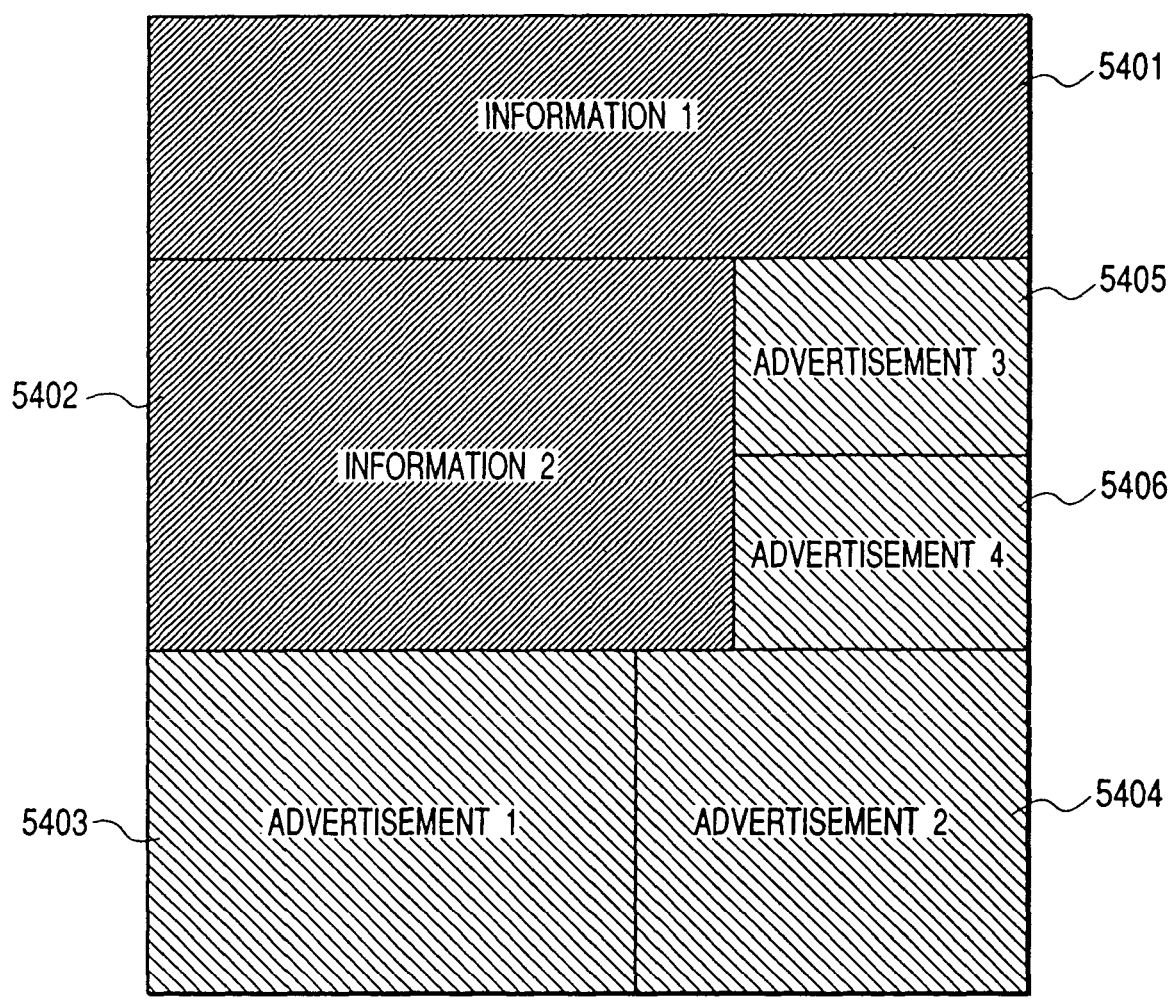
FIG. 54 is a view showing an example of layout of advertisement data.

In an example shown in FIG. 54, the advertisement areas are secured in succession for the advertisements 1, 2, 3 and 4, with respective areas of 10×20, 10×10, 5×10 and 5×10.

(Registration of Advertisement)

In the present embodiment, the advertisement provider wishing to insert an advertisement applies for registration to the CanDINet control unit 100. For this purpose, the advertisement provider makes access to the CanDINet control unit 100 through the network and enters information necessary for the registration on the registration display images as shown in FIGS. 64 to 70.

On the registration display image shown in FIG. 64, the advertisement provider enters the name and the contact address. If the registration is already applied for, there may be entered a password for changing the registration. On the registration display image shown in FIG. 65, there are designated the image data and text data (hereinafter collectively called advertisement data) for advertisement insertion, whereby the advertisement data are transferred to the CanDINet control unit 100.

On the registration display image shown in FIG. 66, the advertisement provider designates the starting data and the effective period of the advertisement insertion. The advertisement data are no longer used for advertisement insertion when the effective period after the starting date expires. On the registration display image in FIG. 67, a limitation can be designated on the geographical area in which the advertisement data are printed.

Figure 68:
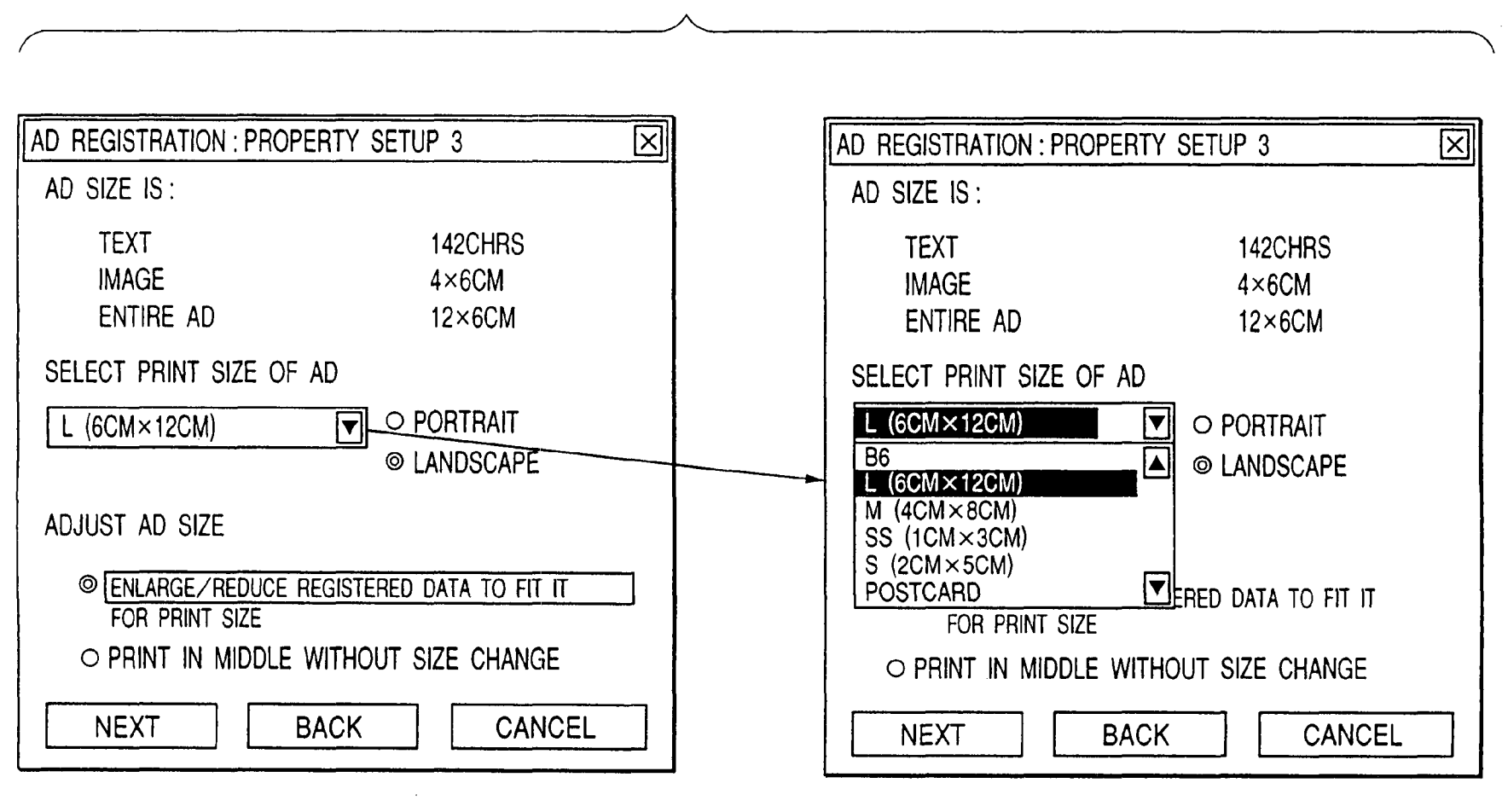

On the registration display image shown in FIG. 68, the advertisement provider can select the printed advertisement size among the predetermined sizes, and whether the advertisement size can be changed or not.

Also on the registration display image shown in FIG. 69, there can be designated a full-page advertisement, a top-printed advertisement or a back-printed advertisement. On the registration display image shown in FIG. 70, there can be designated a limit on the number of printings of the advertisement and a limit on the print charge.

After the registering operation of the advertisement provider on the registration images in FIGS. 64 to 70, the Can- DINet control unit 100 issues a P-code to such advertisement data. At the same time an advertisement information table corresponding to such P-code is prepared from the information entered on the registration display images and is stored in the P-code DB.

FIG. 47 shows an example of the advertisement information table 4701, containing the P-code in the left-end column. The table also contains the property of the advertisement corresponding to the P-code and the file information of the advertisement data.

(Advertisement Search Process)

Figure 22:
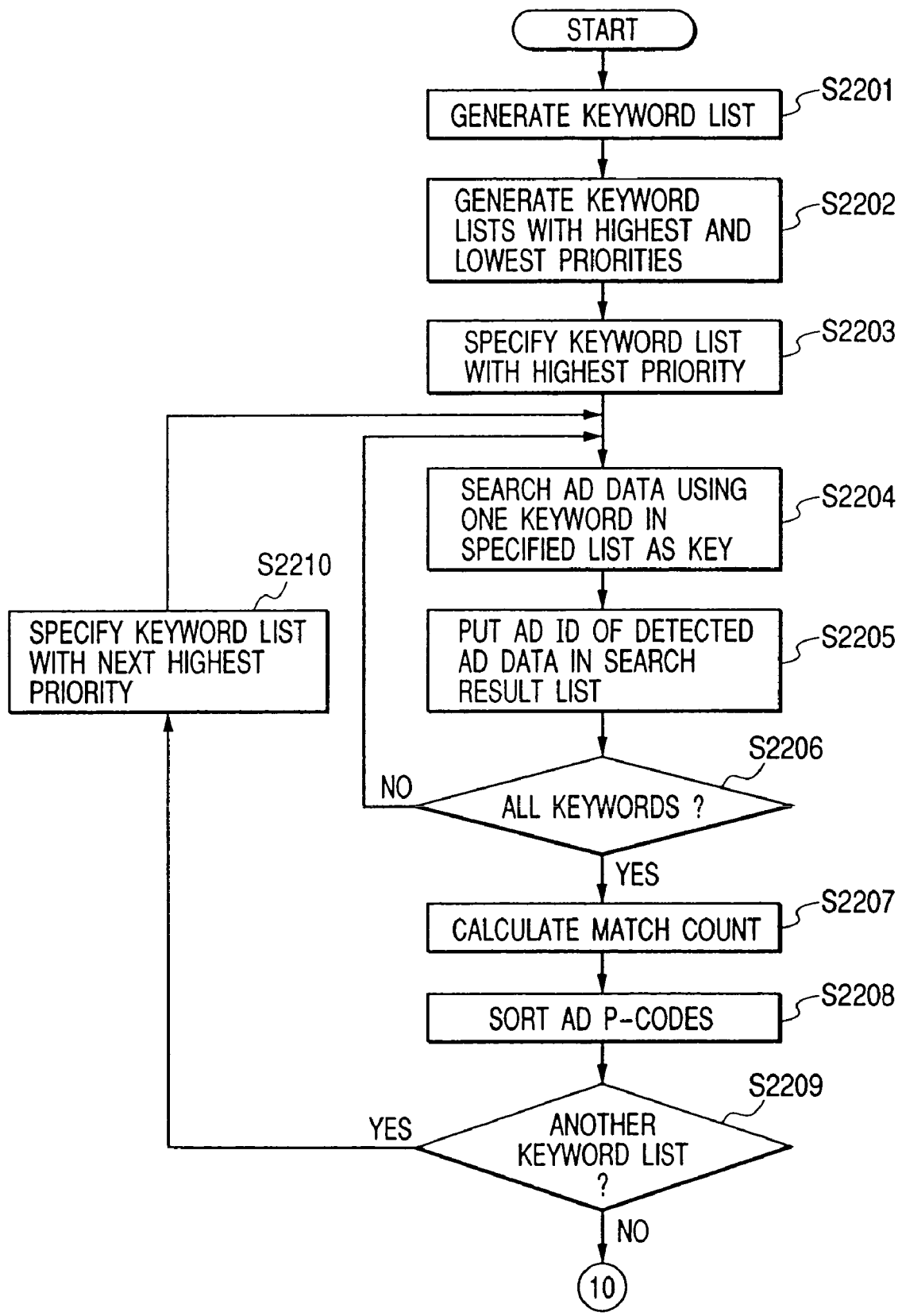
FIG. 22 is a flow chart showing the control sequence of the CanDINet control unit 100 in an advertisement search process.

In the following there will be explained the advertisement search process in the step S1711 in FIG. 17. FIG. 22 is a flow chart showing the function of the CanDINet control unit 100 in the advertisement search process. At first there is prepared a keyword list for searching the advertisement to be inserted (step S2201). The keyword list is prepared, according to the service type, either from the keyword list memorized in the basic property of the information of the IP information registration table (4601 in FIG. 46) corresponding to the P-code of the information data to be printed, or from the user profile of the user information table (4801 in FIGS. 48A and 48B) corresponding to the P-code of the user, or from the terminal information table (FIG. 52) relating to the kiosk terminal executing the printing operation.

FIG. 57 shows an example of the keyword list 5701 prepared from the IP information registration table relating to the P-code corresponding to the article (information data). The keyword list contains keywords and weights thereof in pair.

FIG. 57 also shows an example of the keyword list 5702 prepared from the terminal information table. The keywords are "Shibuya" and "Tokyo", since this kiosk terminal is placed in Shibuya in Tokyo city.

Then there are prepared a keyword list of highest priority and a keyword list of lowest priority. The highest priority keyword list is prepared when a group of specified advertisements is to be preferentially inserted with a limitation in the geographical area or in time. Also the lowest priority keyword list is prepared for example when the keyword list is not prepared in the step S2202.

The above-mentioned plural keyword lists are arranged in the descending order of priority as indicated by 5703 in FIG. 57, and the keyword list of the highest priority is specified (step S2203).

Then a keyword in thus specified keyword list is used as the search key for searching the advertisement data (step S2204). The P-code (advertisement ID) of the detected advertisement data is entered in a search result list (step S2205). Then there is discriminated whether the search has been executed with all the keywords in the specified keyword list as the search key (step S2206), and, if executed (step S2206—Yes), the sequence proceeds to a step S2207, but, if not, the sequence returns to the step S2204.

A step S2207 determines the level of matching on the advertisement data have the advertisement P-code in the search result list. The matching level is calculated by multiplying the weight of the keyword detecting the advertisement data by the priority of the keyword list to which the keyword belongs. It is also possible to determine the matching level anew from the effective period, number of prints, upper limit charge, upper limit print number, unit charge etc. contained in the property of the advertisement relating to the advertisement P-code and to add such matching level to the above-mentioned matching level. It is furthermore possible to determine the matching level anew, higher for a higher freedom of the advertisement, based on the inserting position setting, size adjusting method, laterally or vertically oblong positioning etc. in the property of the advertisement, and to add such matching level to the above-mentioned matching level.

After the matching level is determined for all the advertisements, the advertisement P-codes in the search result list are sorted with the matching level. FIG. 57 shows an example of the final search result list 5704.

After the above-described process is executed for a keyword list, there is discriminated whether there is present another keyword list (step S2209). If present (step S2209—Yes), there is specified a keyword list of the next highest priority (step S2210) and the sequence returns to the step S2204.

(Generation of Print Data)

Finally there will be explained the generation of the print data in the step S1711 in FIG. 17. In this step, the print data are generated by selecting to the advertisement data to be inserted, from the secured advertisement size and the secured location stored in the advertisement size determination process of the step S1707 and from the search result list prepared in the advertisement search process in the step S1708.

The CanDINet control unit 100 selects the advertisement data to be inserted, by discriminating, in the descending order of matching level of the advertisement P-code in the search result list, whether the advertisement size memorized in the advertisement information table corresponding to such P-code matches the advertisement size determined in the advertisement size determination process. In this operation, consideration is made not only on the advertisement size but also on whether the size is adjustable.

Figure 55:
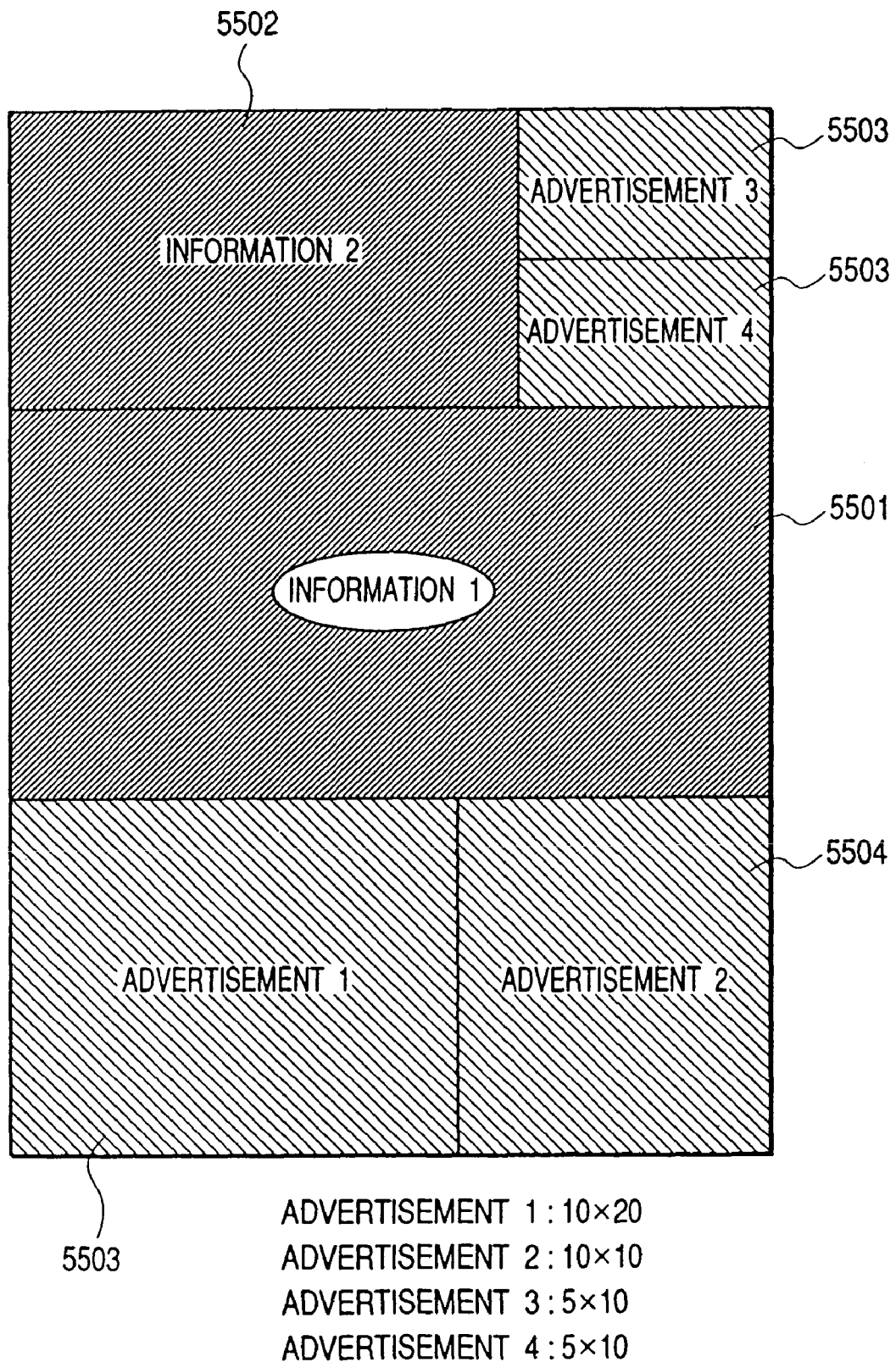
FIG. 55 is a view showing an example of layout of the advertisement data after layout change.
Figure 59:
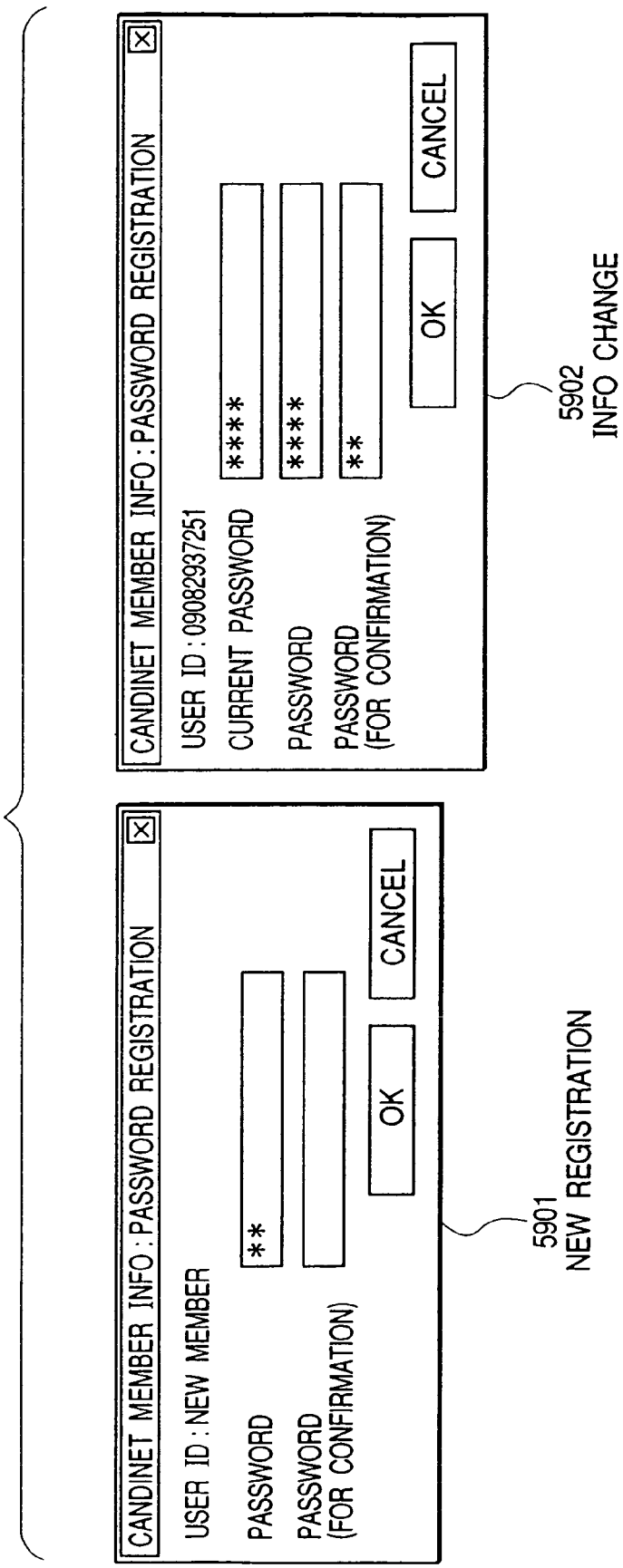
FIG. 59 is a view showing a registration display image for entering a password required for changing the content of the user registration.

Also if the selected advertisement data include an advertisement designated for page-top insertion, the layout is also changed. For example, if advertisement data designated for page-top insertion are selected for the advertisement 3 in FIG. 54, the layout is changed as shown in FIG. 55.

FIG. 56 shows an example of the printout of thus generated print data.

In case the output format of the advertisement determined in the step S1702 in FIG. 17 designates the advertisement printing on the back side or advertisement printing also on the back side, there are at first generated the print data for outputting the information data with the layout determined in the layout determination process (step S1706 in FIG. 17) and then generated are the print data for printing the selected advertisement data on the back side.

Also in case the output format of the advertisement determined in the step S1702 in FIG. 17 designates the advertisement printing on another sheet, there are at first generated the print data for outputting the information data with the layout determined in the layout determination process (step S1706 in FIG. 17) and, after a page change, there are generated the print data for printing the selected advertisement data on a next page.

As detailedly explained in the foregoing, the present invention allows to provide a method and a system for information registration/acquisition in a network, and an information processing method, an output control method, an apparatus and a system therefor, including a terminal capable of printing process.

Also there can be provided an information processing method, an output control method, an apparatus and a system therefor, capable of attaching, in optimum manner, a sponcer advertisement which bears a cost for reducing the information acquiring cost for the user.

Also there can be provided an information processing method, an output control method, an apparatus and a system therefor, allowing to assign a code to a user mail and to enable mail acquisition by the code, in order to meet the requirements that the electronic mail information sent to the mobile terminal cannot be fully displayed or is to be printed out because of the poor legibility or for the purpose of storage, or that the user without the mobile terminal wishes to read the electronic mail outside his office.

Also there can be provided an information processing method, an output control method, an apparatus and a system therefor, allowing not only to acquire the individual information by a code but also to assign a code specific to the user to the information selected and integrated according to the desire of the user, and to acquire such information by the code.

Also there can be provided an information processing method, an output control method, an apparatus and a system therefor, allowing the user to temporarily deposit information owned by the user from a terminal, to acquired an assigned code and to extract the deposited information at any time and at any location by a person knowing such assigned code.

Also there is provided a U/I including the control command to shorten the input code and to simplify the U/I. The auxiliary information is entered by interactive manner utilizing GUI, and such method is easier than the mere inorganic code for understanding by the user.

Also the insertion of advertisement variably reduces the charge to be paid by the user, thereby simulating increase in the use of information.

Also the printed character or image can be expanded or reduced in size within a tolerable range not deteriorating the quality of the obtained print.

Also the advertisement is charged according to the amount of printing, with an upper or lower limit. Such limit avoids unlimited payment of the advertisement charge.

Also the variable print charge can be indicated by printing a bar code together with the printing of the information and can be promptly settled, without error, by reading such bar code.

Also the printing of the advertisement on the back side allows effective utilization of the sheet area even with a simple layout rule, and the advertisement can be inserted without influencing the layout of the information. Also the value of the advertisement is not much lowered since the back side of paper is always visible to the user. Also there can be provided a large advertisement utilizing the entire space of the sheet.

Also the selection of various information at the store counter can be collectively covered under the unified print instruction, whereby the desired information can be printed by simple operations without cumbersome procedures.

By installing the information access terminal at the convenience store or the like and obtaining the inexpensive (even free of charge by including advertisement) prints, the user is allowed to acquire simplified information from the mobile terminal and detailed information by print on paper. Such configuration drastically improves the convenience of access to information, and stimulates the sales activity in the convenience store as such location attracts more people.

Also the user can acquire the necessary information every day by frame registration of a frame or a layout to the personal P-code system.

What is claimed is:

1. An image forming system comprising an advertiser apparatus, an information control apparatus and an image forming apparatus, wherein said advertiser apparatus provides advertisement data, said information control apparatus manages output information, and said image forming apparatus prints print data generated from the output information and the advertisement data and charges for printing of the print data so that a printing fee for printing of the output information is reduced in accordance with the printing of the advertisement data, said advertiser apparatus comprising:
a memory which stores a first computer program; and
a processor that executes the first computer program stored in said memory included in said advertiser apparatus, the first computer program comprising computer executable code that performs the steps of:
  inputting an advertisement size of the advertisement data to be printed; and
  transmitting the advertisement data and the input advertisement size thereof to said information control apparatus, and said information control apparatus comprising:
a memory which stores a second computer program; and
a processor that executes the second computer program stored in said memory included in said information control apparatus, the second computer program comprising computer executable code that performs the steps of:
  receiving a designation of a print sheet size and the output information, the designation being provided in accordance with a user's operation;
  determining a layout which corresponds to a type of the output information designated in said designation receiving step, to secure an advertisement area for printing the advertisement data on the determined layout;
  selecting the advertisement data from the advertisement data transmitted to said information control apparatus in said advertisement data transmitting step, in accordance with the size of the advertisement area secured in said layout determining step, and at least one of a number of times of printing the advertisement data, a unit price of the advertisement data, print position settings of the advertisement data, a size adjusting method of the advertisement data, and an arrangement orientation of the advertisement data;
  generating the print data by laying out the output information designated in said designation receiving step and the advertisement data selected in said advertisement data selecting step in accordance with the layout determined in said layout determining step; and
  adding print data of a bar code indicating a print fee for printing of the output information, which is reduced in accordance with the advertisement data being printed, to the print data generated in said print data generating step.

* * * * *